United States Patent
Shinya

(10) Patent No.: US 9,489,083 B2
(45) Date of Patent: Nov. 8, 2016

(54) TOUCH PANEL CONTROLLER, TOUCH SENSOR SYSTEM, AND ELECTRONIC DEVICE

(71) Applicant: SHARP KABUSHIKI KAISHA, Osaka-shi, Osaka (JP)

(72) Inventor: Hideaki Shinya, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/909,337

(22) PCT Filed: Jul. 7, 2014

(86) PCT No.: PCT/JP2014/068055
§ 371 (c)(1),
(2) Date: Feb. 1, 2016

(87) PCT Pub. No.: WO2015/029601
PCT Pub. Date: Mar. 5, 2015

(65) Prior Publication Data
US 2016/0195985 A1     Jul. 7, 2016

(30) Foreign Application Priority Data
Sep. 2, 2013   (JP) .................................. 2013-181490

(51) Int. Cl.
G06F 3/041    (2006.01)
G06F 3/044    (2006.01)
G06F 3/045    (2006.01)
G06F 3/047    (2006.01)

(52) U.S. Cl.
CPC ............. *G06F 3/0416* (2013.01); *G06F 3/044* (2013.01); *G06F 3/045* (2013.01); *G06F 3/047* (2013.01); *G06F 3/0418* (2013.01)

(58) Field of Classification Search
CPC ....... G06F 3/0416; G06F 3/044; G06F 3/047
See application file for complete search history.

(56) References Cited

U.S. PATENT DOCUMENTS

| | | | |
|---|---|---|---|
| 2010/0253647 A1 | 10/2010 | Agari et al. | |
| 2010/0309171 A1* | 12/2010 | Hsieh ................... | G06F 3/0416 345/204 |
| 2011/0074731 A1 | 3/2011 | Inoue et al. | |
| 2012/0146935 A1 | 6/2012 | Bulea | |
| 2013/0271426 A1 | 10/2013 | Yumoto et al. | |
| 2014/0078115 A1 | 3/2014 | Itsuki | |

(Continued)

FOREIGN PATENT DOCUMENTS

| | | |
|---|---|---|
| JP | 2011-76484 A | 4/2011 |
| JP | 2012-168919 A | 9/2012 |

(Continued)

*Primary Examiner* — Sahlu Okebato
(74) *Attorney, Agent, or Firm* — Birch, Stewart, Kolasch & Birch, LLP

(57) ABSTRACT

A touch panel controller (1) includes a first capacitance distribution calculation unit (15) that outputs a first signal value map which indicates a distribution of signal values in a touch panel (10) and a first capacitance distribution correction unit (16) that configures a broader area than an area in which changes in the signal values due to an input operation on the touch panel occur on the first signal value map, performs correction calculation that cancels the changes in the signal values due to external factors which are different from the input operation on the touch panel in the region, and generates a second signal value map.

5 Claims, 48 Drawing Sheets

(56) References Cited

U.S. PATENT DOCUMENTS

| | | |
|---|---|---|
| 2014/0132541 A1 | 5/2014 | Miyamoto et al. |
| 2014/0132561 A1 | 5/2014 | Miyamoto et al. |
| 2014/0152602 A1 | 6/2014 | Miyamoto et al. |
| 2014/0160070 A1 | 6/2014 | Miyamoto et al. |
| 2014/0362046 A1 | 12/2014 | Yoshida |

FOREIGN PATENT DOCUMENTS

| | | |
|---|---|---|
| JP | 2013-131080 A | 7/2013 |
| WO | WO 2009/063817 A1 | 5/2009 |
| WO | WO 2012/157291 A1 | 11/2012 |
| WO | WO 2013/094571 A1 | 6/2013 |

* cited by examiner

| EXTERNAL FACTOR AREA PARAMETER | VALUE |
|---|---|
| U | 3 |
| D | 3 |
| L | 3 |
| R | 3 |

FIG. 5

| 14 | 96 | 208 | 507 | 919 | 1070 | 1230 | 1507 | ← MAP1(C) |
|---|---|---|---|---|---|---|---|---|
| | 144 | 282 | 489 | 1085 | 1317 | 1910 | 1981 | 2268 |
| | 257 | 452 | 803 | 1941 | 3463 | 3173 | 2819 | 3023 |
| | 551 | 445 | 1151 | 4040 | 7770 | 5562 | 3537 | 3745 |
| | 745 | 730 | 1670 | 4611 | 10032 | 7652 | 4344 | 4496 | ← A(C1) |
| | 1028 | 1487 | 2494 | 3886 | 6763 | 5832 | 4997 | 5419 |
| | 1267 | 2004 | 3542 | 4806 | 5067 | 4833 | 5260 | 6121 |
| | 915 | 2054 | 3123 | 3748 | 3928 | 4604 | 5551 | 6522 |
| | 793 | 1858 | 2597 | 3124 | 3600 | 4726 | 5917 | 7091 |
| | 705 | 1843 | 2489 | 3073 | 3738 | 5116 | 6469 | 7757 |

ORIGIN (0, 0) IN AREA A IS DEFINED WITH FOCUS POINT (X, Y) = (5, 5) IN MAP1 BEING REFERENCE.

| | i=-3 | i=-2 | i=-1 | i=0 | i=1 | i=2 | i=3 |
|---|---|---|---|---|---|---|---|
| j=-3 | 282 | 489 | 1085 | 1317 | 1910 | 1981 | 2268 |
| j=-2 | 452 | 803 | 1941 | 3463 | 3173 | 2819 | 3023 |
| j=-1 | 445 | 1151 | 4040 | 7770 | 5562 | 3537 | 3745 |
| j=0 | 730 | 1670 | 4611 | 10032 | 7652 | 4344 | 4496 |
| j=1 | 1487 | 2494 | 3886 | 6763 | 5832 | 4997 | 5419 |
| j=2 | 2004 | 3542 | 4806 | 5067 | 4833 | 5260 | 6121 |
| j=3 | 2054 | 3123 | 3748 | 3928 | 4604 | 5551 | 6522 |

~A(C1)

ORIGIN (0, 0)

j (UP-DOWN POSITION INCLINATION MULTIPLYING FACTOR)

i (LEFT-RIGHT POSITION INCLINATION MULTIPLYING FACTOR)

$C_m = 3608$
$\alpha = -480$
$\beta = -574$

<CORRECTION CALCULATION>
$C2[i][j] = C1[i][j] - C_m + j \times \alpha + i \times \beta$ ($-L \leq i \leq R, -U \leq j \leq D$)
(C2[i][j] EXPRESSES CORRECTED CAPACITANCE VALUES, AND
C1[i][j] EXPRESSES UNCORRECTED CAPACITANCE VALUES.)

(b)

| | i=-3 | i=-2 | i=-1 | i=0 | i=1 | i=2 | i=3 |
|---|---|---|---|---|---|---|---|
| j=-3 | -159 | -527 | -506 | -849 | -830 | -1334 | -1622 |
| j=-2 | -470 | -694 | -131 | 815 | -48 | -977 | -1348 |
| j=-1 | -958 | -827 | 1490 | 4642 | 1859 | -740 | -1107 |
| j=0 | -1154 | -789 | 1576 | 6423 | 3468 | -414 | -837 |
| j=1 | -878 | -446 | 370 | 2673 | 1167 | -242 | -395 |
| j=2 | -842 | 120 | 810 | 496 | -312 | -460 | -173 |
| j=3 | -1273 | -779 | -728 | -1123 | -1022 | -650 | -253 |

~MAP2(C2)

ORIGIN (0, 0)

FIG. 9

(a) MAP1(C)

| | | | | | | | | | |
|---|---|---|---|---|---|---|---|---|---|
| 14 | 96 | 208 | 507 | 919 | 1070 | 1230 | 1507 | | |
| 144 | 282 | 489 | 1085 | 1317 | 1910 | 1981 | 2268 | | |
| 257 | 452 | 803 | 1941 | 3463 | 3173 | 2819 | 3023 | | |
| 551 | 445 | 1151 | 4040 | 7770 | 5562 | 3537 | 3745 | | |
| 745 | 730 | 1670 | 4611 | 10032 | 7652 | 4344 | 4496 | | |
| 1028 | 1487 | 2494 | 3886 | 6763 | 5832 | 4997 | 5419 | ← Aq(Cq) |
| 1267 | 2004 | 3542 | 4806 | 5067 | 4833 | 5260 | 6121 | | |
| 915 | 2054 | 3123 | 3748 | 3928 | 4604 | 5551 | 6522 | | |
| 793 | 1858 | 2597 | 3124 | 3600 | 4726 | 5917 | 7091 | | |
| 705 | 1843 | 2489 | 3073 | 3738 | 5116 | 6469 | 7757 | | |

FOCUS POINT ON MAP1 (X, Y) = (5, 6)
Cu=2239, Cd=4130, Cl=1290, Cr=5207
Cm=4009, $\alpha$=-315, $\beta$=-653

(b) MAP2q(C2q)

| | i=-3 | i=-2 | i=-1 | i=0 | i=1 | i=2 | i=3 |
|---|---|---|---|---|---|---|---|
| j=-3 | -653 | -955 | -470 | 400 | -543 | -1550 | -1999 |
| j=-2 | -975 | -922 | 1314 | 4391 | 1531 | -1147 | -1592 |
| j=-1 | -1005 | -718 | 1570 | 6338 | 3305 | -655 | -1156 |
| j=0 | -564 | -209 | 530 | 2754 | 1170 | -318 | -548 |
| j=1 | -362 | 523 | 1135 | 743 | -144 | -370 | -162 |
| j=2 | -627 | -211 | -239 | -711 | -688 | -394 | -46 |
| j=3 | -1138 | -1052 | -1178 | -1355 | -881 | -343 | 178 |

MAP1(C)

| | | | | | | | |
|---|---|---|---|---|---|---|---|
| 14 | 96 | 208 | 507 | 919 | 1070 | 1230 | 1507 |
| 144 | 282 | 489 | 1085 | 1317 | 1910 | 1981 | 2268 |
| 257 | 452 | 803 | 1941 | 3463 | 3173 | 2819 | 3023 |
| 551 | 445 | 1151 | 4040 | 7770 | 5562 | 3537 | 3745 |
| 745 | 730 | 1670 | 4611 | 10032 | 7652 | 4344 | 4496 |
| 1028 | 1487 | 2494 | 3886 | 6763 | 5832 | 4997 | 5419 |
| 1267 | 2004 | 3542 | 4806 | 5067 | 4833 | 5260 | 6121 |
| 915 | 2054 | 3123 | 3748 | 3928 | 4604 | 5551 | 6522 |
| 793 | 1858 | 2597 | 3124 | 3600 | 4726 | 5917 | 7091 |
| 705 | 1843 | 2489 | 3073 | 3738 | 5116 | 6469 | 7757 |

Ar(Cr)

FOCUS POINT ON MAP1 (X, Y) = (4, 4)
Cu=578, Cd=3826, Cl=572, Cr=3453
Cm=2658, α=−541, β=−480

(b)

MAP2r(C2r)

| | i=−3 | i=−2 | i=−1 | i=0 | i=1 | i=2 | i=3 |
|---|---|---|---|---|---|---|---|
| j=−3 | 420 | 22 | −347 | −528 | −596 | −925 | −1245 |
| j=−2 | 8 | −334 | −607 | −491 | −739 | −626 | −1035 |
| j=−1 | −420 | −705 | −834 | −176 | 866 | 96 | −738 |
| j= 0 | −667 | −1253 | −1027 | 1382 | 4631 | 1943 | −562 |
| j= 1 | −1015 | −1510 | −1050 | 1411 | 6352 | 3492 | −296 |
| j= 2 | −1273 | −1294 | −767 | 145 | 2542 | 1131 | −184 |
| j= 3 | −1575 | −1318 | −260 | 524 | 305 | −410 | −463 |

MAP1p(Cp)

| Ap(Cp1) | -60 | 756 | 1572 | 2583 | 3594 | 4422 | 5251 | 6260 | 7269 | 8017 | 8765 | 9621 | 10478 |
|---|---|---|---|---|---|---|---|---|---|---|---|---|---|
| | 785 | 1637 | 2489 | 3635 | 4781 | 5932 | 7083 | 7872 | 8660 | 9302 | 9944 | 10779 | 11615 |
| | 1629 | 2517 | 3406 | 4687 | 5969 | 7442 | 8916 | 9484 | 10051 | 10587 | 11122 | 11937 | 12752 |
| | 2385 | 3362 | 4339 | 6058 | 7778 | 9803 | 11829 | 11917 | 12005 | 12123 | 12241 | 13057 | 13872 |
| | 3141 | 4207 | 5273 | 7430 | 9587 | 12164 | 14742 | 14351 | 13959 | 13659 | 13360 | 14176 | 14993 |
| | 4043 | 5168 | 6292 | 8462 | 10632 | 13632 | 16633 | 16198 | 15764 | 15143 | 14523 | 15325 | 16128 |
| | 4945 | 6128 | 7311 | 9494 | 11677 | 15100 | 18523 | 18046 | 17568 | 16627 | 15686 | 16474 | 17263 |
| | 6084 | 7283 | 8482 | 10278 | 12074 | 14861 | 17648 | 17533 | 17418 | 17095 | 16772 | 17628 | 18484 |
| | 7222 | 8438 | 9654 | 11062 | 12471 | 14622 | 16773 | 17020 | 17268 | 17563 | 17858 | 18781 | 19705 |
| | 8240 | 9588 | 10937 | 12314 | 13691 | 15188 | 16685 | 17106 | 17528 | 18138 | 18749 | 19782 | 20816 |
| | 9258 | 10739 | 12221 | 13566 | 14910 | 15753 | 16596 | 17192 | 17788 | 18714 | 19640 | 20783 | 21926 |
| | 10042 | 11407 | 12771 | 13956 | 15141 | 15964 | 16786 | 17610 | 18433 | 19489 | 20545 | 21716 | 22886 |
| | 10827 | 12074 | 13321 | 14346 | 15371 | 16174 | 16976 | 18027 | 19078 | 20264 | 21450 | 22648 | 23846 |

$Cm = 13985$
$\alpha = -932$

CORRECTION BY AVERAGE VALUE $Cm$ OF CAPACITANCES IN AP AND UP-DOWN INCLINATION $\alpha$
$C2pc[i][j] = Cp1[i][j] - Cm + j \times \alpha$ $(-L \leq i \leq R, -U \leq j \leq D)$ (b)

MAP2pc(C2pc)

| | i=-3 | i=-2 | i=-1 | i=0 | i=1 | i=2 | i=3 |
|---|---|---|---|---|---|---|---|
| j=-3 | -5131 | -3411 | -1386 | 640 | 728 | 816 | 934 |
| j=-2 | -4691 | -2534 | 43 | 2621 | 2230 | 1838 | 1538 |
| j=-1 | -4591 | -2421 | 580 | 3580 | 3146 | 2711 | 2090 |
| j=0 | -4491 | -2308 | 1116 | 4539 | 4061 | 3584 | 2643 |
| j=1 | -4638 | -2842 | -55 | 2732 | 2617 | 2502 | 2179 |
| j=2 | -4786 | -3377 | -1226 | 925 | 1172 | 1419 | 1715 |
| j=3 | -4466 | -3089 | -1592 | -95 | 326 | 748 | 1358 |

| | i=−3 | i=−2 | i=−1 | i=0 | i=1 | i=2 | i=3 |
|---|---|---|---|---|---|---|---|
| j=−3 | 282 | 489 | 1085 | 1317 | 1910 | 1981 | 2268 |
| j=−2 | 452 | 803 | 1941 | 3463 | 3173 | 2819 | 3023 |
| j=−1 | 445 | 1151 | 4040 | 7770 | 5562 | 3537 | 3745 |
| j=0 | 730 | 1670 | 4611 | 10032 | 7652 | 4344 | 4496 |
| j=1 | 1487 | 2494 | 3886 | 6763 | 5832 | 4997 | 5419 |
| j=2 | 2004 | 3542 | 4806 | 5067 | 4833 | 5260 | 6121 |
| j=3 | 2054 | 3123 | 3748 | 3928 | 4604 | 5551 | 6522 |

~A(C1)

$Cm = 3608$
$\alpha = -480$
$\beta = -574$
$K = 1.2$

<CORRECTION CALCULATION>
$C2[i][j] = C1[i][j] - K \times (Cm + j \times \alpha + i \times \beta)$ $(-L \le i \le R, -U \le j \le D)$
(C2[i][j] EXPRESSES CORRECTED CAPACITANCE VALUES, AND
C1[i][j] EXPRESSES UNCORRECTED CAPACITANCE VALUES.)

(b)

| | i=−3 | i=−2 | i=−1 | i=0 | i=1 | i=2 | i=3 |
|---|---|---|---|---|---|---|---|
| j=−3 | 512 | −109 | −340 | −936 | −1171 | −1927 | −2468 |
| j=−2 | −11 | −487 | −177 | 517 | −600 | −1782 | −2406 |
| j=−1 | −710 | −832 | 1230 | 4132 | 1096 | −1756 | −2376 |
| j=0 | −1118 | −1005 | 1108 | 5701 | 2494 | −1642 | −2318 |
| j=1 | −1053 | −874 | −309 | 1740 | −19 | −1681 | −2087 |
| j=2 | −1229 | −518 | −82 | −649 | −1710 | −2111 | −2078 |
| j=3 | −1871 | −1630 | −1832 | −2480 | −2632 | −2512 | −2369 |

~MAP2fa(C2fa)

| | i=-3 | i=-2 | i=-1 | i=0 | i=1 | i=2 | i=3 | |
|---|---|---|---|---|---|---|---|---|
| j=-3 | 282 | 489 | 1085 | 1317 | 1910 | 1981 | 2268 | ~A(C1) |
| j=-2 | 452 | 803 | 1941 | 3463 | 3173 | 2819 | 3023 | |
| j=-1 | 445 | 1151 | 4040 | 7770 | 5562 | 3537 | 3745 | |
| j=0 | 730 | 1670 | 4611 | 10032 | 7652 | 4344 | 4496 | |
| j=1 | 1487 | 2494 | 3886 | 6763 | 5832 | 4997 | 5419 | |
| j=2 | 2004 | 3542 | 4806 | 5067 | 4833 | 5260 | 6121 | |
| j=3 | 2054 | 3123 | 3748 | 3928 | 4604 | 5551 | 6522 | |

Cm=3608
α=-480
β=-574
K=1.1

<CORRECTION CALCULATION>
C2[i][j]=C1[i][j]-K×(Cm+j×α+i×β) (-L≤i≤R, -U≤j≤D)
(C2[i][j] EXPRESSES CORRECTED CAPACITANCE VALUES, AND
C1[i][j] EXPRESSES UNCORRECTED CAPACITANCE VALUES.)

(b)

| | i=-3 | i=-2 | i=-1 | i=0 | i=1 | i=2 | i=3 | |
|---|---|---|---|---|---|---|---|---|
| j=-3 | 144 | -344 | -444 | -907 | -1009 | -1634 | -2042 | ~MAP2fb(C2fb) |
| j=-2 | -268 | -612 | -169 | 657 | -328 | -1378 | -1869 | |
| j=-1 | -856 | -846 | 1348 | 4382 | 1479 | -1242 | -1729 | |
| j=0 | -1153 | -909 | 1337 | 6062 | 2987 | -1017 | -1560 | |
| j=1 | -978 | -667 | 30 | 2211 | 585 | -946 | -1219 | |
| j=2 | -1043 | -201 | 368 | -66 | -996 | -1264 | -1099 | |
| j=3 | -1575 | -1201 | -1272 | -1787 | -1807 | -1555 | -1280 | |

| | i=−3 | i=−2 | i=−1 | i=0 | i=1 | i=2 | i=3 |
|---|---|---|---|---|---|---|---|
| j=−3 | 282 | 489 | 1085 | 1317 | 1910 | 1981 | 2268 |
| j=−2 | 452 | 803 | 1941 | 3463 | 3173 | 2819 | 3023 |
| j=−1 | 445 | 1151 | 4040 | 7770 | 5562 | 3537 | 3745 |
| j=0 | 730 | 1670 | 4611 | 10032 | 7652 | 4344 | 4496 |
| j=1 | 1487 | 2494 | 3886 | 6763 | 5832 | 4997 | 5419 |
| j=2 | 2004 | 3542 | 4806 | 5067 | 4833 | 5260 | 6121 |
| j=3 | 2054 | 3123 | 3748 | 3928 | 4604 | 5551 | 6522 |

~A(C1)

<CORRECTION CALCULATION>
C2[i][j]=C1[i][j]−K×(Cm+j×α+i×β) (−L≤i≤R, −U≤j≤D)
(C2[i][j] EXPRESSES CORRECTED CAPACITANCE VALUES, AND
C1[i][j] EXPRESSES UNCORRECTED CAPACITANCE VALUES.)

Cm=3608
α=−480
β=−574
K=0.9

(b)

| | i=−3 | i=−2 | i=−1 | i=0 | i=1 | i=2 | i=3 |
|---|---|---|---|---|---|---|---|
| j=−3 | −401 | −659 | −529 | −762 | −635 | −1029 | −1208 |
| j=−2 | −620 | −735 | −62 | 994 | 239 | −581 | −843 |
| j=−1 | −1017 | −776 | 1647 | 4912 | 2238 | −253 | −510 |
| j=0 | −1121 | −647 | 1829 | 6784 | 3939 | 165 | −149 |
| j=1 | −754 | −212 | 714 | 3126 | 1729 | 428 | 385 |
| j=2 | −626 | 446 | 1245 | 1040 | 340 | 302 | 697 |
| j=3 | −966 | −362 | −203 | −489 | −278 | 203 | 709 |

~MAP2fc(C2fc)

| | i=−3 | i=−2 | i=−1 | i=0 | i=1 | i=2 | i=3 |
|---|---|---|---|---|---|---|---|
| j=−3 | 282 | 489 | 1085 | 1317 | 1910 | 1981 | 2268 |
| j=−2 | 452 | 803 | 1941 | 3463 | 3173 | 2819 | 3023 |
| j=−1 | 445 | 1151 | 4040 | 7770 | 5562 | 3537 | 3745 |
| j=0 | 730 | 1670 | 4611 | 10032 | 7652 | 4344 | 4496 |
| j=1 | 1487 | 2494 | 3886 | 6763 | 5832 | 4997 | 5419 |
| j=2 | 2004 | 3542 | 4806 | 5067 | 4833 | 5260 | 6121 |
| j=3 | 2054 | 3123 | 3748 | 3928 | 4604 | 5551 | 6522 |

$Cm = 3608$
$\alpha = -480$
$\beta = -574$
$K = 0.8$

<CORRECTION CALCULATION>
$C2[i][j] = C1[i][j] - K \times (Cm + j \times \alpha + i \times \beta)$ $(-L \leq i \leq R, -U \leq j \leq D)$
(C2[i][j] EXPRESSES CORRECTED CAPACITANCE VALUES, AND
C1[i][j] EXPRESSES UNCORRECTED CAPACITANCE VALUES.)

(b) MAP2fd(C2fd)

| | i=−3 | i=−2 | i=−1 | i=0 | i=1 | i=2 | i=3 |
|---|---|---|---|---|---|---|---|
| j=−3 | −578 | −739 | −511 | −647 | −422 | −718 | −799 |
| j=−2 | −716 | −733 | 37 | 1192 | 534 | −188 | −352 |
| j=−1 | −1031 | −693 | 1829 | 5191 | 2615 | 222 | 62 |
| j=0 | −1054 | −481 | 2092 | 7145 | 4397 | 721 | 505 |
| j=1 | −604 | 35 | 1059 | 3568 | 2269 | 1066 | 1121 |
| j=2 | −395 | 775 | 1671 | 1564 | 963 | 1022 | 1515 |
| j=3 | −653 | 48 | 305 | 118 | 426 | 1005 | 1608 |

FIG. 35

100 SECOND CAPACITANCE MAPS
MAP2A1, MAP2A2, ..., MAP2A100

|    | B1    | C1   | D1   | E1   | F1   | G1   | H1  | I1  | J1  | A2  |     |     |     |     |     |     |     | J10 |
|----|-------|------|------|------|------|------|-----|-----|-----|-----|-----|-----|-----|-----|-----|-----|-----|-----|
| A1 | 59    |      |      |      |      |      |     |     |     |     |     |     |     |     |     |     |     |     |
|    | -159  | -327 | -15  | -15  | -1   | 15   | -5  | -91 | -80 | 34  | -22 | 12  | 96  | -30 | 19  | 669 | 525 | -362|
|    | -470  | -527 | -694 | -506 | -131 | -849 | 815 | -52 | -6  | -7  | 66  | 49  | -5  | 830 | -63 | 14  | -224| 347 | 18 |
|    | -958  | -827 | -789 | 1490 | 1576 | 4642 | 6423| 2673| 827 | 530 | -35 | -1622| -1348| -1107| -837| -395| -173| -253|
|    | -1154 |      |      |      |      |      |     |     |     |     |     |     |     |     |     |     |     |     |
|    | -878  |      |      |      |      |      |     |     |     |     |     |     |     |     |     |     |     |     |
|    | -842  |      |      |      |      |      |     |     |     |     |     |     |     |     |     |     |     |     |
|    | -1273 |      |      |      |      |      |     |     |     |     |     |     |     |     |     |     |     |     |

MAP1A 1 FIRST CAPACITANCE MAP

|     | B   | C   | D   | E   | F   | G   | H   | I   | J   |
|-----|-----|-----|-----|-----|-----|-----|-----|-----|-----|-----|
| A1  | B1  | C1  | D1  | E1  | F1  | G1  | H1  | I1  | J1  |
| A2  | B2  | C2  | D2  | E2  | F2  | G2  | H2  | I2  | J2  |
| A3  | B3  | C3  | D3  | E3  | F3  | G3  | H3  | I3  | J3  |
| A4  | B4  | C4  | D4  | E4  | F4  | G4  | H4  | I4  | J4  |
| A5  | B5  | C5  | D5  | E5  | F5  | G5  | H5  | I5  | J5  |
| A6  | B6  | C6  | D6  | E6  | F6  | G6  | H6  | I6  | J6  |
| A7  | B7  | C7  | D7  | E7  | F7  | G7  | H7  | I7  | J7  |
| A8  | B8  | C8  | D8  | E8  | F8  | G8  | H8  | I8  | J8  |
| A9  | B9  | C9  | D9  | E9  | F9  | G9  | H9  | I9  | J9  |
| A10 | B10 | C10 | D10 | E10 | F10 | G10 | H10 | I10 | J10 |

| | 14 | 96 | 208 | 507 | 919 | 1070 | 1230 | 1507 | MAP1(C) |
|---|---|---|---|---|---|---|---|---|---|
| | 144 | 282 | 489 | 1085 | 1317 | 1910 | 1981 | 2268 | |
| | 257 | 452 | 803 | 1941 | 3463 | 3173 | 2819 | 3023 | |
| | 551 | 445 | 1151 | 4040 | 7770 | 5562 | 3537 | 3745 | |
| | 745 | 730 | 1670 | 4611 | 10032 | 7652 | 4344 | 4496 | |
| | 1028 | 1487 | 2494 | 3886 | 6763 | 5832 | 4997 | 5419 | |
| | 1267 | 2004 | 3542 | 4806 | 5067 | 4833 | 5260 | 6121 | |
| | 915 | 2054 | 3123 | 3748 | 3928 | 4604 | 5551 | 6552 | |
| | 793 | 1858 | 2597 | 3124 | 3600 | 4726 | 5917 | 7091 | |
| | 705 | 1843 | 2489 | 3073 | 3738 | 5116 | 6469 | 7757 | |

⇩ DIFFERENCE CALCULATION $Cdif[i][j] = C[i][j] - C[i-1][j]$ MAP1dif(Cdif)

(b)

| | 14 | 96 | 208 | 507 | 919 | 1070 | 1230 | 1507 |
|---|---|---|---|---|---|---|---|---|
| | 130 | 186 | 281 | 578 | 398 | 840 | 751 | 761 |
| | 113 | 170 | 314 | 856 | 2146 | 1263 | 838 | 755 |
| | 294 | -7 | 348 | 2099 | 4307 | 2389 | 718 | 722 |
| | 194 | 285 | 519 | 571 | -2262 | 2090 | 807 | 751 |
| | 283 | 757 | 824 | -725 | -3269 | -1820 | 653 | 923 |
| | 239 | 517 | 1048 | 920 | -1696 | -999 | 263 | 702 |
| | -352 | 50 | -419 | -1058 | -1139 | -229 | 291 | 431 |
| | -122 | -196 | -526 | -624 | -328 | 122 | 366 | 539 |
| | -88 | -15 | -108 | -51 | 138 | 390 | 552 | 666 |

⇩ INTEGRAL CALCULATION $Cint[i][j] = Cint[i-1][j] + Cdif[i][j]$ MAP1int(Cint)

(c)

| | 14 | 96 | 208 | 507 | 919 | 1070 | 1230 | 1507 |
|---|---|---|---|---|---|---|---|---|
| | 144 | 282 | 489 | 1085 | 1317 | 1910 | 1981 | 2268 |
| | 257 | 452 | 803 | 1941 | 3463 | 3173 | 2819 | 3023 |
| | 551 | 445 | 1151 | 4040 | 7770 | 5562 | 3537 | 3745 |
| | 745 | 730 | 1670 | 4611 | 10032 | 7652 | 4344 | 4496 |
| | 1028 | 1487 | 2494 | 3886 | 6763 | 5832 | 4997 | 5419 |
| | 1267 | 2004 | 3542 | 4806 | 5067 | 4833 | 5260 | 6121 |
| | 915 | 2054 | 3123 | 3748 | 3928 | 4604 | 5551 | 6552 |
| | 793 | 1858 | 2597 | 3124 | 3600 | 4726 | 5917 | 7091 |
| | 705 | 1843 | 2489 | 3073 | 3738 | 5116 | 6469 | 7757 |

FIG. 47

TOUCH PANEL CONTROLLER, TOUCH SENSOR SYSTEM, AND ELECTRONIC DEVICE

TECHNICAL FIELD

The present invention relates to a touch panel controller and a touch sensor system and an electronic device that include a touch panel controller.

BACKGROUND ART

A touch sensor system has been widely used in various electronic devices such as personal computers (PC), cellular phones, and tablets. In the touch sensor system, a user contacts with a touch panel with his/her finger or a touch stylus to perform an input operation on the touch panel.

For example, in a capacitance type touch sensor system, a change in capacitance (signal value) in the touch panel, which is caused by the contact of the finger of the user or the touch stylus with the touch panel, is detected. Then, the position where the change in the capacitance occurs in the touch panel is recognized as an input position with respect to the touch panel.

In recent years, various techniques have been suggested in order to achieve high accuracy detection of an input position in the touch sensor system. PTL 1 discloses a touch sensor system which corrects the coordinates of the input position that is calculated at the point in time when an input operation is performed on the touch panel by using the coordinates of positions specified by the distribution of capacitance values at a time before the input operation on the touch panel is performed.

Further, it has been known that the change in the capacitance occurs in the touch panel due to an external factor such as bend of the touch panel or exposure of the touch panel to electromagnetic waves (that is, a factor that is different from the input operation on the touch panel). PTL 2 discloses a touch sensor system that determines whether or not the touch panel is bending in order to remove an influence of the change in the capacitance due to bend of the touch panel.

Here, the change in the capacitance due to bend of the touch panel will be described with reference to FIGS. 49(*a*) and (*b*). FIG. 49(*a*) is a diagram that illustrates one example of the distribution of the capacitances in a case where a portion around the center of the touch panel is pressed down and bend occurs in the touch panel. Further, FIG. 49(*b*) is a diagram that illustrates the distribution of the capacitances illustrated in FIG. 49(*a*) on larger scale around the center of the touch panel. The values of the capacitance in FIGS. 49(*a*) and (*b*) are indicated as relative values that are standardized with a prescribed value (for example, the maximum value of the capacitance) being the reference value.

Here, because the bend of the touch panel is particularly large around the center of the touch panel, as illustrated in FIG. 49(*b*), a particularly large offset is added to the value of the capacitance. Accordingly, in a case where the amount of offset caused by bend of the touch panel has a similar magnitude to the capacitance caused by the input operation on the touch panel, detection accuracy of the input position degrades like a case where the touch panel mistakenly recognizes that an input is performed in a position where the input operation is not actually performed, and so forth.

In a common touch sensor system, calibrated values of capacitance are used for detection of presence or absence of the input operation and detection of the coordinates of the input position. Calibration means a process of calculating the difference value between (i) the capacitance detected in the touch sensor system and (ii) a reference value, while the value of the capacitance in a static state (for example, the state that the touch panel is embedded in a housing) is set as the reference value. The calibration is conducted, and a static influence (that is, an influence that keeps occurring under the same circumstance) such as bend occurring in a state where the touch panel is embedded in the housing is thereby corrected.

However, in the touch sensor system, the user presses the touch panel down, and the bend amount of the touch panel thereby changes in accordance with the temporal change. Such a state will hereinafter be referred to as dynamic bend of the touch panel. In a case where the touch panel dynamically bends, the detection accuracy of the input position may degrade due to calibration.

The touch sensor system disclosed in PTL 2 removes the influence of the change in the capacitance due to bend of the touch panel by ignoring an input operation in a case where the touch panel dynamically bends.

CITATION LIST

Patent Literature

PTL 1: International Publication No. WO2009/063817 (laid open on May 22, 2009)

PTL 2: Japanese Unexamined Patent Application Publication No. 2011-76484 (laid open on Apr. 14, 2011)

SUMMARY OF INVENTION

Technical Problem

The touch sensor system disclosed in PTL 1 corrects the coordinates of the input position on the touch panel based on the distribution of the capacitance values at a time before the input operation on the touch panel is performed. Thus, the touch sensor system disclosed in PTL 1 has a problem that correction may not be performed in real time. Further, PTL 1 does not disclose or suggest a method of handling the change in the capacitance caused due to an external factor such as bend of the touch panel.

The touch sensor system disclosed in PTL 2 has a function of determining whether or not the touch panel is bending. The touch sensor system determines that the touch panel is bending in a case where there are a prescribed number (ten, for example) or more of capacitances of values that are equal to or higher than a prescribed threshold value (bend threshold value).

Then, in a case where a determination is made that the touch panel is bending, the touch sensor system calculates the position of the center of gravity of the distribution of capacitance values and removes the coordinates that indicate the position of the center of gravity from candidates of the coordinates of input positions on the touch panel.

However, the touch sensor system disclosed in PTL 2 assumes a case where bend of the touch panel causes a relatively large amount of change in the capacitance. Thus, there is a problem that it is difficult to apply the touch sensor system to a case where the change amount of the capacitance caused by bend of the touch panel is minute compared to the change amount of the capacitance caused by the input operation on the touch panel. Further, the touch sensor system has a problem that the coordinates of the input position may not be detected in a state where the touch panel is bending.

The present invention has been made to solve such a problem, and an object thereof is to provide a touch panel controller that may effectively remove the influence of a change in a signal value due to an external factor such as bend of a touch panel.

Solution to Problem

To solve the problem, a touch panel controller according to one aspect of the present invention is a touch panel controller including: a first signal value map generation unit that outputs a first signal value map which indicates a distribution of signal values in a touch panel in which plural signal values are formed in a matrix at intersections of m sense lines and n drive lines (both of m and n are integers that are equal to or greater than three); and a touch recognition unit that detects an input on the touch panel based on the signal values, in which the touch panel controller further includes a second signal value map generation unit that configures an area that is a broader range than a range where changes in the signal values due to an input operation on the touch panel occur on the first signal value map and provides a second signal value map which is generated by performing correction calculation which cancels changes in the signal values due to external factors which are different from the input operation on the touch panel in the area to the touch recognition unit.

Advantageous Effects of Invention

A touch panel controller according to one aspect of the present invention provides an effect of enabling effective removal of the influence of a change in a signal value due to an external factor.

BRIEF DESCRIPTION OF DRAWINGS

FIG. 5 is a diagram that exemplifies the first capacitance map and the area A according to the first embodiment of the present invention.

FIG. 7 is a diagram that exemplifies a matrix that expresses uncorrected capacitances and a matrix that expresses corrected capacitances according to the first embodiment of the present invention.

FIG. 9 is a diagram that exemplifies a matrix that expresses uncorrected capacitances and a matrix that expresses corrected capacitances according to the first embodiment of the present invention.

FIG. 11 is a diagram that exemplifies a matrix that expresses uncorrected capacitances and a matrix that expresses corrected capacitances according to the first embodiment of the present invention.

FIG. 18 is a diagram that exemplifies a matrix that expresses capacitances which are obtained as a result of different correction calculation from the correction calculation according to the first embodiment of the present invention.

FIG. 25 is a diagram that exemplifies a matrix that expresses uncorrected capacitances and a matrix that expresses corrected capacitances according to the second embodiment of the present invention.

FIG. 26 is a diagram that exemplifies the matrix that expresses uncorrected capacitances and a matrix that expresses corrected capacitances according to the second embodiment of the present invention.

FIG. 27 is a diagram that exemplifies the matrix that expresses uncorrected capacitances and a matrix that expresses corrected capacitances according to the second embodiment of the present invention.

FIG. 28 is a diagram that exemplifies the matrix that expresses uncorrected capacitances and a matrix that expresses corrected capacitances according to the second embodiment of the present invention.

FIG. 35 is a diagram that exemplifies an effect of the touch sensor system according to the third embodiment of the present invention.

FIG. 43 is a diagram that exemplifies difference calculation and integral calculation according to the sixth embodiment of the present invention.

FIG. 47 is a diagram that exemplifies a matrix C that expresses capacitances and a matrix Cdif to which difference calculation has been applied, according to the sixth embodiment of the present invention.

DESCRIPTION OF EMBODIMENTS

[First Embodiment]

A first embodiment of the present invention will be described below based on FIGS. 1 to 22.

(Configuration of Touch Sensor System 100)

Figure 1:
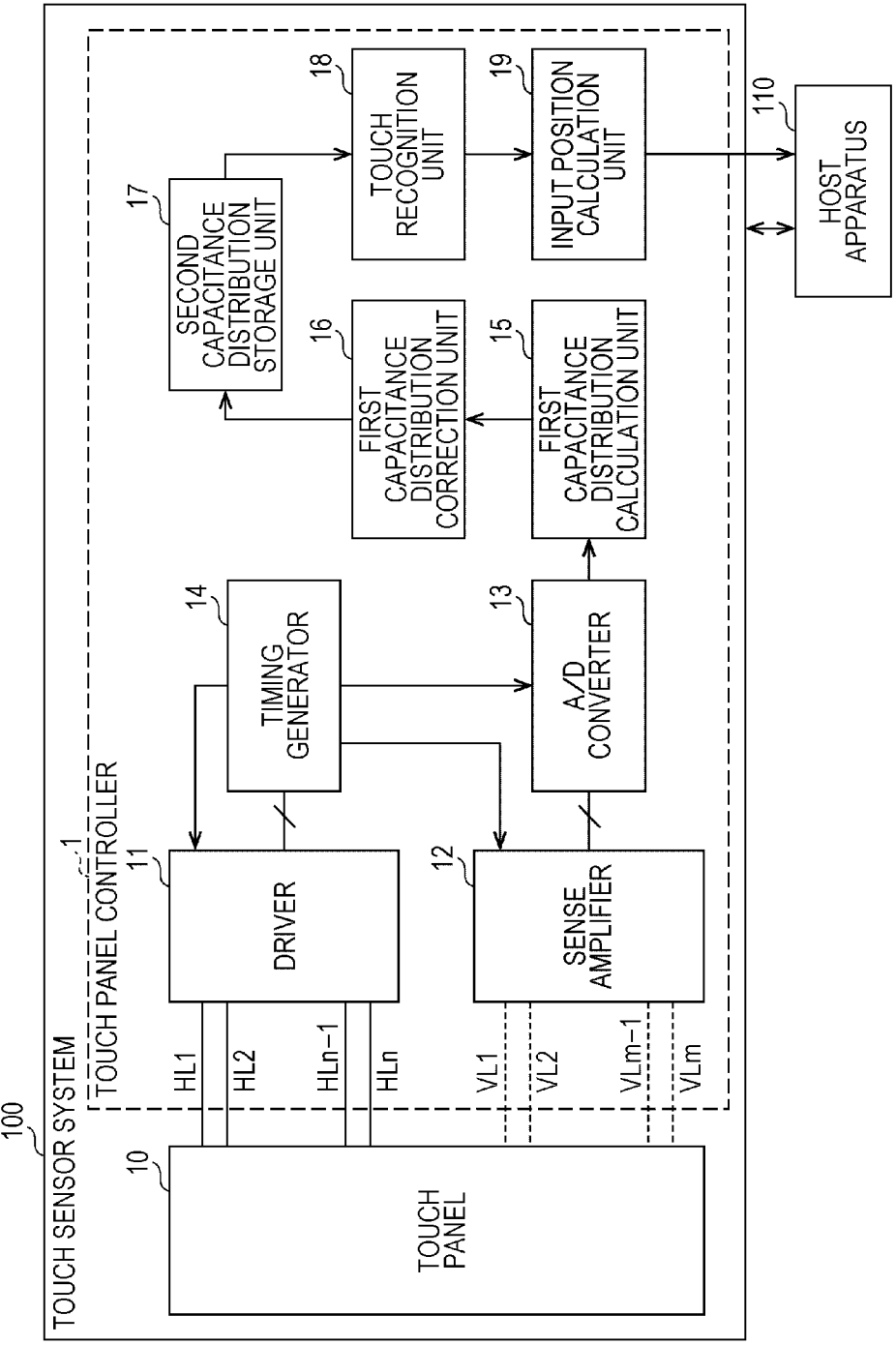
FIG. 1 is a function block diagram that illustrates a configuration of a touch sensor system according to a first embodiment of the present invention.

FIG. 1 is a function block diagram that illustrates the configuration of a touch sensor system 100 according to this embodiment. The touch sensor system 100 includes a touch panel controller 1 and a touch panel 10.

(Touch Panel 10)

The touch panel 10 is a capacitance type touch panel, for example. The touch panel 10 includes n (n is an integer that is equal to or greater than three) drive lines HL1 to HLn that are arranged in parallel with each other in the horizontal direction (left-right direction) and m (m is an integer that is equal to or greater than three) sense lines VL1 to VLm that are arranged in parallel with each other in the vertical direction (up-down direction).

In the touch panel 10, (m×n) capacitances C1,1 to Cm,n are formed at intersections between the drive lines HL1 to HLn and the sense lines VL1 to VLm. Here, the capacitance Cm,n represents the value (signal value) of the capacitance formed at the intersection between the sense line VLm and the drive line HLn. The capacitance Cm,n is distributed in a matrix in the touch panel 10.

(Touch Panel Controller 1)

The touch panel controller 1 includes a driver 11, a sense amplifier 12, an analog-digital (A/D) converter 13, a timing generator 14, a first capacitance distribution calculation unit 15 (first signal value map generation unit), a first capacitance distribution correction unit 16 (second signal value map generation unit), a second capacitance distribution storage unit 17, a touch recognition unit 18, and an input position calculation unit 19.

The touch panel controller 1 is connected with the touch panel 10. Further, the touch panel controller 1 is connected with a host apparatus 110 that is provided on the outside of the touch sensor system 100.

(Driver 11)

The driver 11 drives the drive lines HL1 to HLn based on a code sequence. The drive line HL1 to HLn are driven, and the capacitances C1,1 to Cm,n are thereby formed in the touch panel 10.

(Sense Amplifier 12)

The sense amplifier 12 reads out linear sum signals as voltage signals from the sense lines VL1 to VLm as analog signals. A linear sum signal is a signal that is expressed as the linear sum of the voltages which correspond to the capacitances C1,1 to Cm,n formed by driving the drive lines HL1 to HLn by the driver 11. Here, m linear sum signals Y1 to Ym that correspond to (m×n) capacitances C1,1 to Cm,n are read out as analog signals.

The sense amplifier 12 provides the linear sum signals Y1 to Ym as analog signals to the A/D converter 13.

(A/D Converter 13)

The A/D converter 13 applies A/D conversion to the linear sum signals Y1 to Ym as analog signals, which are provided from the sense amplifier 12. The A/D converter 13 provides the digitized linear sum signals Y1 to Ym to the first capacitance distribution calculation unit 15.

The linear sum signals Y1 to Ym are provided as digital signals from the A/D converter 13 to the first capacitance distribution calculation unit 15, thereby facilitating various kinds of computation by the first capacitance distribution calculation unit 15 for calculating the distribution of the capacitances C1,1 to Cm,n formed on the touch panel 10.

(Timing Generator 14)

The timing generator 14 generates control signals that specify operations of the driver 11, the sense amplifier 12, and the A/D converter 13 and provides those to the driver 11, the sense amplifier 12, and the A/D converter 13.

(First Capacitance Distribution Calculation Unit 15)

The first capacitance distribution calculation unit 15 calculates a first capacitance map that indicates the distribution of the capacitances C1,1 to Cm,n on the touch panel 10 based on the digitized linear sum signals Y1 to Ym, which are provided from the A/D converter 13. The first capacitance distribution calculation unit 15 provides the first capacitance map to the first capacitance distribution correction unit 16.

The values of the capacitances C1,1 to Cm,n on the first capacitance map are expressed as components of a matrix C with m rows and n columns. That is, when the component in the xth row and the yth column of the matrix C is expressed as C[x][y], C[x][y]=Cx,y is obtained.

Further, the coordinates that indicate the position on the touch panel 10, in which the capacitance Cx,y is formed, will hereinafter be expressed as coordinates (x, y) on the first capacitance map.

(First Capacitance Distribution Correction Unit 16)

The first capacitance distribution correction unit 16 performs correction calculation for removing changes in the distribution of capacitances due to external factors for the first capacitance map provided from the first capacitance distribution calculation unit 15. The first capacitance distribution correction unit 16 generates a second capacitance map as a result of the above-described correction calculation.

The first capacitance distribution correction unit 16 provides the second capacitance map to the second capacitance distribution storage unit 17. A specific configuration of the first capacitance distribution correction unit 16 and specific processes of the correction calculation in the first capacitance distribution correction unit 16 will be described later.

(Second Capacitance Distribution Storage Unit 17)

The second capacitance distribution storage unit 17 stores the second capacitance map provided from the first capacitance distribution correction unit 16. The second capacitance map recorded in the second capacitance distribution storage unit 17 is read out by the touch recognition unit 18.

(Touch Recognition Unit 18)

The touch recognition unit 18 reads out the second capacitance map from the second capacitance distribution storage unit 17. Next, the touch recognition unit 18 determines whether or not an input by a touch by a finger or a stylus is applied to the touch panel 10 based on the second capacitance map.

In a case where the touch recognition unit 18 determines that an input by a touch by the finger or the stylus is applied to the touch panel 10, the touch recognition unit 18 provides the second capacitance map to the input position calculation unit 19.

(Input Position Calculation Unit 19)

The input position calculation unit 19 calculates the coordinates of the input position that indicates the position, in which the input is applied to the touch panel 10, based on the second capacitance map provided from the touch recognition unit 18. The input position calculation unit 19 provides the coordinates of the input position to the host apparatus 110 that is provided on the outside of the touch sensor system 100.

(Host Apparatus 110)

The host apparatus 110 is a processor that is provided on the outside of the touch sensor system 100 and executes processes of application software based on the coordinates of the input position provided from the input position calculation unit 19.

(Configuration of First Capacitance Distribution Correction Unit 16)

Figure 2:
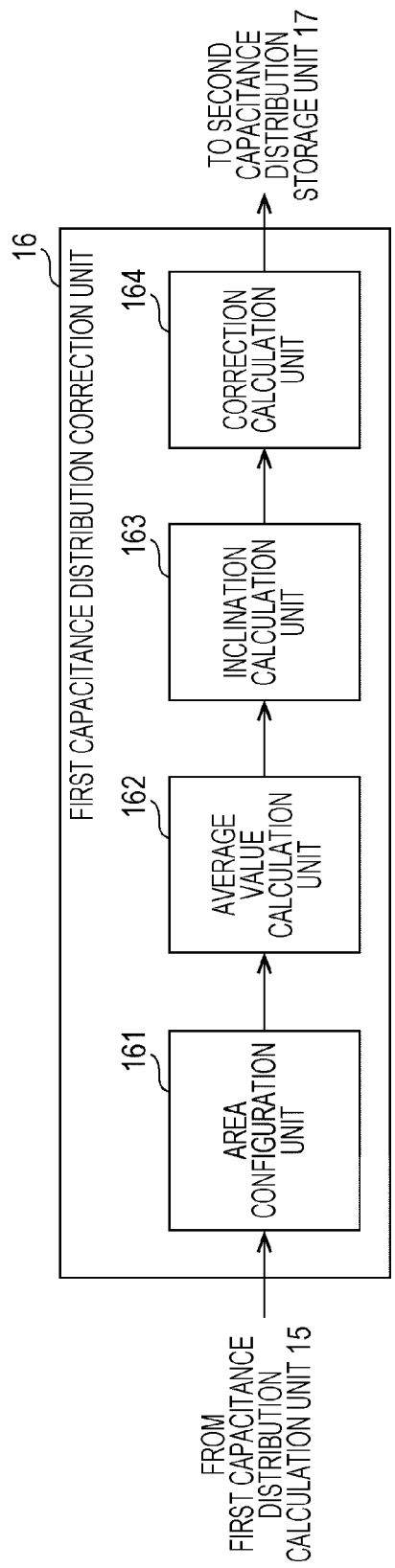
FIG. 2 is a function block diagram that illustrates a specific configuration of a first capacitance distribution correction unit in the touch sensor system according to the first embodiment of the present invention.

A configuration of the first capacitance distribution correction unit 16 will be described below with reference to FIG. 2. FIG. 2 is a function block diagram that illustrates a specific configuration of the first capacitance distribution correction unit 16. The first capacitance distribution correction unit 16 includes an area configuration unit 161, an average value calculation unit 162, an inclination calculation unit 163, and a correction calculation unit 164.

(Area Configuration Unit 161)

The area configuration unit 161 is provided with the first capacitance map from the first capacitance distribution calculation unit 15. The area configuration unit 161 identifies one point on the first capacitance map as a focus point. The focus point on the first capacitance map will hereinafter be expressed as coordinates (X, Y). The focus point (X, Y) may be identified as the coordinates that indicate the position where a local maximum value on the first capacitance map is present (or a point around the position where the local maximum value is present), for example.

Next, the area configuration unit 161 uses four external factor area parameters U, D, L, and R in order to configure an area A to perform the correction calculation for the first capacitance map. Each of the external factor area parameters U, D, L, and R is an integer that is equal to or greater than one.

Figures 3, 4:
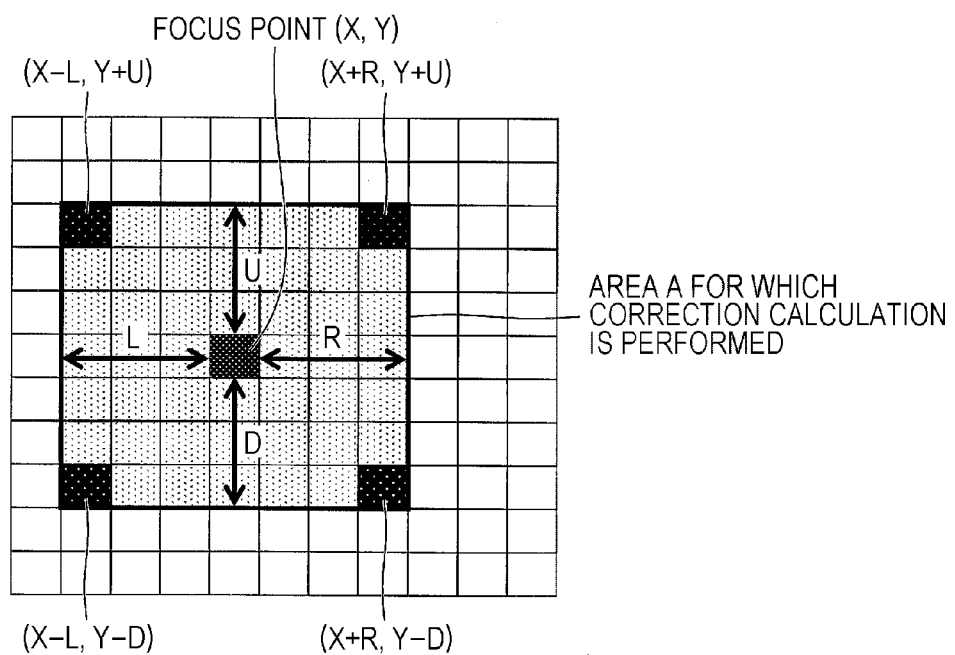
FIG. 3 is a diagram that exemplifies values of external factor area parameters U, D, L, and R according to the first embodiment of the present invention.
FIG. 4 is a diagram that exemplifies a focus point (X, Y) and an area A on a first capacitance map according to the first embodiment of the present invention.

FIG. 3 is a table that exemplifies values of the external factor area parameters U, D, L, and R. In this embodiment, a description will be made on the assumption of a case of U=D=L=R=3 as indicated in FIG. 3. The values of the external factor area parameters U, D, L, and R may be fixed values that are predetermined at manufacturing of the touch sensor system 100 but are preferably values that may be changed by the host apparatus 110.

The area configuration unit 161 identifies four points (X−L, Y−D), (X−L, Y+U), (X+R, Y−D), and (X+R, Y+U) with respect to the focus point (X, Y). The area configuration unit 161 configures the area expressed by the rectangle that has the four points (X−L, Y−D), (X−L, Y+U), (X+R, Y−D), and (X+R, Y+U) as vertices as the area A for which the correction calculation for the first capacitance map is performed. The area configuration unit 161 provides information that indicates the coordinates of the focus point (X, Y)

and the area A, in addition to the first capacitance map, to the average value calculation unit 162.

FIG. 4 is a diagram that exemplifies the focus point (X, Y) and the area A on the first capacitance map. Here, U=D=L=R=3 holds, and the four vertices of the area A are expressed as (X−3, Y−3), (X−3, Y+3), (X+3, Y−3), and (X+3, Y+3).

(Average Value Calculation Unit 162)

The average value calculation unit 162 acquires the information that indicates the coordinates of the focus point (X, Y) and the area A, in addition to the first capacitance map, from the area configuration unit 161.

FIG. 5 is a diagram that exemplifies the first capacitance map and the area A. Here, the first capacitance map illustrated in FIG. 5 will be referred to as first capacitance map MAP1. The first capacitance map MAP1 is expressed as a matrix with 10 rows and 8 columns.

The local maximum value "10032" of the capacitance is stored in the fifth row and the fifth column on the first capacitance map MAP1. Accordingly, the area configuration unit 161 identifies the coordinates of the focus point on the first capacitance map MAP1 as focus point (X, Y)=(5, 5). Here, the focus point (5, 5) is assumed as the position where the capacitance due to a touch input is present.

Because U=D=L=R=3 holds, the area configuration unit 161 configures the area A as the rectangle that has four points (2, 2), (2, 8), (8, 2), and (8, 8) on the first capacitance map MAP1 as the vertices. Thus, the area A may be expressed by a matrix with seven rows and seven columns. The matrix that expresses the distribution of the capacitances in the area A will hereinafter be referred to as matrix C1.

The relationship between the matrix C1 that expresses the distribution of the capacitances in the area A and the matrix C that indicates the distribution of the capacitances on the first capacitance map MAP1 is expressed by the following equation.

$$C1[i][j]=C[i+X][j+Y]$$

(where $-L \leq i \leq R$ and $-U \leq j \leq D$)

That is, the origin (0, 0) in the area A is configured with the focus point (X, Y) on the first capacitance map MAP1 being a reference position. Accordingly, the coordinates of the four vertices are expressed as (−3, −3), (−3, 3), (3, −3), and (3, 3) in the area A.

Figure 6:
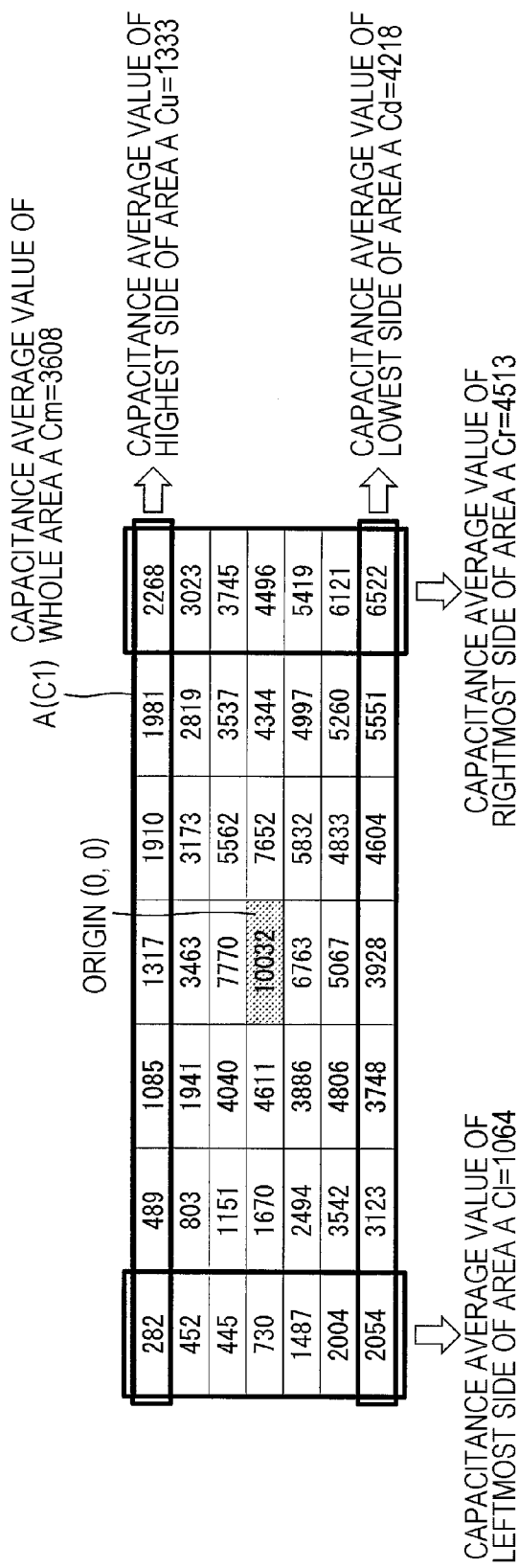
FIG. 6 is a diagram that exemplifies operations of an average value calculation unit and an inclination calculation unit according to the first embodiment of the present invention.

FIG. 6 is a diagram that exemplifies operations of the average value calculation unit 162 and the inclination calculation unit 163 in the area A. The operations of the average value calculation unit 162 will first be described with reference to FIG. 6.

The average value calculation unit 162 calculates an average value Cm of the capacitances in the whole area A by the following equation (1).

$$Cm = (\text{sum of all components of matrix } C1)/(\text{number of all components of matrix } C1) \quad (1)$$

In a case of the area A illustrated in FIG. 6, the average value calculation unit 162 calculates Cm=3609 by applying the equation (1).

Next, the average value calculation unit 162 calculates (i) an average value Cu of the capacitances on the highest side (highest row) of the area A, (ii) an average value Cd of the capacitances on the lowest side (lowest row) of the area A, (iii) an average value Cl of the capacitances on the leftmost side (leftmost column) of the area A, and (iv) an average value Cr of the capacitances on the rightmost side (rightmost column) of the area A by the following equations (2) to (5).

$$Cu = (\text{sum of components on highest side of matrix } C1)/(\text{number of components on highest side of matrix } C1) \quad (2)$$

$$Cd = (\text{sum of components on lowest side of matrix } C1)/(\text{number of components on lowest side of matrix } C1) \quad (3)$$

$$Cl = (\text{sum of components on leftmost side of matrix } C1)/(\text{number of components on leftmost side of matrix } C1) \quad (4)$$

$$Cr = (\text{sum of components on rightmost side of matrix } C1)/(\text{number of components on rightmost side of matrix } C1) \quad (5)$$

In the case of the area A illustrated in FIG. 6, the average value calculation unit 162 calculates Cu=1333, Cd=4218, Cl=1064, and Cr=4513 by applying the equations (2) to (5).

The average value calculation unit 162 provides the values of Cm, Cu, Cd, Cl, and Cr, in addition to information that indicates the first capacitance map MAP1, the coordinates of the focus point (X, Y), and the area A, to the inclination calculation unit 163.

(Inclination Calculation Unit 163)

The inclination calculation unit 163 uses the values of Cm, Cu, Cd, Cl, and Cr that are acquired from the area configuration unit 161 to calculate an up-down inclination α and a left-right inclination β by the following equations (6) and (7).

$$\alpha = (Cu-Cd)/(U+D) \quad (6)$$

$$\beta = (Cl-Cr)/(L+R) \quad (7)$$

In the case of the area A illustrated in FIG. 6, the inclination calculation unit 163 calculates α=−480 and β=−574 by applying the equations (6) and (7). The up-down inclination α indicates the change amount of the capacitance value in the up-down direction in the area A. The left-right inclination β indicates the change amount of the capacitance value in the left-right direction in the area A.

The inclination calculation unit 163 provides the values of α and β, in addition to the information that indicates the first capacitance map MAP1, the coordinates of the focus point (X, Y), and the area A and the values of Cm, Cu, Cd, Cl, and Cr, to the correction calculation unit 164.

(Correction Calculation Unit 164)

The correction calculation unit 164 calculates components of a matrix C2 that expresses the distribution of the corrected capacitances by the following equation (8).

$$C2[i][j]=C1[i][j]-Cm+j\times\alpha+i\times\beta \quad (8)$$

(where $-L \leq i \leq R$ and $-U \leq j \leq D$)

The correction calculation unit 164 calculates all the components of C2[i][j] by the equation (8) and thereafter generates a second capacitance map MAP2 that indicates the distribution of the capacitances expressed by the matrix C2.

The second term on the right side and the third term on the right side in the equation (8) indicate that a larger amount of correction is performed for the matrix C[i][j] as the point (i, j) in the area A becomes more distant from the origin (0, 0) (that is, the focus point (X, Y) on the first capacitance map MAP1).

The term j that is the multiplier of the third term on the right side of the equation (8) is also referred to as up-down position correction coefficient. The up-down position correction coefficient is 0 at the origin (0, 0). Further, the value of the up-down position correction coefficient decreases (increases) by 1 at each time when the position of the point (i, j) moves upward (downward) away from the origin (0, 0) by 1.

Further, the term i that is the multiplier of the fourth term on the right side of the equation (8) is also referred to as left-right position correction coefficient. The left-right position correction coefficient is 0 at the origin (0, 0). Further, the value of the left-right position correction coefficient decreases (increases) by 1 at each time when the position of the point (i, j) moves leftward (rightward) away from the origin (0, 0) by 1.

FIG. 7($a$) illustrates the matrix C1 of the first term on the right side of the equation (8). The components C1[$i$][$j$] of the matrix C1 may be referred to as uncorrected values of the capacitances in the area A. FIG. 7($b$) illustrates the matrix C2 of the first term on the left side of the equation (8). The components C2[$i$][$j$] of the matrix C2 may be referred to as corrected values of the capacitances in the area A. Accordingly, the second capacitance map MAP2 indicates the distribution of the corrected capacitances in the area A.

Figure 8:
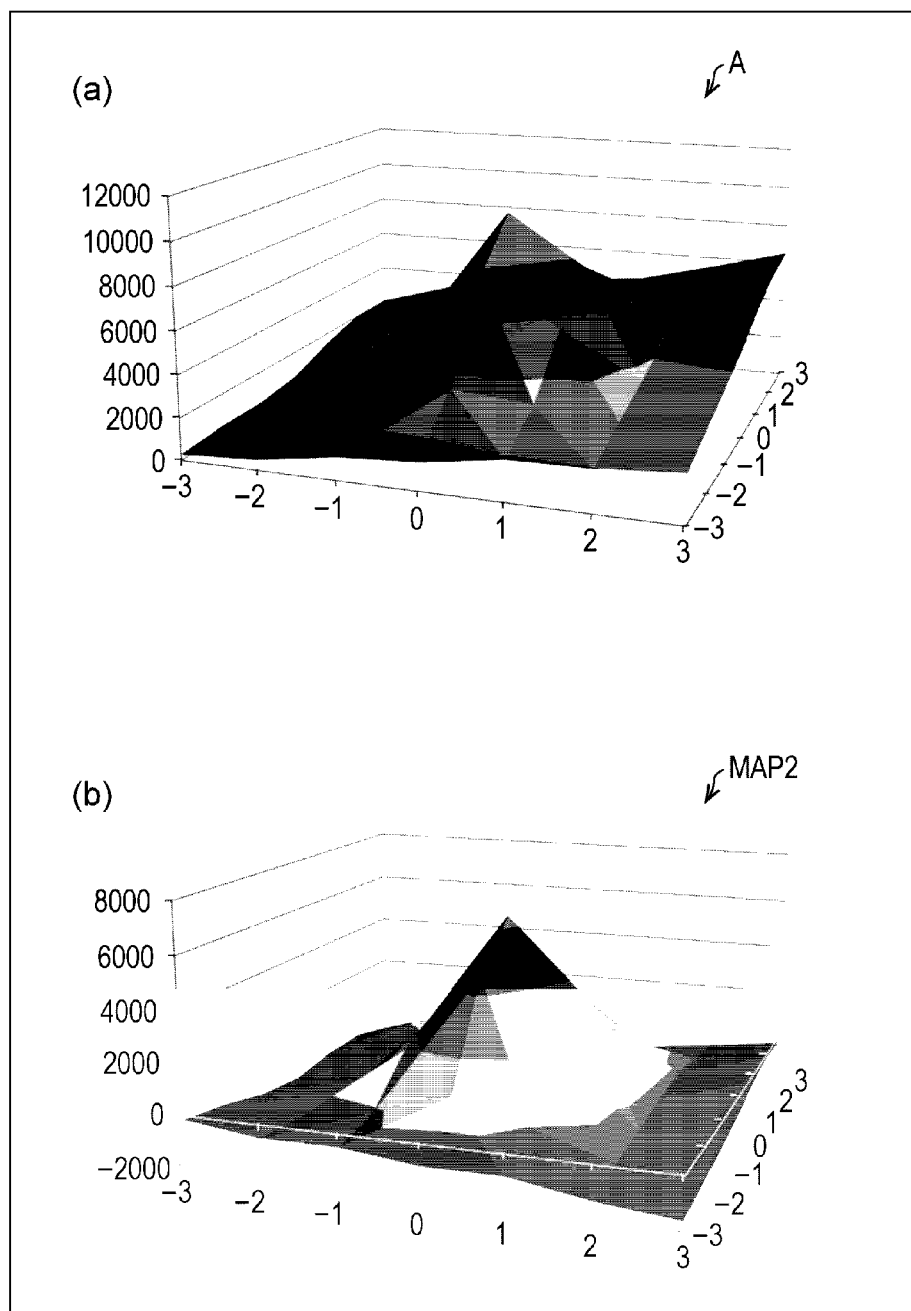
FIG. 8 is a diagram that exemplifies an uncorrected capacitance distribution and a corrected capacitance distribution according to the first embodiment of the present invention.

FIG. 8($a$) is a three-dimensional graph that exemplifies the capacitance distribution in the area A. FIG. 8($a$) exemplifies a case where rises of the capacitances occur due to bend of the touch panel 10.

FIG. 8($b$) is a graph that exemplifies the second capacitance map MAP2. FIG. 8($b$) indicates that the rises of the capacitances occurring in FIG. 8($a$) are effectually suppressed.

The correction calculation unit 164 provides the second capacitance map MAP2 to the second capacitance distribution storage unit 17. As described above, the coordinates of the input position is calculated by using the second capacitance map MAP2 in the touch panel controller 1.

Figure 10:
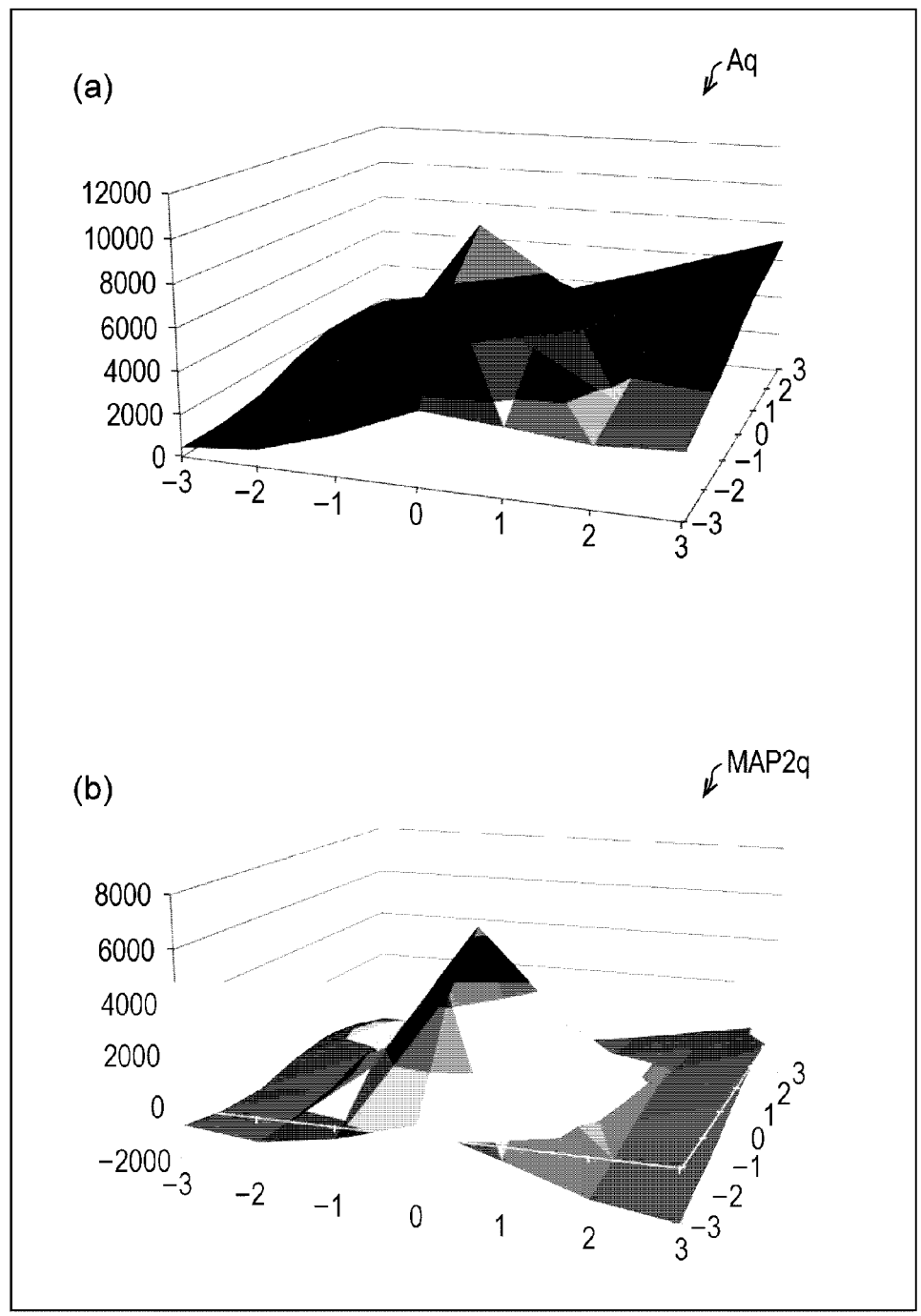
FIG. 10 is a diagram that exemplifies an uncorrected capacitance distribution and a corrected capacitance distribution according to the first embodiment of the present invention.

FIGS. 9 and 10 are diagrams that indicate effectiveness of the correction of this embodiment. FIG. 9($a$) exemplifies a case where (X, Y)=(5, 6) is selected as the focus point on the first capacitance map MAP1. In this case, because U=D=L=R=3 holds, an area Aq is configured as the rectangle that has four points (2, 3), (2, 9), (8, 3), and (8, 9) on the first capacitance map MAP1 as the vertices. The matrix that expresses the distribution of the capacitances in the area Aq will be referred to as matrix Cq. In the matrix Cq, Cu=2239, Cd=4130, Cl=1290, Cr=5207, $\alpha$=−315, and $\beta$=−653 hold.

FIG. 9($b$) indicates corrected capacitances C2$q$ that are obtained as a result of the correction calculation for the area Aq. A capacitance map that indicates the distribution of the capacitances expressed by a matrix C2$q$ will be referred to as second capacitance map MAP2$q$.

FIG. 10($a$) is a three-dimensional graph that exemplifies the capacitance distribution in the area Aq. Similarly to FIG. 8($a$), FIG. 10($a$) exemplifies a case where rises of the capacitances occur due to bend of the touch panel 10.

FIG. 10($b$) is a graph that exemplifies the second capacitance map MAP2$q$. Similarly to FIG. 8($b$), FIG. 10($b$) indicates that the rises of the capacitances are effectually suppressed.

Further, FIG. 11($a$) exemplifies a case where (X, Y)=(4, 4) is selected as the focus point on the first capacitance map MAP1. In this case, because U=D=L=R=3 holds, an area Ar is configured as the rectangle that has four points (1, 1), (1, 7), (7, 1), and (7, 7) on the first capacitance map MAP1 as the vertices. The matrix that expresses the distribution of the capacitances in the area Ar will be referred to as matrix Cr. In the matrix Cr, Cu=578, Cd=3826, Cl=572, Cr=3453, $\alpha$=−541, and $\beta$=−480 hold.

FIG. 11($b$) indicates corrected capacitances C2$r$ that are obtained as a result of the correction calculation for the area Ar. A capacitance map that indicates the distribution of the capacitances expressed by a matrix C2$r$ will be referred to as second capacitance map MAP2$r$.

Figure 12:
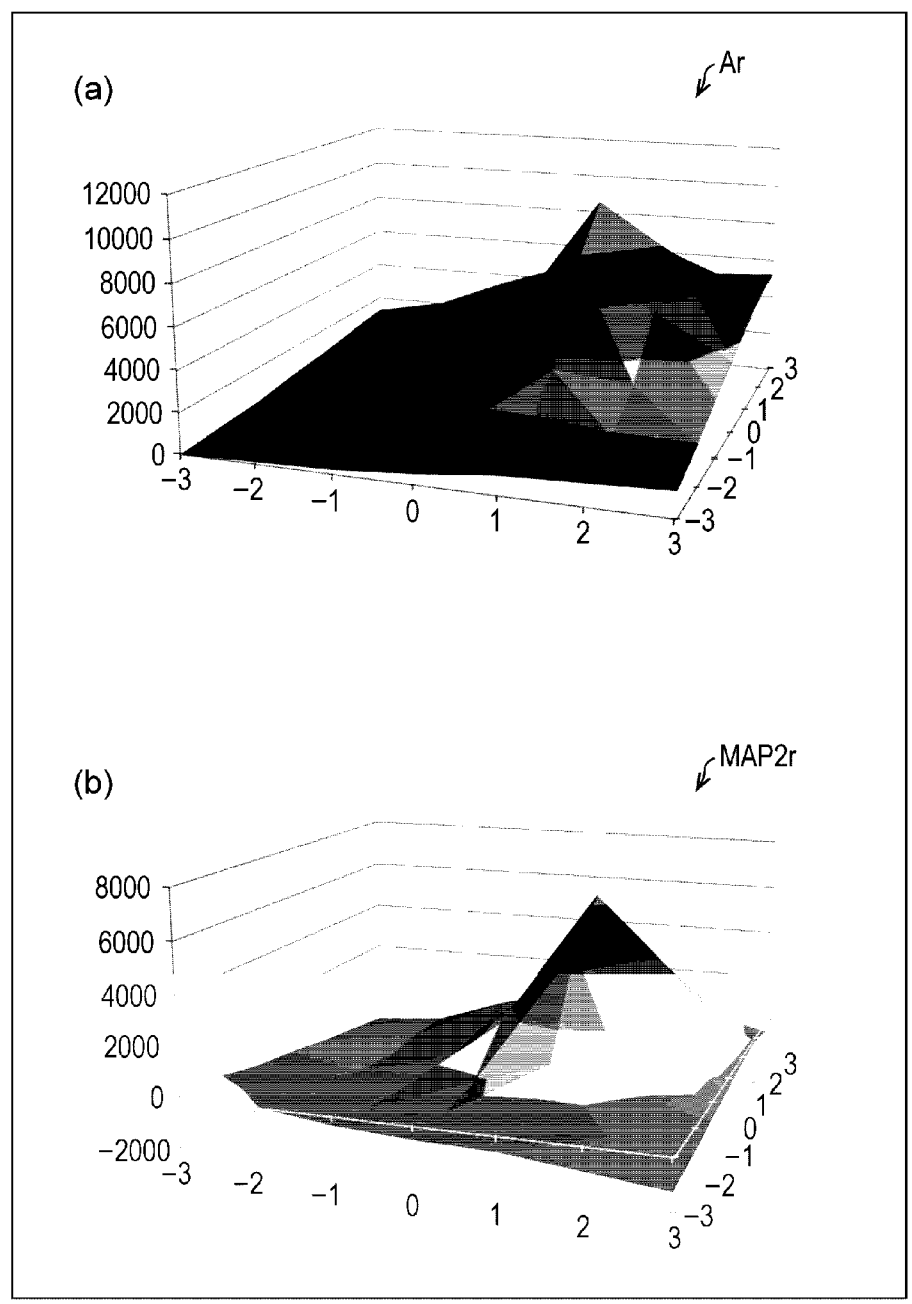
FIG. 12 is a diagram that exemplifies an uncorrected capacitance distribution and a corrected capacitance distribution according to the first embodiment of the present invention.

FIG. 12($a$) is a three-dimensional graph that exemplifies the capacitance distribution in the area Ar. Similarly to FIG. 8($a$), FIG. 12($a$) exemplifies a case where rises of the capacitances occur due to bend of the touch panel 10.

FIG. 12($b$) is a graph that exemplifies the second capacitance map MAP2$r$. Similarly to FIG. 8($b$), FIG. 12($b$) indicates that the rises of the capacitances are effectually suppressed.

(Process Flow of Calculating Coordinates of Input Position in Touch Sensor System 100)

Figure 13:
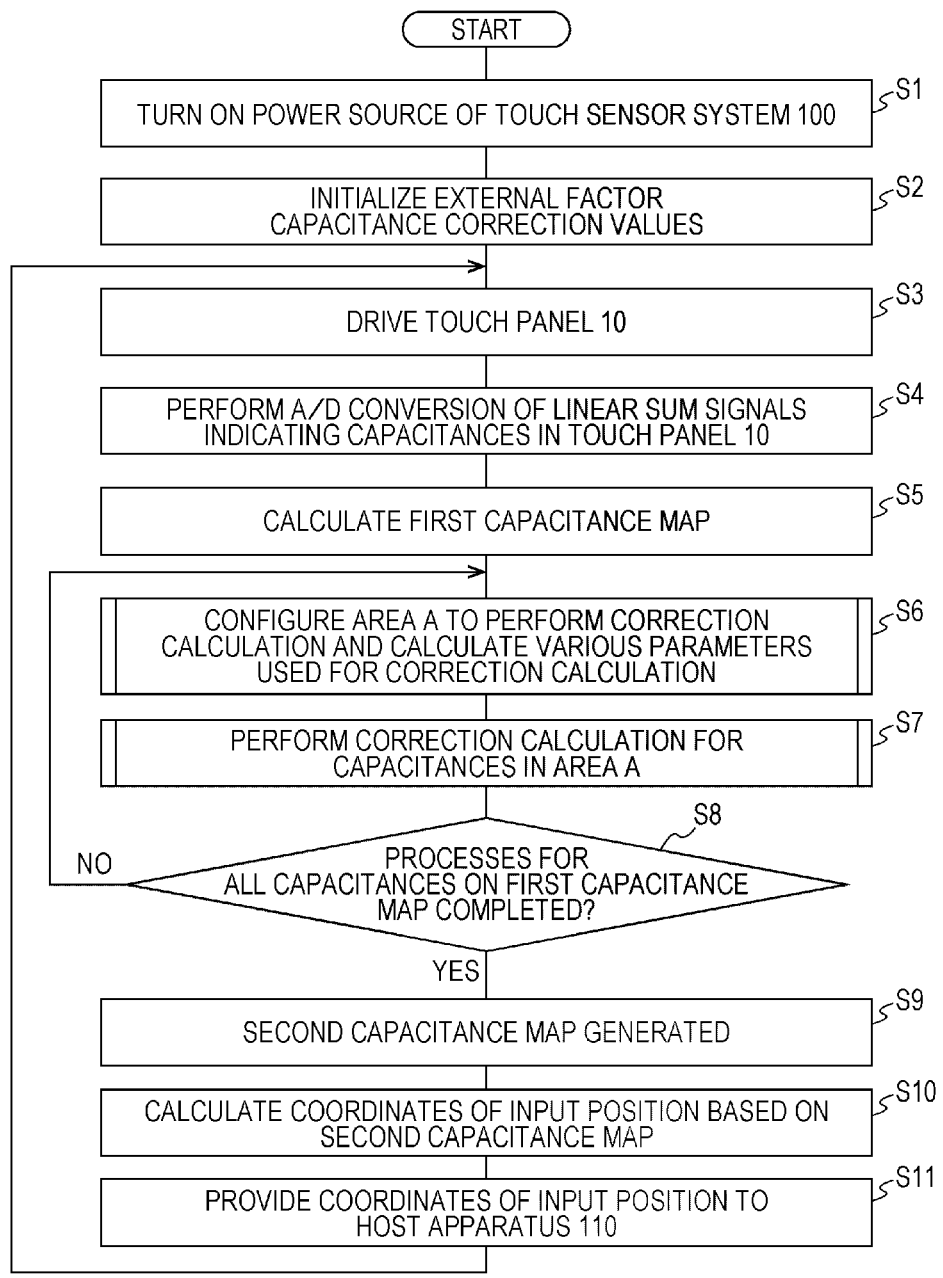
FIG. 13 is a flowchart that illustrates a process flow of calculating the coordinates of an input position in the touch sensor system according to the first embodiment of the present invention.

The process flow of calculating the coordinates of an input position in the touch sensor system 100 will be described below with reference to FIG. 13. FIG. 13 is a flowchart that exemplifies the process flow of calculating the coordinates of an input position in the touch sensor system 100.

First, a power source of the touch sensor system 100 is tuned on in order to start the touch sensor system 100 (process S1). Next, the first capacitance distribution correction unit 16 initializes external factor capacitance correction values (process S2).

The driver 11 drives the drive lines HL1 to HLn (process S3). Next, the sense amplifier 12 reads out the m linear sum signals Y1 to Ym, which are formed on the touch panel 10 and correspond to the (m×n) capacitances C1,1 to Cm,n, as analog signals from the sense lines VL1 to VLm and provides the m linear sum signals Y1 to Ym to the A/D converter 13.

The A/D converter 13 performs A/D conversion for linear sum signals Y1 to Ym as analog signals and provides the digitized linear sum signals Y1 to Ym to the first capacitance distribution calculation unit 15 (process S4).

The first capacitance distribution calculation unit 15 calculates the first capacitance map that indicates the distribution of the capacitances on the touch panel 10 based on the digitized linear sum signals Y1 to Ym (process S5). Next, the first capacitance distribution calculation unit 15 provides the first capacitance map to the first capacitance distribution correction unit 16.

The first capacitance distribution correction unit 16 configures the area A to perform the correction calculation in the first capacitance map. The first capacitance distribution correction unit 16 then calculates various parameters (above-described Cm, Cu, Cd, Cl, Cr, $\alpha$, and $\beta$) that are used for the correction calculation for the capacitances in the area A (process S6).

Next, the first capacitance distribution correction unit 16 performs the correction calculation by the above-described equation (8) for the capacitances in the area A (process S7). Details of processes S6 and S7 will be described later with reference to FIG. 14.

The first capacitance distribution correction unit 16 then confirms whether or not processes S6 and S7 are performed for all the capacitances on the first capacitance map (process S8). In a case where processes S6 and S7 are performed for not all the capacitances on the first capacitance map (NO in process S8), the process flow returns to process S6, and processes S6 and S7 in the first capacitance distribution correction unit 16 are repeated.

Processes S6 and S7 are performed for all the capacitances on the first capacitance map (YES in process S8), and the first capacitance distribution correction unit 16 thereby generates the second capacitance map (process S9). The second capacitance map is provided to the touch recognition unit 18 via the second capacitance distribution storage unit 17.

The touch recognition unit 18 determines whether or not an input by a touch by the finger or the stylus is applied to the touch panel 10 based on the second capacitance map. In a case where the touch recognition unit 18 determines that an input by a touch by the finger or the stylus is applied to the touch panel 10, the touch recognition unit 18 provides the second capacitance map to the input position calculation unit 19.

The input position calculation unit 19 calculates the coordinates of the input position that indicates the position, in which the input is applied to the touch panel 10, based on the second capacitance map provided from the touch recognition unit 18 (process S10). The input position calculation unit 19 then provides the coordinates of the input position to the host apparatus 110 that is provided on the outside of the touch sensor system 100 (process S11).

The coordinates of the input position in the touch sensor system 100 are calculated and provided to the host apparatus 110 by the above-described processes S1 to S11. After process S11 is finished, the process flow returns to process S3, and processes S3 to S11 are repeated during the period in which the power source of the touch sensor system 100 is turned on.

(Process Flow of Correcting Capacitance Values in First Capacitance Distribution Correction Unit 16)

Figure 14:
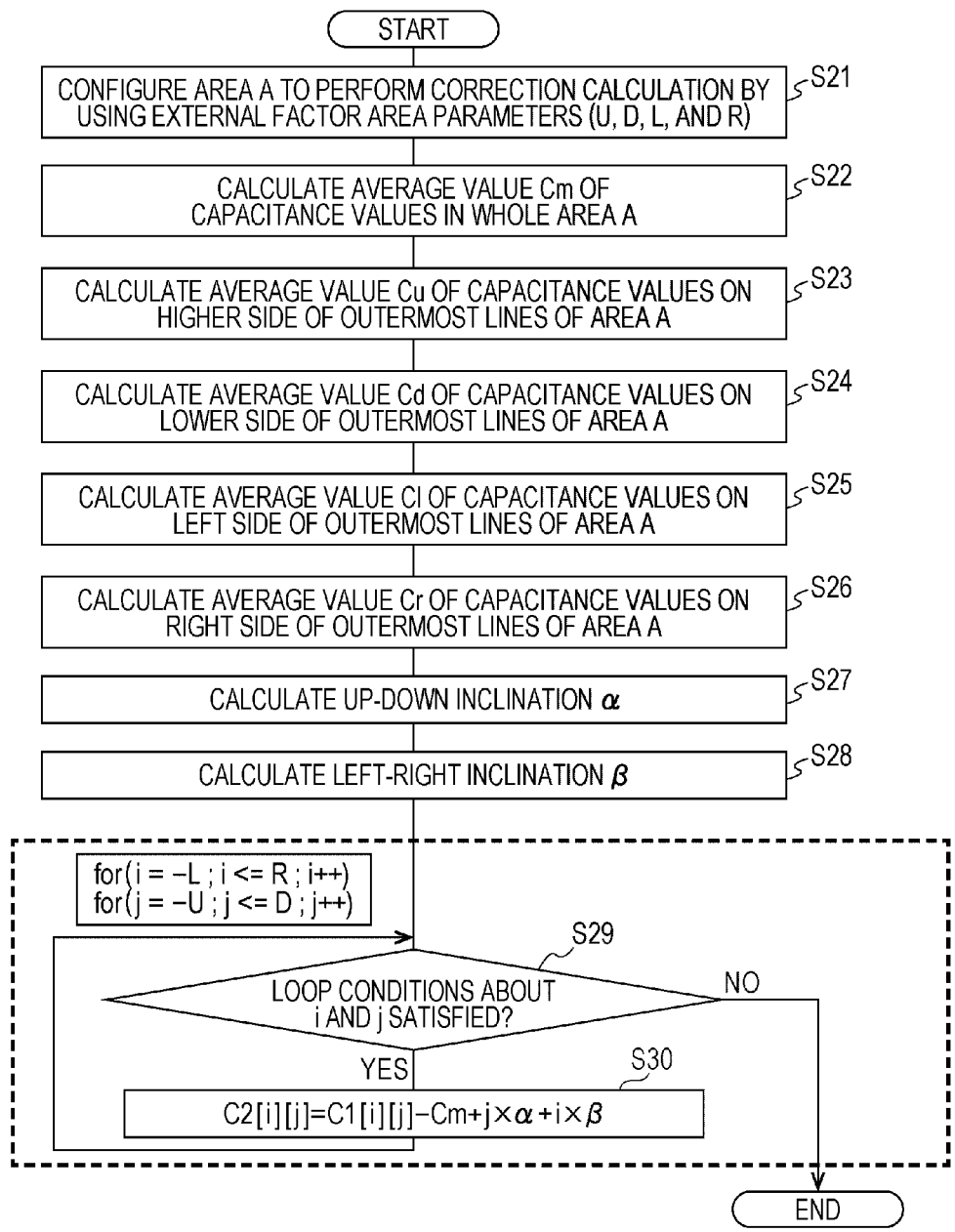
FIG. 14 is a flowchart that illustrates a process flow of correcting capacitance values in the touch sensor system according to the first embodiment of the present invention.

FIG. 14 is a flowchart that exemplifies details of processes S6 and S7 (that is, the processes of correcting the capacitance values on the first capacitance map) in the first capacitance distribution correction unit 16, which are illustrated in FIG. 13. A description will be made below about a process flow of the units included in the first capacitance distribution correction unit 16.

The area configuration unit 161 identifies one point on the first capacitance map as the focus point (X, Y). The area configuration unit 161 uses the values of the external factor area parameters U, D, L, and R to configure the area A for which the correction calculation for the first capacitance map is performed (see FIGS. 4 and 5) (process S21).

Next, the average value calculation unit 162 calculates (i) the average value Cm of the capacitances in the whole area A by the equation (1) (process S22), (ii) the average value Cu of the capacitances on the highest side of the area A by the equation (2) (process S23), (iii) the average value Cd of the capacitances on the lowest side of the area A by the equation (3) (process S24), (iv) the average value Cl of the capacitances on the leftmost side of the area A by the equation (4) (process S25), and (v) the average value Cr of the capacitances on the rightmost side of the area A by the equation (5) (process S26) (see FIG. 6).

The order of processes S22 to S26 for calculating the values of Cm, Cu, Cd, Cl, and Cr is not limited to this but may appropriately be changed. For example, the order may be process S26→process S25→process S24→process S23→process S22.

Next, the inclination calculation unit 163 calculates (i) the up-down inclination α by the equation (6) (process S27) and (ii) the left-right inclination β by the equation (7) (process S28) (see FIG. 6). The order of processes S27 and S28 is not limited to this. Thus, the values of the up-down inclination α and the left-right inclination β may be calculated in the order of process S28→process S27.

Next, loop conditions for calculating C2[$i$][$j$] in the equation (8) are configured by the correction calculation unit 164. That is, the loop conditions are configured as for (i=−L, i≤R, and i++) and for (j=−U, −j≤D, and j++). Process S30 is then performed in the ranges of i and j where the loop conditions are satisfied (process S29).

The correction calculation unit 164 calculates the components C2[$i$][$j$] of the matrix C2 that expresses the distribution of the corrected capacitances by the equation (8) (process S30). In a case where the loop conditions about i and j are satisfied (YES in S29), process S30 is repeatedly executed.

When process S30 is performed for all i and j and the loop conditions about i and j are not satisfied (NO in S29), all the components C2[$i$][$j$] of the matrix C2 are calculated. Next, process S8 and later processes in FIG. 13 are executed.

(Effectiveness of Correction by Touch Sensor System 100)

Effectiveness of the correction by using the equation (8) in the touch sensor system 100 in this embodiment will be described below with reference to FIGS. 15 to 20.

Figure 15:
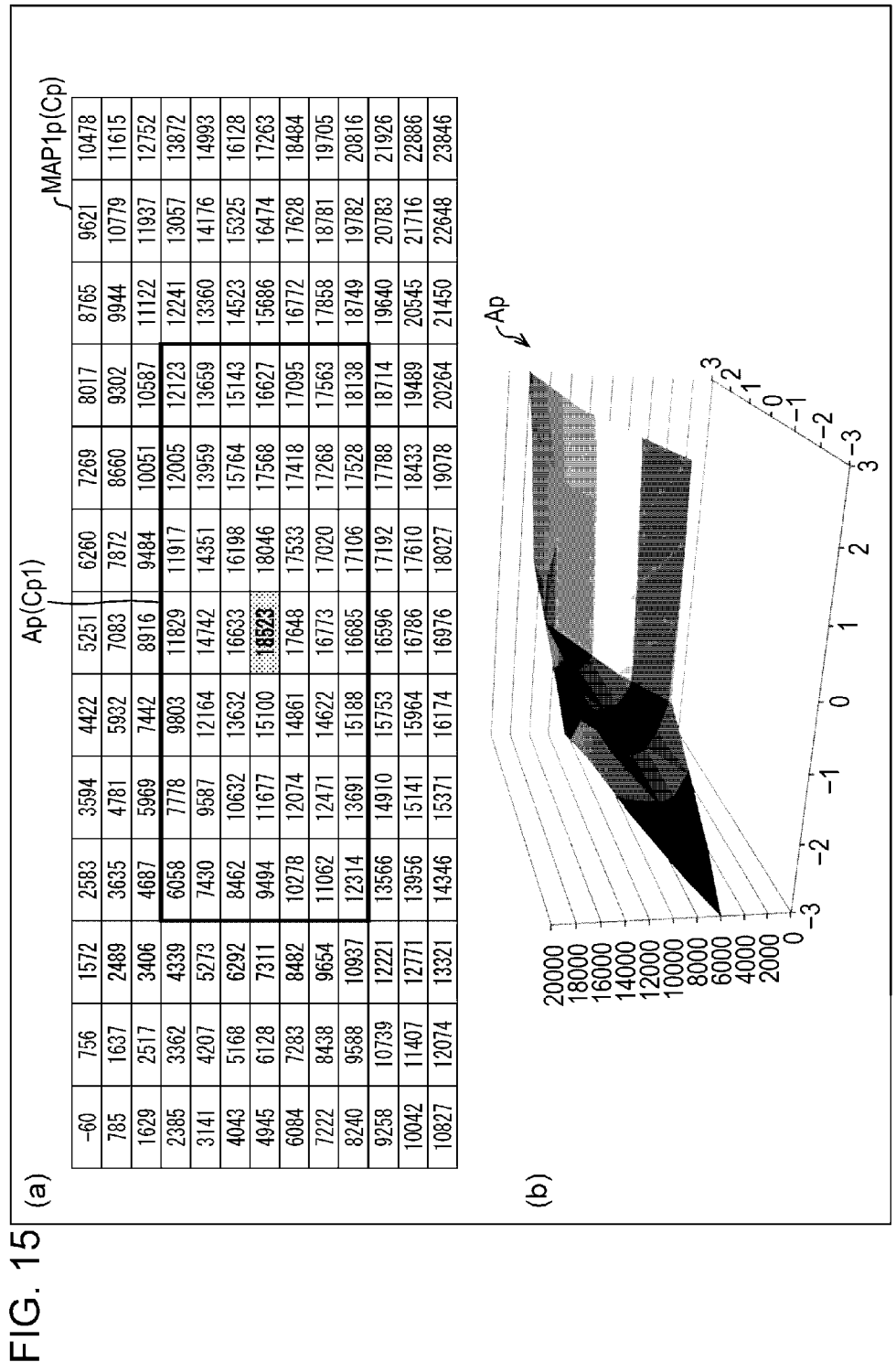
FIG. 15 is a diagram that exemplifies a matrix that expresses uncorrected capacitances and a capacitance distribution according to the first embodiment of the present invention.

FIG. 15($a$) is a diagram that exemplifies the first capacitance map MAP1$p$. The local maximum value "18523" of the capacitance is stored in the seventh row and the seventh column on the first capacitance map MAP1$p$, and the coordinates of the focus point on the first capacitance map MAP1$p$ are (X, Y)=(7, 7). Further, an area Ap is configured as the rectangle that has four points (4, 4), (4, 10), (10, 4), and (10, 10) on the first capacitance map MAP1$p$ as the vertices.

Here, the matrix that expresses the distribution of the capacitances on the first capacitance map MAP1$p$ will be referred to as matrix Cp, and the matrix that expresses the distribution of the capacitances in the area Ap will be referred to as matrix Cp1. FIG. 15($b$) is a three-dimensional graph that exemplifies the capacitance distribution in the area Ap. Various kinds of correction calculation for the area Ap will be described below.

Figure 16:
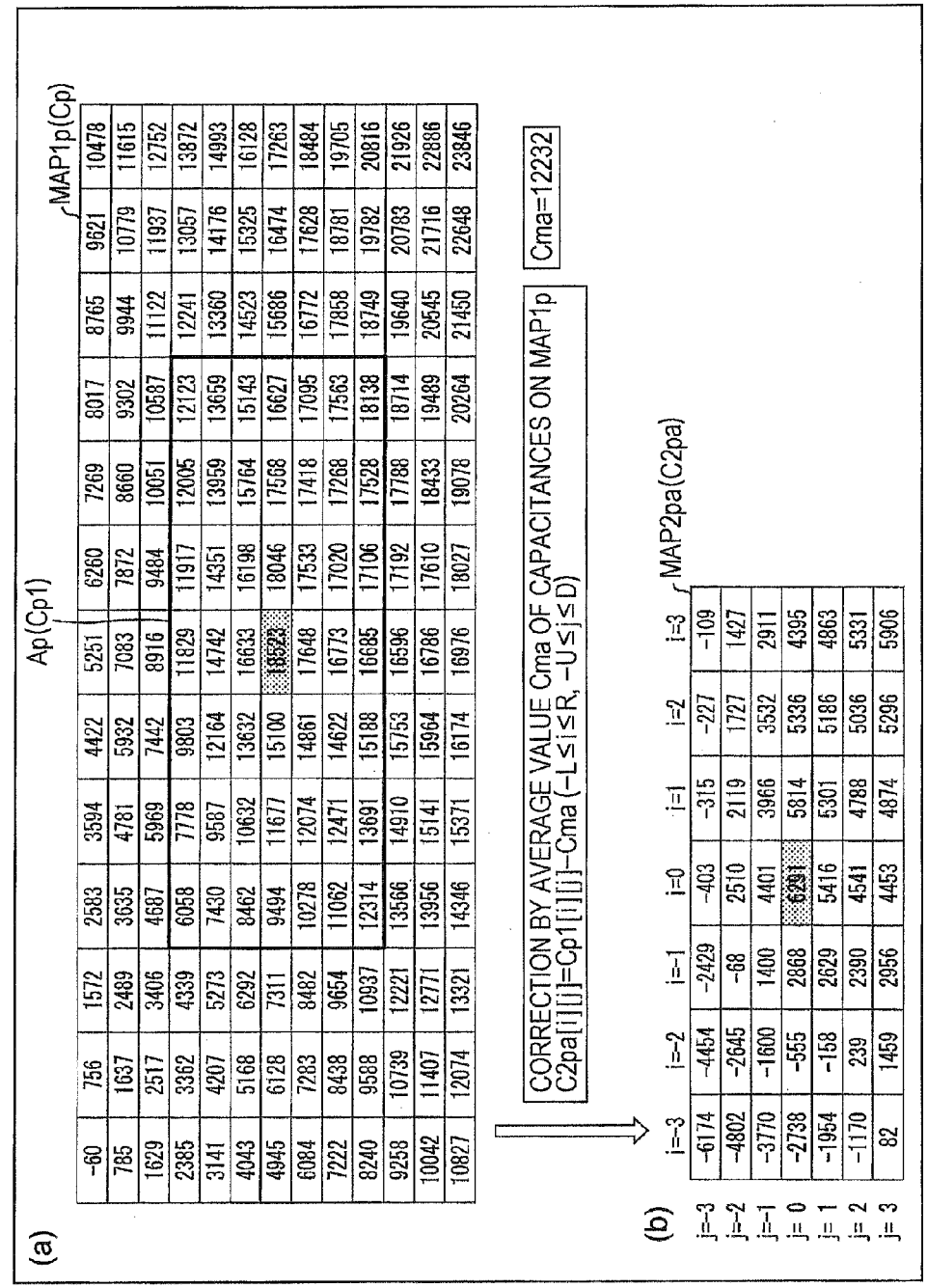
FIG. 16 is a diagram that exemplifies a matrix that expresses capacitances which are obtained as a result of different correction calculation from correction calculation according to the first embodiment of the present invention.

FIG. 16 is a diagram that exemplifies the correction by using an average value Cma of all the capacitances on the first capacitance map MAP1$p$. The correction illustrated in FIG. 16 may be considered as correction that performs offset for the whole. FIG. 16($a$) is a diagram similar to FIG. 15($a$) and indicates the capacitances Cp and Cp1 for which the correction calculation is not yet performed.

FIG. 16($b$) indicates corrected capacitances C2$pa$ that are obtained as a result of the correction calculation for the area Ap. A capacitance map that indicates the distribution of the capacitances expressed by a matrix C2$pa$ will be referred to as second capacitance map MAP2$pa$.

The components of a matrix C2$pa$ that expresses the distribution of the corrected capacitances in FIG. 16($b$) are calculated by the following equation (9).

$$C2pa[i][j]=Cp1[i][j]-Cma \qquad (9)$$

(where −L≤i≤R and −U≤j≤D)

In FIG. 16, Cma=12232 holds.

Figure 17:
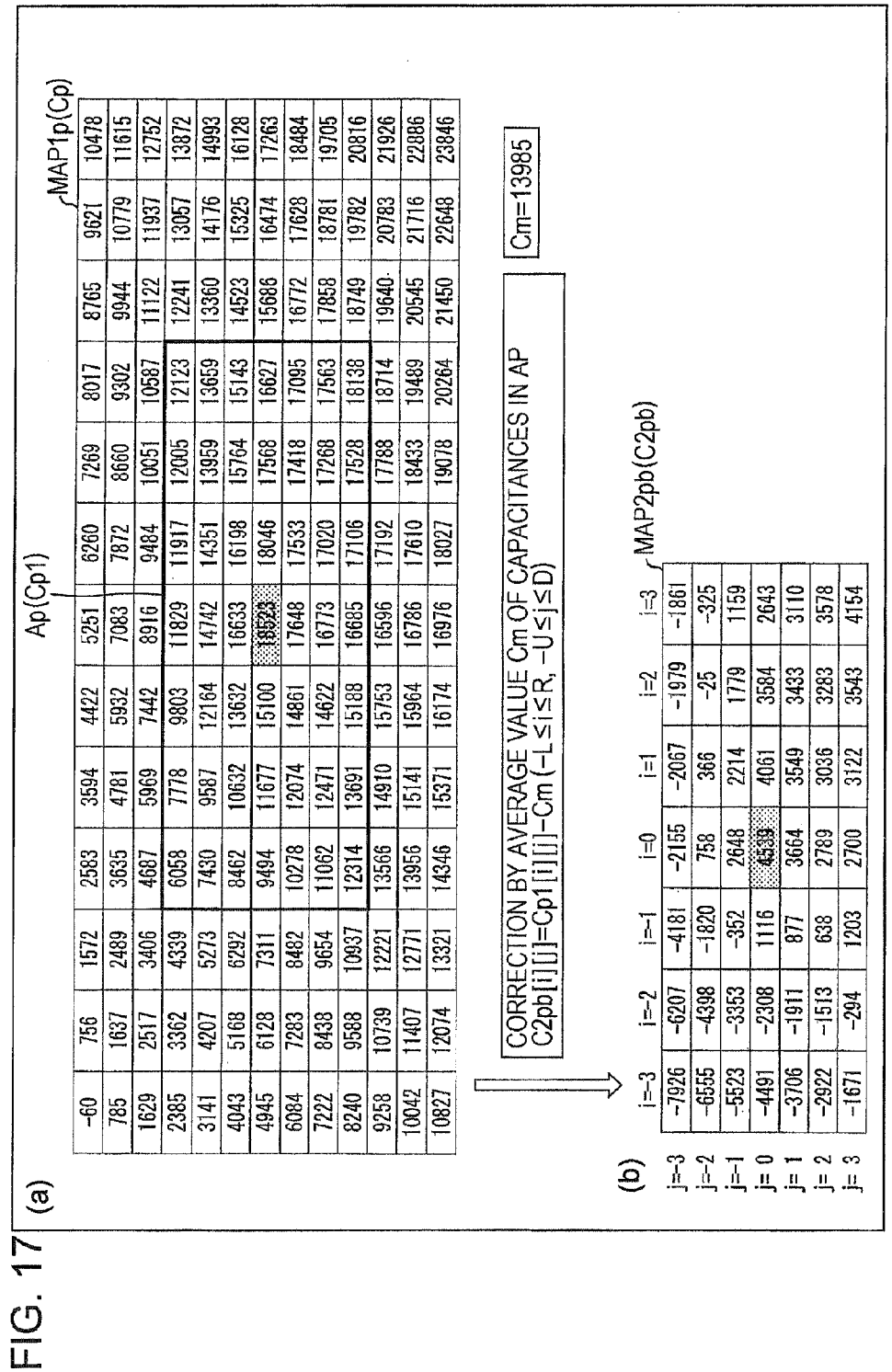
FIG. 17 is a diagram that exemplifies a matrix that expresses capacitances which are obtained as a result of different correction calculation from the correction calculation according to the first embodiment of the present invention.

FIG. 17 is a diagram that exemplifies the correction by using the average value Cm of all the capacitances in the area Ap. The correction illustrated in FIG. 17 may be considered as correction that performs partial offset. FIG. 17($a$) is a diagram similar to FIG. 15($a$) and indicates the capacitances Cp and Cp1 for which the correction calculation is not yet performed.

FIG. 17($b$) indicates corrected capacitances C2$pb$ that are obtained as a result of the correction calculation for the area Ap. A capacitance map that indicates the distribution of the capacitances expressed by a matrix Cp2$pb$ will be referred to as second capacitance map MAP2$pb$.

The components of a matrix C2*pb* that expresses the distribution of the corrected capacitances in FIG. 17(*b*) are calculated by the following equation (10).

$$C2pb[i][j]=Cp1[i][j]-Cm \qquad (10)$$

(where $-L \leq i \leq R$ and $-U \leq j \leq D$)

In FIG. 17, Cm=13985 holds.

FIG. 18 is a diagram that exemplifies the correction by using the average value Cm of all the capacitances in the area Ap and the up-down inclination α. The correction illustrated in FIG. 18 may be considered as correction that performs offset focusing on a drive direction of the touch panel 10 in addition to partial offset. FIG. 18(*a*) is a diagram similar to FIG. 15(*a*) and indicates the capacitances Cp and Cp1 for which the correction calculation is not yet performed.

FIG. 18(*b*) indicates corrected capacitances C2*pc* that are obtained as a result of the correction calculation for the area Ap. A capacitance map that indicates the distribution of the capacitances expressed by a matrix C2*pc* will be referred to as second capacitance map MAP2*pc*.

The components of a matrix C2*pc* that expresses the distribution of the corrected capacitances in FIG. 18(*b*) are calculated by the following equation (11).

$$C2pc[i][j]=Cp1[i][j]-Cm+j\times\alpha \qquad (11)$$

(where $-L \leq i \leq R$ and $-U \leq j \leq D$)

In FIG. 18, Cm=13985 and α=−932 hold.

Figure 19:
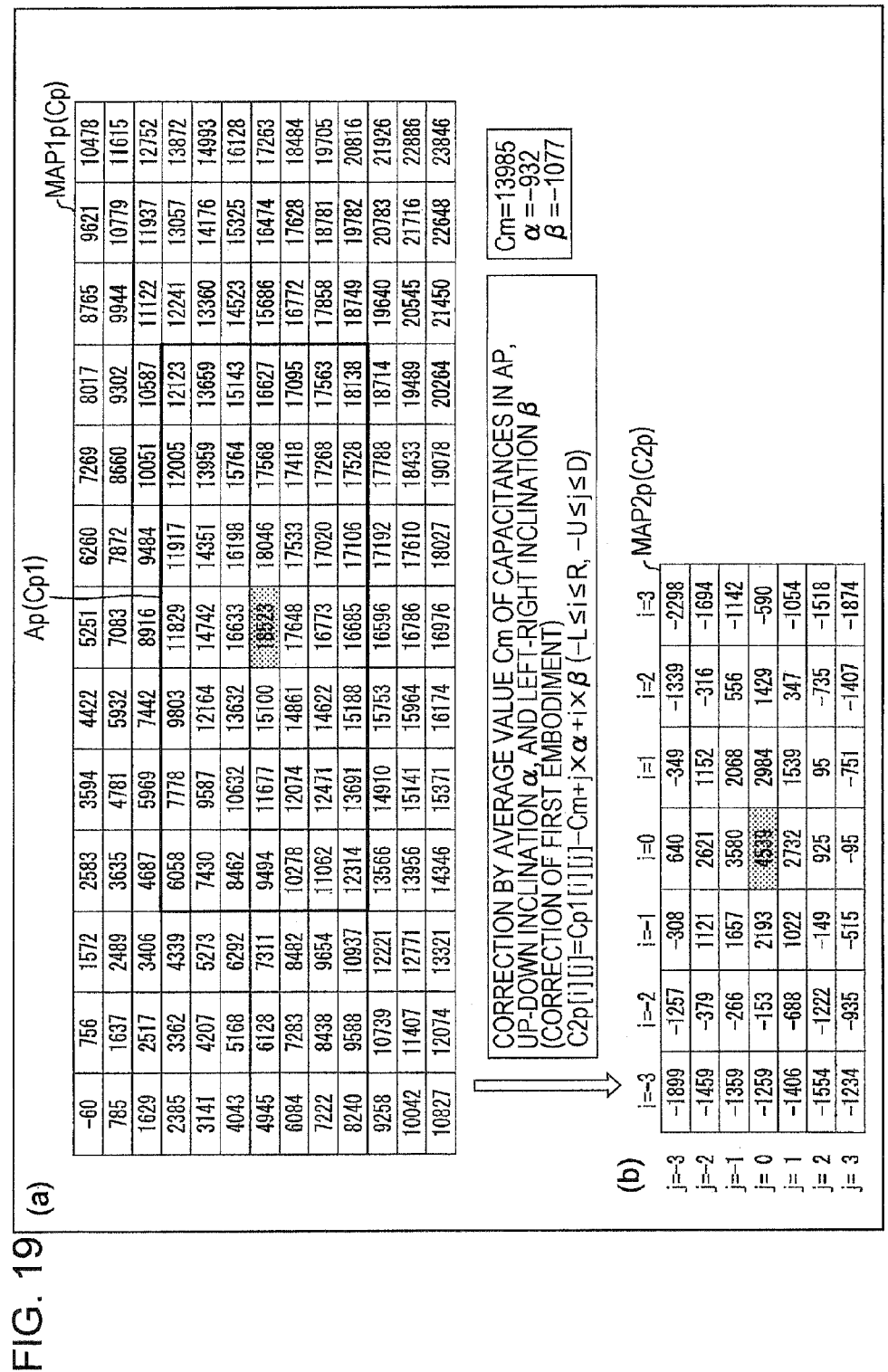
FIG. 19 is a diagram that exemplifies a matrix that expresses capacitances which are obtained as a result of the correction calculation according to the first embodiment of the present invention.

Meanwhile, FIG. 19 is a diagram that exemplifies the correction by the equation (8), that is, the correction by using the average value Cm of all the capacitances in the area Ap, the up-down inclination α, and the left-right inclination β. FIG. 19(*a*) is a diagram similar to FIG. 15(*a*) and indicates the capacitances Cp and Cp1 for which the correction calculation is not yet performed.

FIG. 19(*b*) indicates corrected capacitances C2*p* that are obtained as a result of the correction calculation for the area Ap. A capacitance map that indicates the distribution of the capacitances expressed by a matrix C2*p* will be referred to as second capacitance map MAP2*p*. The components of the matrix C2*p* that expresses the distribution of the corrected capacitances in FIG. 19(*b*) are calculated by the above-described equation (8). In FIG. 19, Cm=13985, α=−932, and β=−1077 hold.

Figure 20:
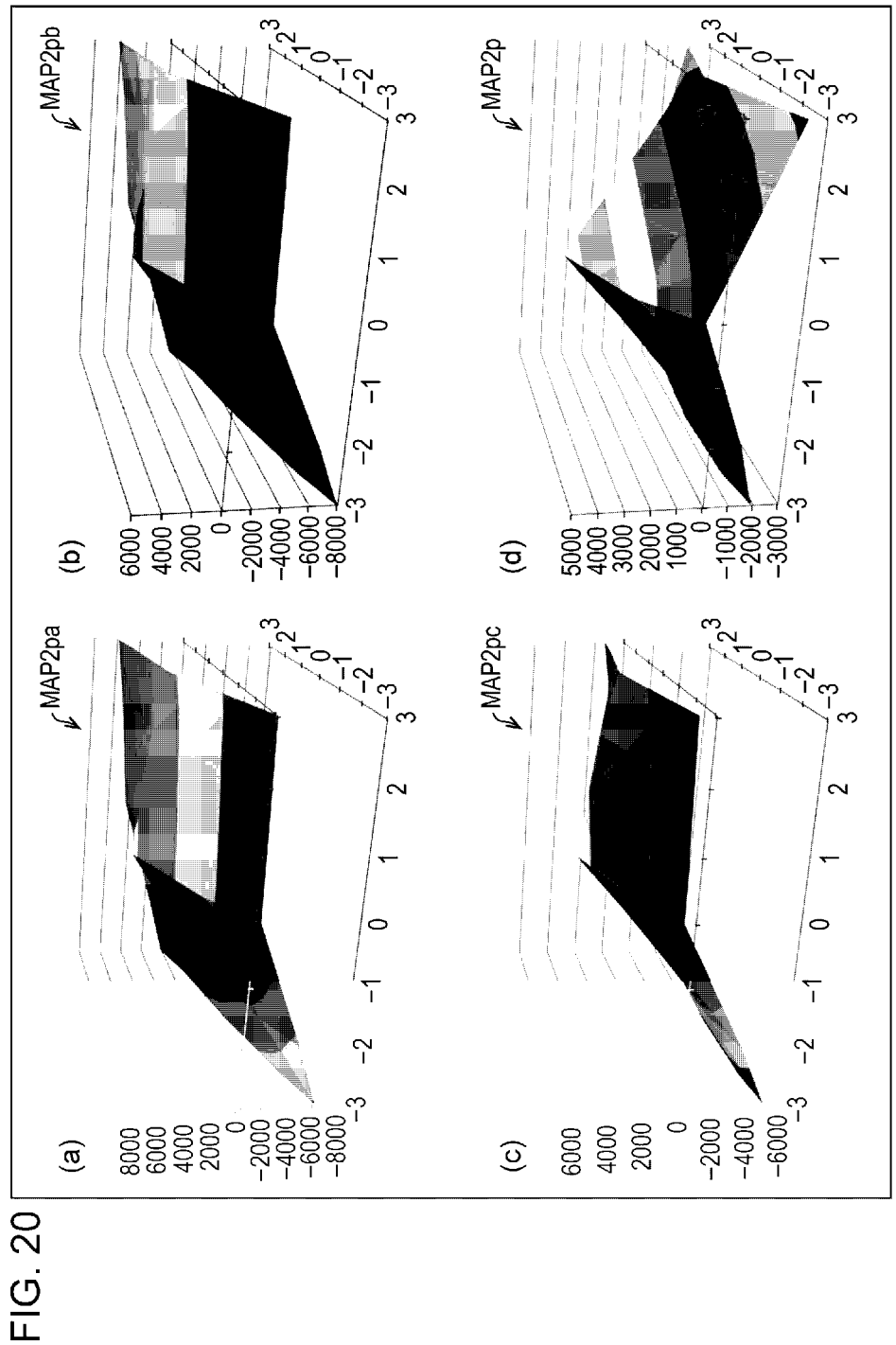
FIG. 20 is a diagram that exemplifies the distributions of corrected capacitances that are expressed by the matrices in FIGS. 16 to 19.

FIG. 20 is a diagram for comparing the effects of the above-described kinds of correction with each other. FIG. 20(*a*) exemplifies the second capacitance map MAP2*pa*, FIG. 20(*b*) exemplifies the second capacitance map MAP2*pb*, FIG. 20(*c*) exemplifies the second capacitance map MAP2*pc*, and FIG. 20(*d*) exemplifies the second capacitance map MAP2*p* as three-dimensional graphs that represent the capacitance distributions.

Referring to FIG. 20(*d*), the capacitance distribution illustrated in FIG. 15(*b*) becomes a distribution in which the rises of the capacitances are particularly suppressed by the correction by the equation (8) and the peak may easily be distinguished. Accordingly, it may be considered that the capacitance distribution is most effectually corrected by the correction by the equation (8).

In general, the range of change in the capacitance in a case where bend of the touch panel 10 occurs may be considered to be broader compared to the range of change in the capacitance in a case where a touch input by the finger or the stylus is performed on the touch panel 10.

Accordingly, it is understood that external factor area parameters U, D, L, and R are preferably selected such that the broader range compared to the range of change in the capacitance in a case where a touch input is performed on the touch panel 10 is configured as the area A to perform the correction and thereby the correction by the equation (8) particularly effectually works.

The correction by the equation (8) may correct the values of the capacitances for the range of change in the capacitance in a case where bend occurs to the touch panel 10, which is much broader than the range of change in the capacitance that is caused by performance of a touch input on the touch panel 10. Accordingly, the change in the capacitance due to bend of the touch panel 10 may be canceled, and the change in the capacitance due to a touch input on the touch panel 10 may be maintained.

The external factor area parameters U, D, L, and R are preferably set to relatively small values. This is because an accuracy improvement in the correction calculation is expected by having the area A with a narrower range.

Accordingly, the values of the external factor area parameters U, D, L, and R are preferably selected such that the dimension of the area A becomes the minimum dimension that contains the range of change in the capacitance in a case where a touch input is performed on the touch panel 10. The values U=D=L=R=3 are examples of preferable values of the external factor area parameters U, D, L, and R.

In general, the range of change in the capacitance in a case where the touch panel 10 is exposed to noise such as electromagnetic waves is assumed to be narrower compared to the range of change in the capacitance in a case where a touch input by the finger or the stylus is performed on the touch panel 10. Accordingly, the correction by the equation (8) may be considered to be particularly effectual as the correction calculation for the change in the capacitance due to bend of the touch panel.

Figure 21:
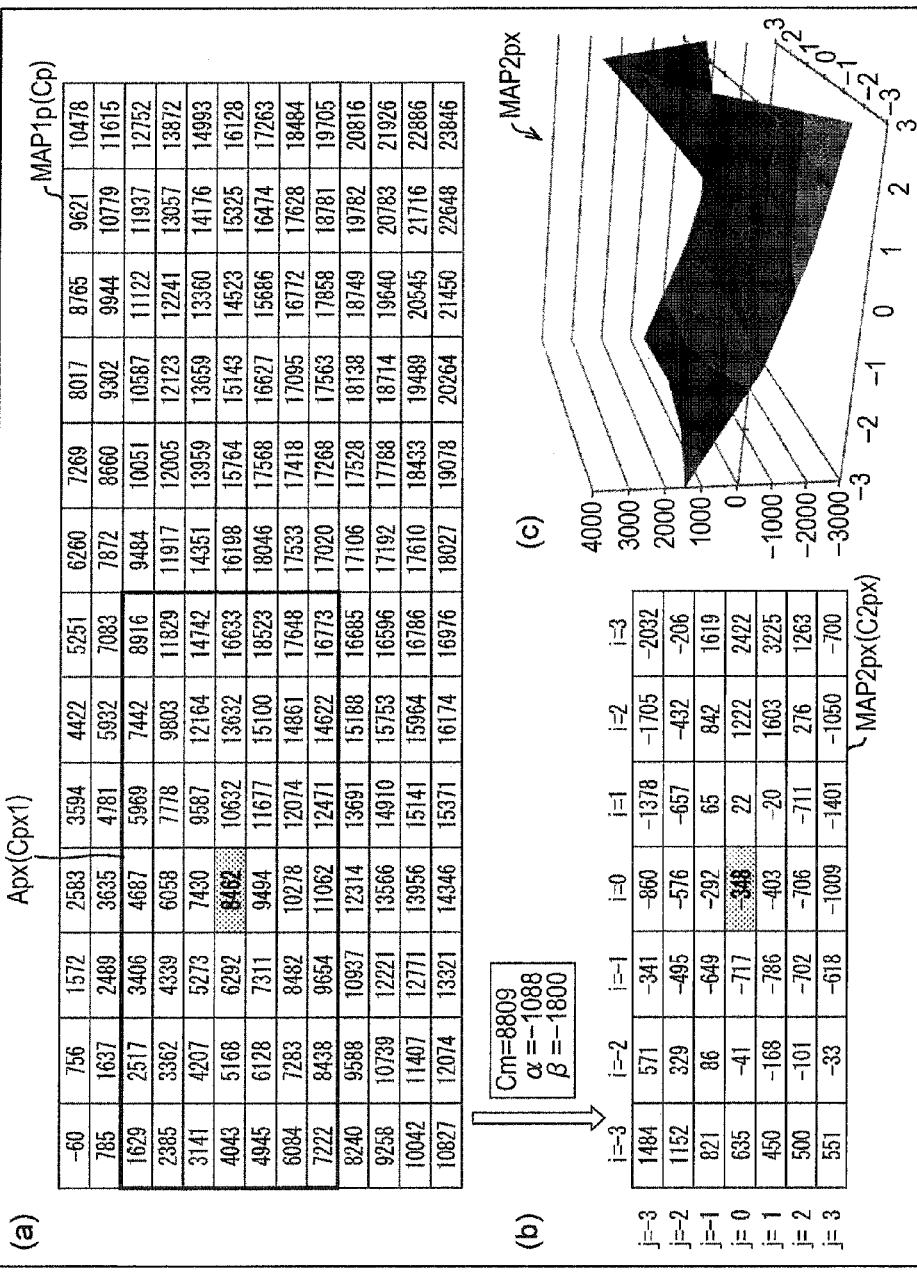
FIG. 21 is a diagram that exemplifies an effect of the correction calculation according to the first embodiment of the present invention.

FIG. 21 is a diagram that exemplifies results of the correction calculation in a case where a different focus point from FIG. 19 is used on the first capacitance map MAP1*p*. FIG. 21(*a*) is a diagram that exemplifies the first capacitance map MAP1*p*. Here, a case will be discussed where (X, Y)=(4, 6) are selected as the coordinates of the focus point on the first capacitance map MAP1*p*. A capacitance value "8462" is stored in the focus point in FIG. 21(*a*).

In FIG. 21(*a*), an area Apx is configured as the rectangle that has four points (1, 3), (1, 9), (7, 3), and (7, 9) on the first capacitance map MAP1*p* as the vertices. Here, the matrix that expresses the distribution of the capacitances in the area Apx will be referred to as matrix Cpx1.

FIG. 21(*b*) exemplifies a corrected matrix C2*px* that is generated as a result of application of the correction calculation by the equation (8) to the matrix Cpx1. In FIG. 21, Cm=8809, α=−1088, and β=−1800 hold. A capacitance map that indicates the distribution of the capacitances expressed by a matrix C2*px* will be referred to as second capacitance map MAP2*px*.

FIG. 21(*c*) exemplifies the second capacitance map MAP2*px*. FIG. 21(*c*) indicates that the peak of the capacitance distribution on the second capacitance map MAP2*px* is present at a point (3, 1) (that is, the position that corresponds to a point (7, 7) on the first capacitance map MAP1*p*). Accordingly, a determination is made that a point (0, 0) on the second capacitance map MAP2*px* is not an input position.

Figure 22:
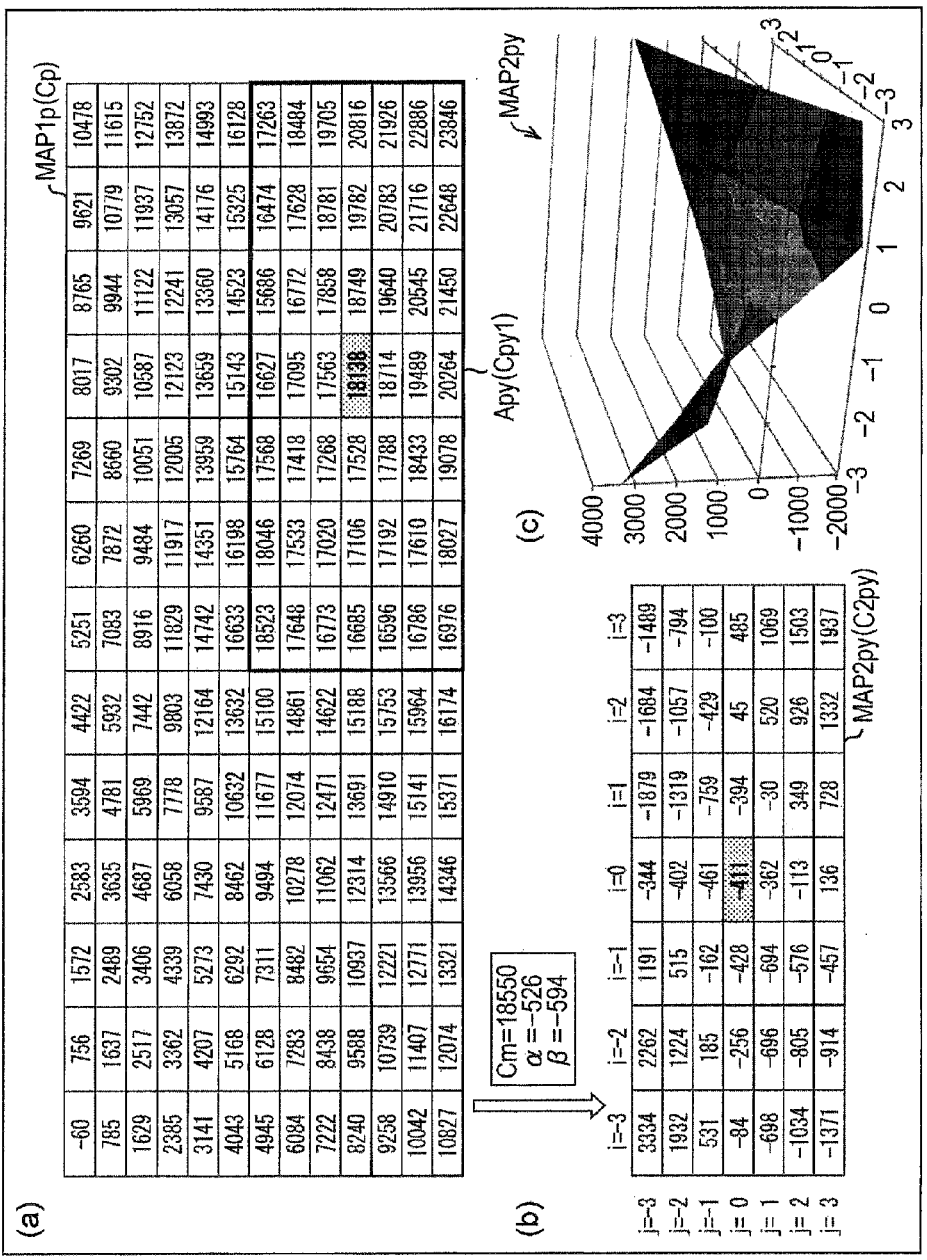
FIG. 22 is a diagram that exemplifies an effect of the correction calculation according to the first embodiment of the present invention.

Further, FIG. 22 is a diagram that exemplifies results of the correction calculation in a case where a different focus point from FIG. 19 is used on the first capacitance map MAP1*p*. FIG. 22(*a*) is a diagram that exemplifies the first capacitance map MAP1*p*. Here, a case will be discussed where (X, Y)=(10, 10) are selected as the coordinates of the focus point on the first capacitance map MAP1p. A capacitance value "18138" is stored in the focus point in FIG. 22(a).

In FIG. 22(a), an area Apy is configured as the rectangle that has four points (7, 7), (7, 13), (13, 7), and (13, 13) on the first capacitance map MAP1p as the vertices. Here, the matrix that expresses the distribution of the capacitances in the area Apy will be referred to as matrix Cpy1.

FIG. 22(b) exemplifies a corrected matrix C2py that is generated as a result of application of the correction calculation by the equation (8) to the matrix Cpy1. In FIG. 22, Cm=18550, α=−526, and β=−594 hold. A capacitance map that indicates the distribution of the capacitances expressed by the matrix C2py will be referred to as second capacitance map MAP2py.

FIG. 22(c) exemplifies the second capacitance map MAP2py. FIG. 22(c) indicates that the peak of the capacitance distribution on the second capacitance map MAP2py is present at a point (−3, −3) (that is, the position that corresponds to a point (7, 7) on the first capacitance map MAP1p). Accordingly, a determination is made that a point (0, 0) on the second capacitance map MAP2py is not an input position.

Thus, referring to FIGS. 19, 21, and 22, it is understood that a determination is made that the point on the first capacitance map MAP1p, at which the local maximum value "18523" is present, is not an input position because of the correction calculation by the equation (8).

Referring to FIGS. 20 and 22 particularly, it is understood that using a correction method of this embodiment may inhibit an incorrect determination that the point that is present with a value close to the peak value of the capacitance distribution is the input position.

(Effects of Touch Sensor System 100)

As illustrated in FIGS. 8(b), 10(b), 12(b), and 20(d), the touch sensor system 100 of this embodiment may provide the second capacitance map (for example, the second capacitance map MAP2) on which the rises of the capacitances due to bend of the touch panel 10 are suppressed.

For example, the touch sensor system 100 provides an effect of enabling accurate detection of the input position by calculating the coordinates of the input position, using the second capacitance map MAP2, even in a case where the touch panel is dynamically bending.

Further, in the touch sensor system 100, the first capacitance distribution correction unit 16 generates (m×n) second signal value maps that correspond to the components of the matrix C which expresses the first capacitance map MAP1. Accordingly, the first capacitance distribution correction unit 16 generates the second signal value maps that respectively correspond to (m×n) signal values which are distributed on the touch panel 10.

Thus, the touch sensor system 100 provides an effect of enabling the correction calculation to be individually performed around input positions even in a case where inputs are made in plural positions on the touch panel 10.

In general, in the touch panel 10, intervals among the drive lines HL1 to HLn and intervals among the sense lines VL1 to VLm are sufficiently small compared to the size of a finger or a stylus. Accordingly, it is unlikely that input operations in plural positions on the touch panel 10 are associated with the same capacitance Cm,n. Thus, the touch sensor system 100 of this embodiment may individually perform the correction calculation around each of the input positions as described above.

[Second Embodiment]

Another embodiment of the present invention will be described below based on FIGS. 23 to 30. For convenience of description, the same reference characters will be given to members that have the same functions as the members described in the above embodiment, and descriptions thereof will not be made.

(Configuration of Touch Sensor System 200)

Figure 23:
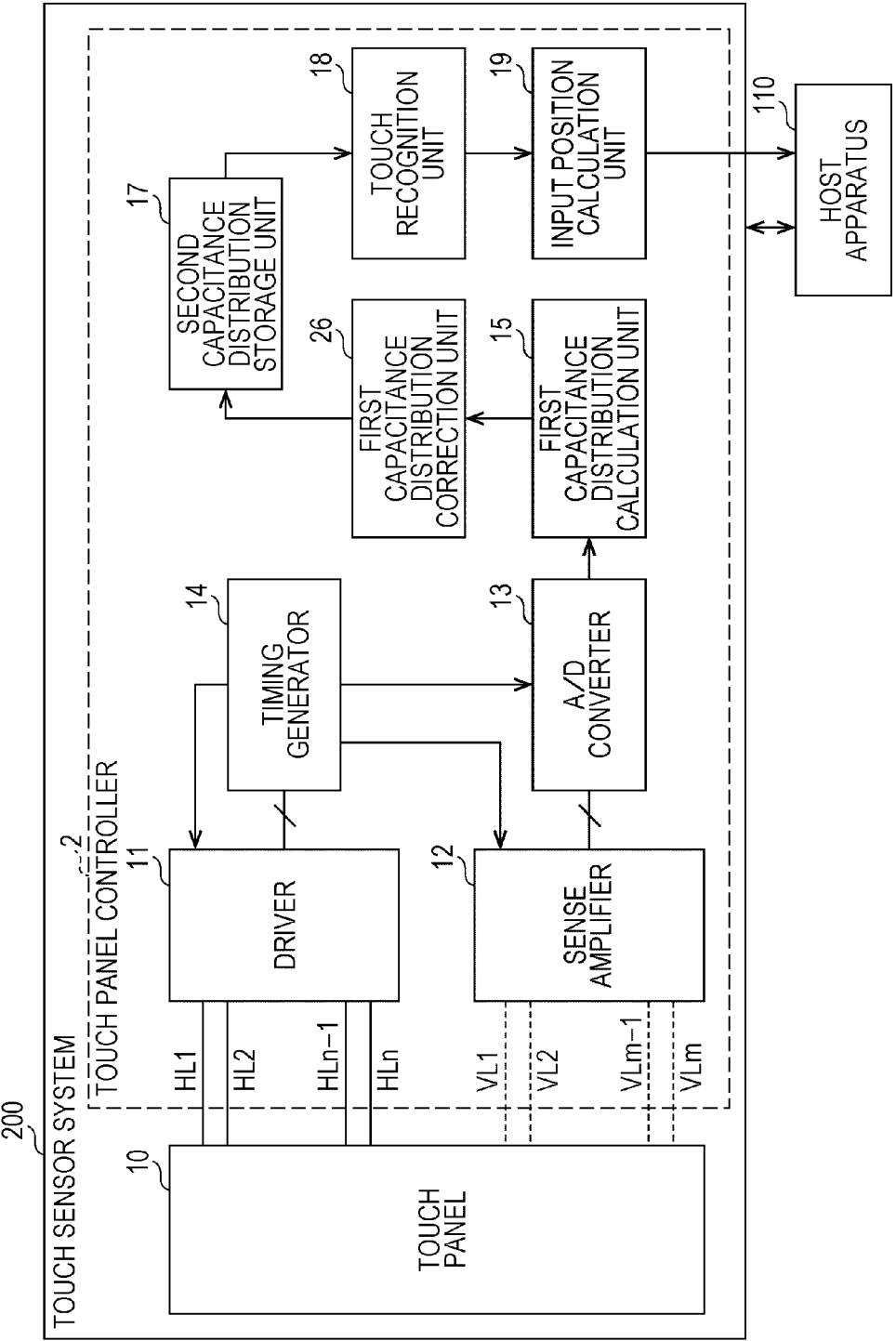
FIG. 23 is a function block diagram that illustrates a configuration of a touch sensor system according to a second embodiment of the present invention.

FIG. 23 is a function block diagram that illustrates the configuration of a touch sensor system 200 of this embodiment. The touch sensor system 200 of this embodiment has a configuration that may be obtained (i) by substituting a touch panel controller 2 for the touch panel controller 1 included in the touch sensor system 100 of the first embodiment and (ii) by substituting a first capacitance distribution correction unit 26 (a second signal value map generation unit) for the first capacitance distribution correction unit 16 included in the touch panel controller 1 of the first embodiment.

The other members of the touch sensor system 200 of this embodiment are the same as the members of the touch sensor system 100 of the first embodiment, the same reference characters will thus be given thereto, and descriptions thereof will not be made.

(Configuration of First Capacitance Distribution Correction Unit 26)

Figure 24:
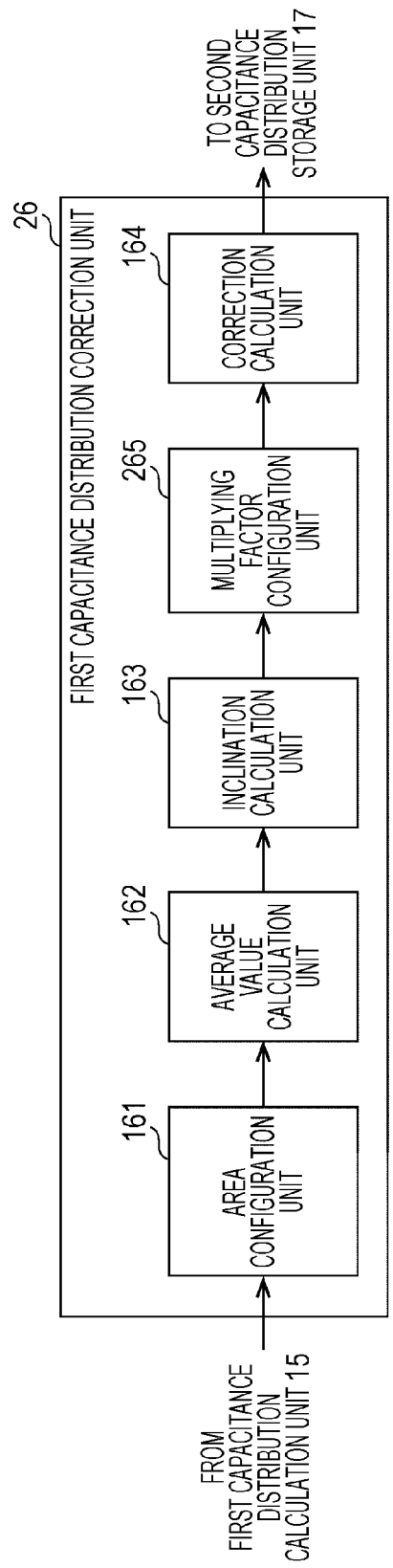
FIG. 24 is a function block diagram that illustrates a specific configuration of a first capacitance distribution correction unit in the touch sensor system according to the second embodiment of the present invention.

FIG. 24 is a function block diagram that illustrates a specific configuration of the first capacitance distribution correction unit 26. The first capacitance distribution correction unit 26 includes the area configuration unit 161, the average value calculation unit 162, the inclination calculation unit 163, the correction calculation unit 164, and a multiplying factor configuration unit 265.

Accordingly, the first capacitance distribution correction unit 26 of this embodiment has a configuration in which the multiplying factor configuration unit 265 is added to the first capacitance distribution correction unit 16 of the first embodiment.

(Multiplying Factor Configuration Unit 265)

The multiplying factor configuration unit 265 has a function of correcting the values of Cm, α, and β by using a correction multiplying factor K. The value of the correction multiplying factor K may be a fixed value that is predetermined at manufacturing of the touch sensor system 200 but is preferably a value that may be changed by the host apparatus 110.

Whether or not multiplying factor configuration in the multiplying factor configuration unit 265 is performed is in advance configured prior to a start of processes by the first capacitance distribution correction unit 26. A user may arbitrarily perform this configuration via the host apparatus 110. A description will be made below about operations in a case where the multiplying factor configuration in the multiplying factor configuration unit 265 is performed.

The multiplying factor configuration unit 265 uses the value of the configured correction multiplying factor K to calculate Cmf, αf, and βf by the following equations (12) to (14).

$$Cmf = K \times Cm \quad (12)$$

$$\alpha f = K \times \alpha \quad (13)$$

$$\beta f = K \times \beta \quad (14)$$

Here, Cmf, αf, and βf will be referred to as modified average value, modified up-down inclination, and modified left-right inclination, respectively.

The multiplying factor configuration unit 265 provides the values of the modified average value Cmf, the modified up-down inclination αf, and the modified left-right inclination βf to the correction calculation unit 164. In this case, the correction calculation unit 164 calculates components of a matrix C2 that expresses the distribution of the corrected capacitances by the following equation (15).

$$C2[i][j] = C1[i][j] - Cmf + j \times \alpha f + i \times \beta f \qquad (15)$$
$$= C1[i][j] - K \times (Cm + j \times \alpha + i \times \beta)$$
(where $-L \le i \le R$ and $-U \le j \le D$)

The second term to the fourth term on the right side of the equation (15) are the second term on the right side to the fourth term on the right side of the equation (8) that are multiplied by K. Accordingly, the correction multiplying factor K may be considered as a parameter that adjusts a correction amount of the capacitance.

In a case where configuration is made such that the multiplying factor configuration in the multiplying factor configuration unit 265 is not performed, the multiplying factor configuration unit 265 performs processes with K=1. That is, the multiplying factor configuration unit 265 provides the values of Cmf=C, of αf=α, and βf=β to the correction calculation unit 164. In this case, similarly to the first embodiment, the correction calculation unit 164 calculates the components of the matrix C2 that expresses the distribution of the corrected capacitances by the equation (8).

FIGS. 25 to 28 are diagrams that exemplify correction of this embodiment. FIG. 25 is a diagram that exemplifies correction in a case of correction multiplying factor K=1.2. FIG. 25(*a*) is a diagram similar to FIG. 7(*a*) and indicates the capacitances C1 for which correction calculation is not yet performed for the area A. FIG. 25(*b*) indicates corrected capacitances C2*fa* that are obtained as a result of the correction calculation for the area A. A capacitance map that indicates the distribution of the capacitances expressed by a matrix C2*fa* will be referred to as second capacitance map MAP2*fa*.

FIG. 26 is a diagram that exemplifies the correction in a case of correction multiplying factor K=1.1. FIG. 26(*a*) is a diagram similar to FIG. 7(*a*) and indicates the capacitances C1 for which correction calculation is not yet performed for the area A. FIG. 26(*b*) indicates corrected capacitances C2*fb* that are obtained as a result of the correction calculation for the area A. A capacitance map that indicates the distribution of the capacitances expressed by a matrix C2*fb* will be referred to as second capacitance map MAP2*fb*.

FIG. 27 is a diagram that exemplifies the correction in a case of correction multiplying factor K=0.9. FIG. 27(*a*) is a diagram similar to FIG. 7(*a*) and indicates the capacitances C1 for which correction calculation is not yet performed for the area A. FIG. 27(*b*) indicates corrected capacitances C2*fc* that are obtained as a result of the correction calculation for the area A. A capacitance map that indicates the distribution of the capacitances expressed by a matrix C2*fc* will be referred to as second capacitance map MAP2*fc*.

FIG. 28 is a diagram that exemplifies the correction in a case of correction multiplying factor K=0.8. FIG. 28(*a*) is a diagram similar to FIG. 7(*a*) and indicates the capacitances C1 for which correction calculation is not yet performed for the area A. FIG. 28(*b*) indicates corrected capacitances C2*fd* that are obtained as a result of the correction calculation for the area A. A capacitance map that indicates the distribution of the capacitances expressed by a matrix C2*fd* will be referred to as second capacitance map MAP2*fd*.

Figure 29:
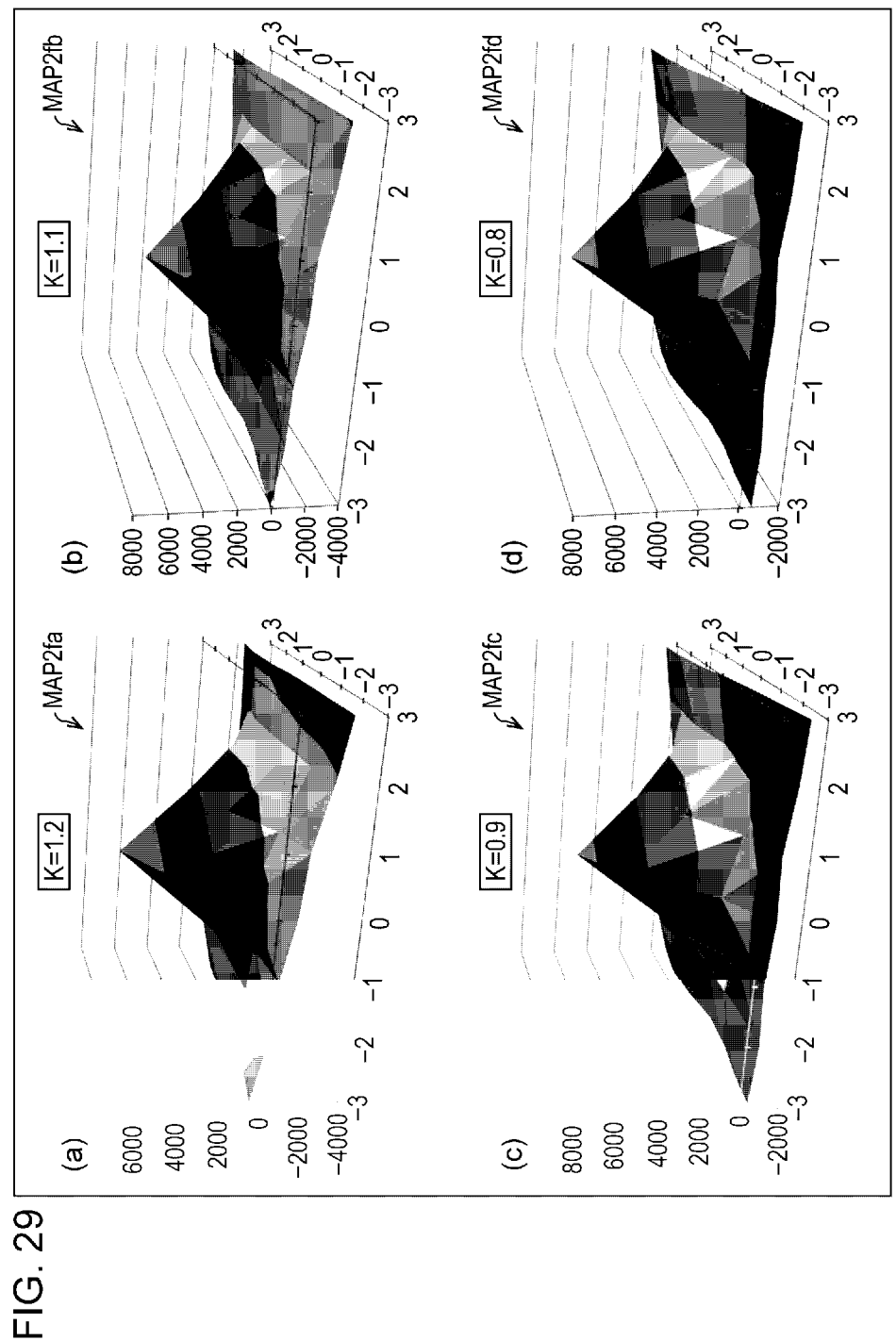
FIG. 29 is a diagram that exemplifies the distributions of corrected capacitances that are expressed by the matrices in FIGS. 25 to 28.

FIG. 29 is a diagram that illustrates the effects of the above-described kinds of correction. FIG. 29(*a*) exemplifies the second capacitance map MAP2*fa*, FIG. 29(*b*) exemplifies the second capacitance map MAP2*fb*, FIG. 29(*c*) exemplifies the second capacitance map MAP2*fc*, and FIG. 29(*d*) exemplifies the second capacitance map MAP2*fd* as three-dimensional graphs that represent the capacitance distributions.

(Process Flow of Correcting Capacitance Values in First Capacitance Distribution Correction Unit 26)

A general flow of processes of the touch sensor system 200 of this embodiment is illustrated by FIG. 13, similarly to the case of the touch sensor system 100 of the first embodiment.

Figure 30:
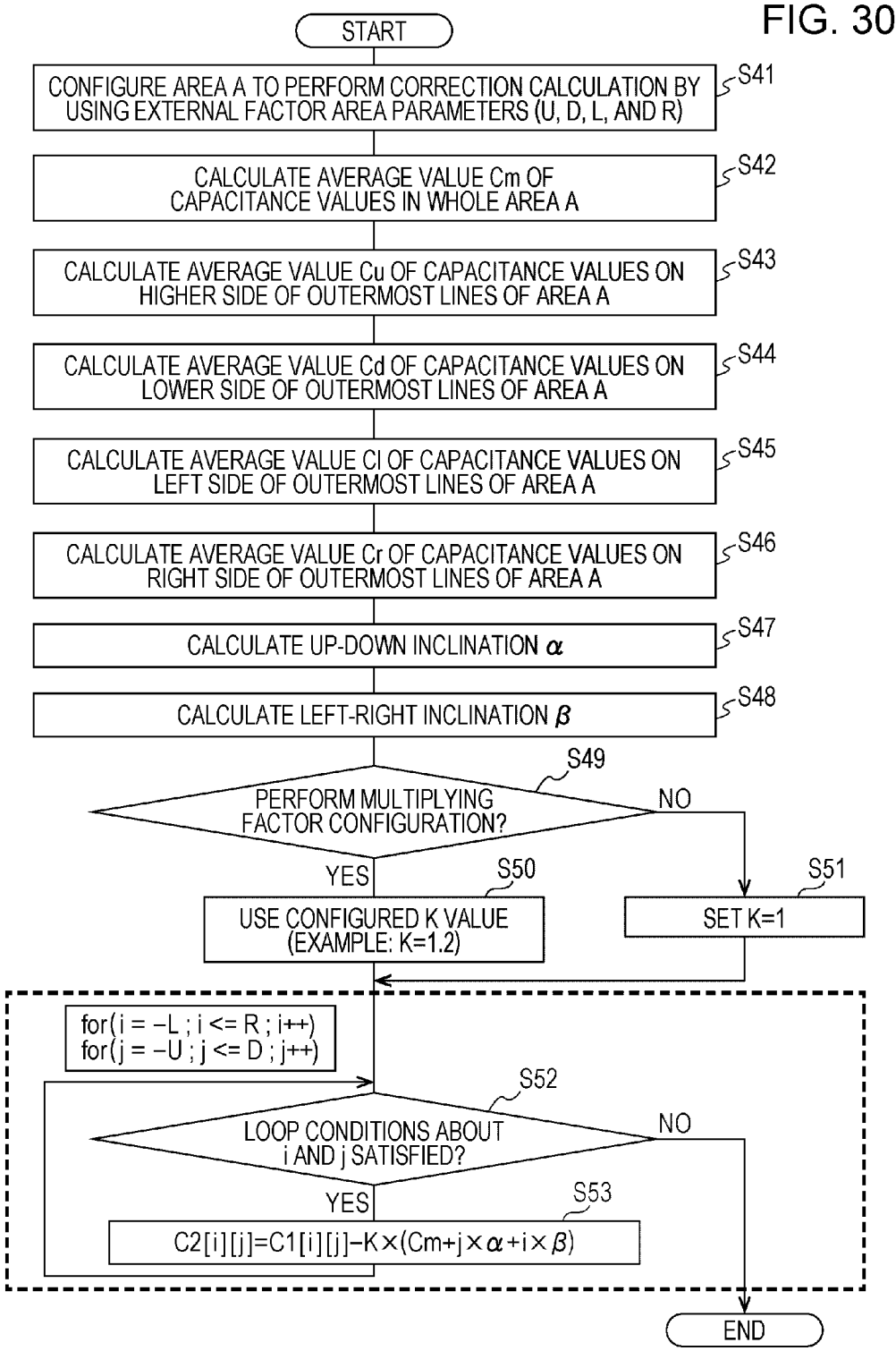
FIG. 30 is a flowchart that illustrates a process flow of correcting capacitance values in the touch sensor system according to the second embodiment of the present invention.

Here, FIG. 30 is used for describing the flow of processes S6 and S7 (that is, the processes of correcting the capacitance values on the first capacitance map) in the first, capacitance distribution correction unit 26. FIG. 30 is a flowchart that exemplifies a process flow of the units included in the first capacitance distribution correction unit 26. FIG. 30 illustrates processes S41 to S53.

Processes S41 to S48 of FIG. 30 are the same as processes S21 to S28 of FIG. 14. Further, process S52 of FIG. 30 is the same as process S29 of FIG. 14. Thus, a description will be made only about processes S49 to S51 and S53.

The multiplying factor configuration unit 265 confirms whether or not the multiplying factor configuration is performed (process S49). In a case where the multiplying factor configuration is performed (YES in S49), the multiplying factor configuration unit 265 calculates the modified average value Cmf, the modified up-down inclination αf, and the modified left-right inclination βf by using the value of the configured correction multiplying factor K (for example, K=1.2). The multiplying factor configuration unit 265 then provides the values of the modified average value Cmf=K× Cm, the modified up-down inclination of αf=K×α, and modified left-right inclination βf=K×β to the correction calculation unit 164 (process S50).

On the other hand, in a case where the multiplying factor configuration is not performed (NO in S49), the multiplying factor configuration unit 265 employs K=1 as the value of the correction multiplying factor K. The multiplying factor configuration unit 265 then provides the values of the modified average value Cmf=Cm, the modified up-down inclination αf=α, and the modified left-right inclination βf=β to the correction calculation unit 164 (process S51).

The correction calculation unit 164 then calculates the components C2[*i*][*j*] of the matrix C2 that expresses the distribution of the corrected capacitances by the equation (15) (process S53). In a case where the loop conditions about i and j are satisfied (YES in S52), process S53 is repeatedly executed.

When process S53 is performed for all i and j and the loop conditions about i and j are not satisfied (NO in S52), all the components C2[*i*][*j*] of the matrix C2 are calculated. Next, process S9 and later processes in FIG. 13 are executed.

(Effects of Touch Sensor System 200)

The touch sensor system 200 of this embodiment provides an effect of enabling the correction amount of the capacitance to be adjusted in accordance with the value of the correction multiplying factor K, as illustrated in FIG. 29.

[Third Embodiment]

Another embodiment of the present invention will be described below based on FIGS. 31 to 35. For convenience of description, the same reference characters will be given to members that have the same functions as the members described in the above embodiments, and descriptions thereof will not be made.

(Configuration of Touch Sensor System 300)

Figure 31:
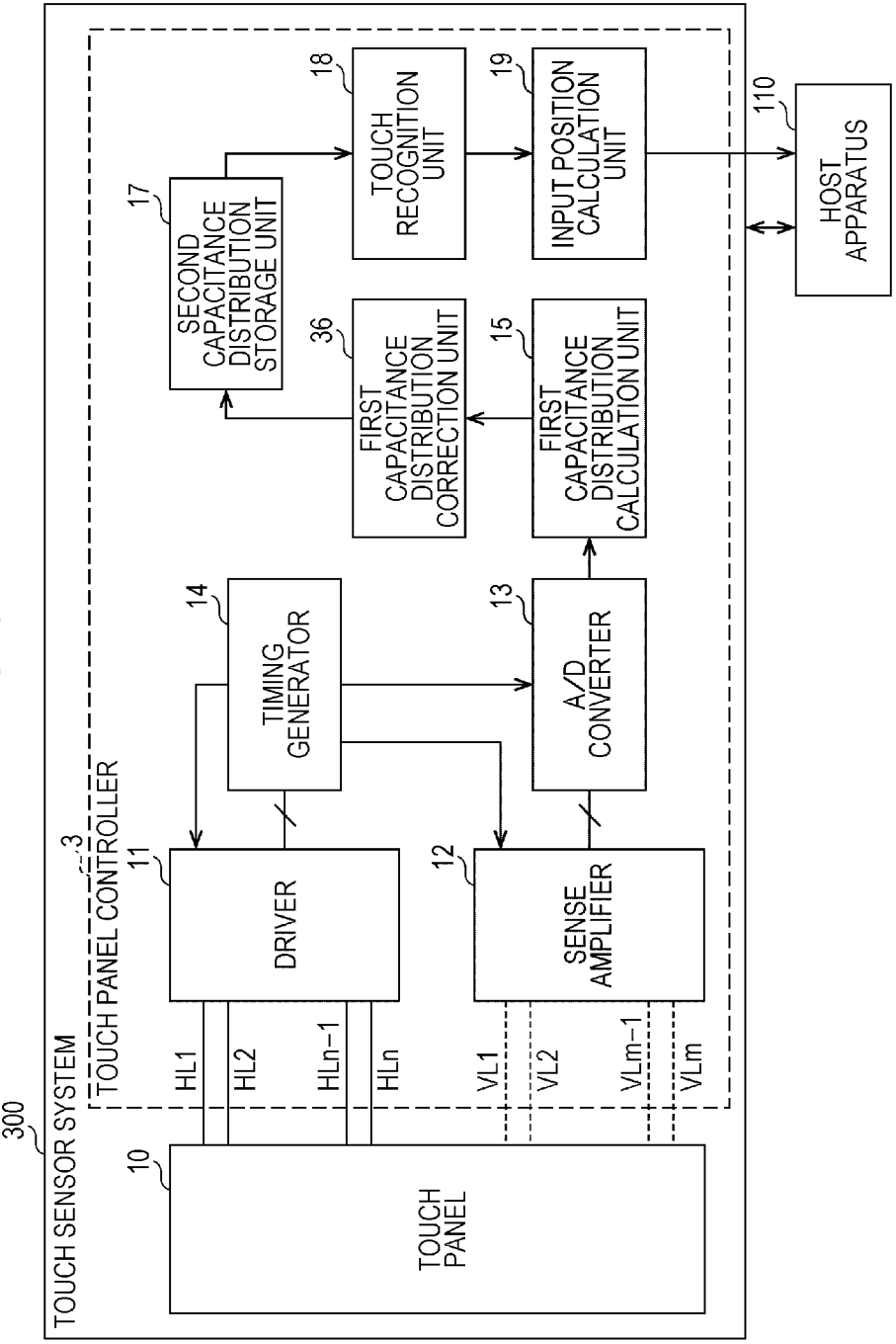
FIG. 31 is a function block diagram that illustrates a configuration of a touch sensor system according to a third embodiment of the present invention.

FIG. 31 is a function block diagram that illustrates the configuration of a touch sensor system 300 of this embodiment. The touch sensor system 300 of this embodiment has a configuration that may be obtained (i) by substituting a touch panel controller 3 for the touch panel controller 1 included in the touch sensor system 100 of the first embodiment and (ii) by substituting a first capacitance distribution correction unit 36 (a second signal value map generation unit) for the first capacitance distribution correction unit 16 included in the touch panel controller 1 of the first embodiment.

The other members of the touch sensor system 300 of this embodiment are the same as the members of the touch sensor system 100 of the first embodiment, the same reference characters will thus be given thereto, and descriptions thereof will not be made.

(Configuration of First Capacitance Distribution Correction Unit 36)

Figure 32:
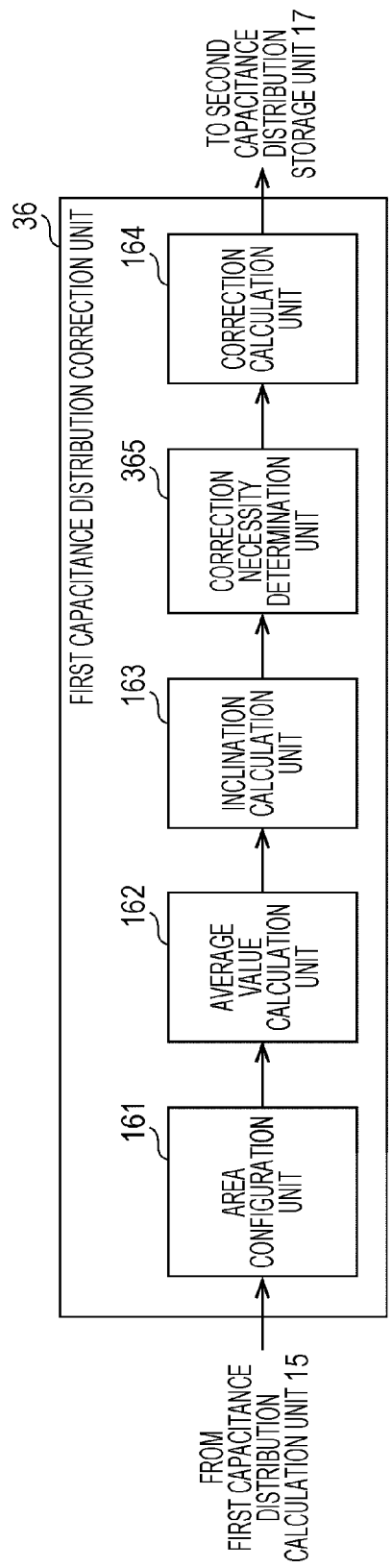
FIG. 32 is a function block diagram that illustrates a specific configuration of a first capacitance distribution correction unit in the touch sensor system according to the third embodiment of the present invention.

FIG. 32 is a function block diagram that illustrates a specific configuration of the first capacitance distribution correction unit 36. The first capacitance distribution correction unit 36 includes the area configuration unit 161, the average value calculation unit 162, the inclination calculation unit 163, the correction calculation unit 164, and a correction necessity determination unit 365. Accordingly, the first capacitance distribution correction unit 36 of this embodiment has a configuration in which the correction necessity determination unit 365 is added to the first capacitance distribution correction unit 16 of the first embodiment.

(Correction Necessity Determination Unit 365)

The correction necessity determination unit 365 compares the magnitudes of the values of the components $C1[i][j]$ of the matrix C1 that expresses the distribution of the capacitances in the area A with the magnitude of a determination value V. The determination value V may be a fixed value that is predetermined at manufacturing of the touch sensor system 300 but is preferably a value that may be changed by the host apparatus 110.

The correction necessity determination unit 365 determines whether or not the components $C1[i][j]$ of the matrix C1 satisfy the following correction candidate condition.

$C1[i][j] > V$     (Correction candidate condition)

The correction necessity determination unit 365 then generates correction necessity information that indicates whether or not the components $C1[i][j]$ of the matrix C1 satisfy the correction candidate condition and provides the correction necessity information to the correction calculation unit 164.

The correction calculation unit 164 refers to the correction necessity information and calculates the respective components $C2[i][j]$ of the matrix C2 that expresses the distribution of the corrected capacitances for only the components $C1[i][j]$ that satisfy the correction candidate condition, by the equation (8).

(Process Flow of Correcting Capacitance Values in First Capacitance Distribution Correction Unit 36)

A general flow of processes of the touch sensor system 300 of this embodiment is illustrated by FIG. 13, similarly to the case of the touch sensor system 100 of the first embodiment.

Figure 33:
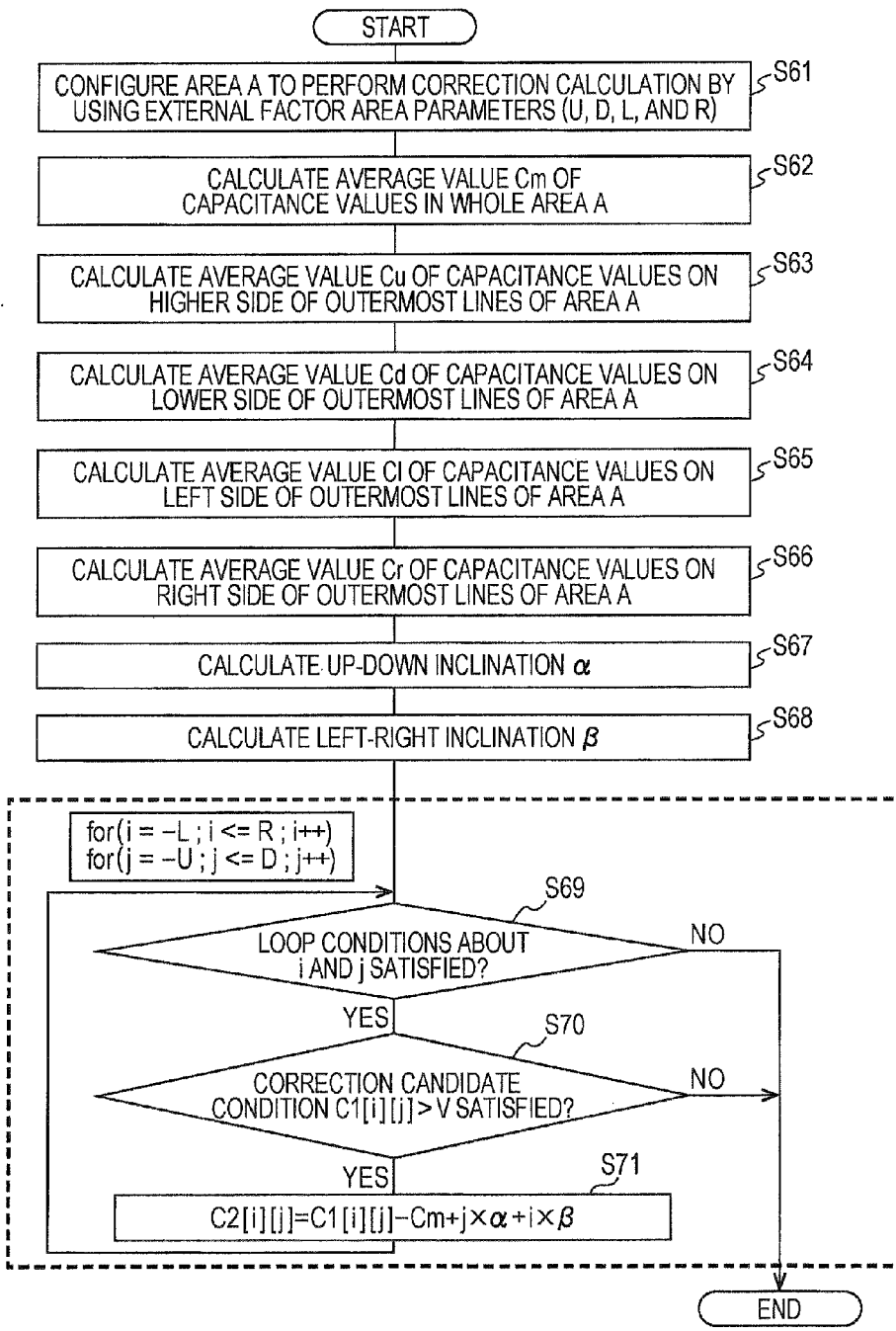
FIG. 33 is a flowchart that illustrates a process flow of correcting capacitance values in the touch sensor system according to the third embodiment of the present invention.

Here, FIG. 33 is used for describing the flow of processes S6 and S7 (that is, the processes of correcting the capacitance values on the first capacitance map) in the first capacitance distribution correction unit 36. FIG. 33 is a flowchart that exemplifies a process flow of the units included in the first capacitance distribution correction unit 36. FIG. 33 illustrates processes S61 to S71.

Processes S61 to S69 of FIG. 33 are the same as processes S21 to S29 of FIG. 14. Thus, a description will be made only about processes S70 and S71.

The correction necessity determination unit 365 determines whether or not the components $C1[i][j]$ of the matrix C1 satisfy the correction candidate condition. The correction necessity determination unit 365 then provides the correction necessity information that indicates whether or not the components $C1[i][j]$ of the matrix C1 satisfy the correction candidate condition to the correction calculation unit 164 (process S70).

FIG. 32 exemplifies a configuration in which the correction necessity determination unit 365 is provided immediately prior to the correction calculation unit 164. However, a configuration is possible in which the correction necessity determination unit 365 is provided immediately prior to the area configuration unit 161.

In a case where the configuration is used in which the correction necessity determination unit 365 is provided immediately prior to the area configuration unit 161, process S70 may be performed immediately prior to process S61. Accordingly, in a case where it is not necessary to perform the correction calculation for the components $C1[i][j]$ of the matrix C1, the processes (S62 to S66) of calculating the average values of the capacitance values and the processes (S67 and S68) of calculating the up-down inclination and the left-right inclination may be omitted.

In a case where the components $C1[i][j]$ of the matrix C1 satisfy the correction candidate condition (YES in S70), the correction calculation unit 164 calculates the components $C2[i][j]$ of the matrix C2 that expresses the distribution of the corrected capacitances by the equation (8) (process S71).

The correction calculation is not performed in processes S69 to S71 in a case where the values of the components $C1[i][j]$ of the matrix C1 are equal to or smaller than the determination value V. Thus, a case where proper effects of the correction calculation may not be obtained or a case where awkward correction calculation is performed for the values of the components $C1[i][j]$ of the matrix C1, which are close to the determination value V, is possible. This problem may be solved by changing the position of process S70.

That is, as for a method for memory reduction in this embodiment, the correction calculation is performed for all the points in the area A only in a case where $C1[i][j] > V$ is satisfied (that is, a case where the correction candidate condition is satisfied), and the matrix C2 may thereby be created.

Accordingly, in a case where $C1[i][j] > V$ is not satisfied (that is, a case where the correction candidate condition is not satisfied), the correction calculation is performed for none of the points in the area A, and this results in $C2=C1$. Thus, a memory area for saving the matrix C2 does not have to be prepared, and the memory capacity may thus be reduced.

In a case where $C1[i][j] > V$ is not satisfied, the process by the touch recognition unit 18 and later processes are performed by using the first capacitance map expressed by the matrix C1.

On the other hand, in a case where the components C1[i]/[j] of the matrix C1 do not satisfy the correction candidate condition (NO in S70), the process flow returns to process S69. Accordingly, the calculation in the correction calculation unit 164 is not performed. After the values of i and j are updated in process S69, a determination about the correction candidate condition in process S70 is performed.

In a case where the loop conditions about i and j are satisfied (YES in S69), process S70 is repeatedly executed.

When process S70 is performed for all i and j and the loop conditions about i and j are not satisfied (NO in S69), the components C2[i]/[j] of the corrected matrix C2 that correspond to all the components C1[i]/[j] of the matrix C1 which satisfy the correction candidate condition are calculated. Next, process S9 and later processes in FIG. 13 are executed.

(Effects of Touch Sensor System 300)

Figure 34:
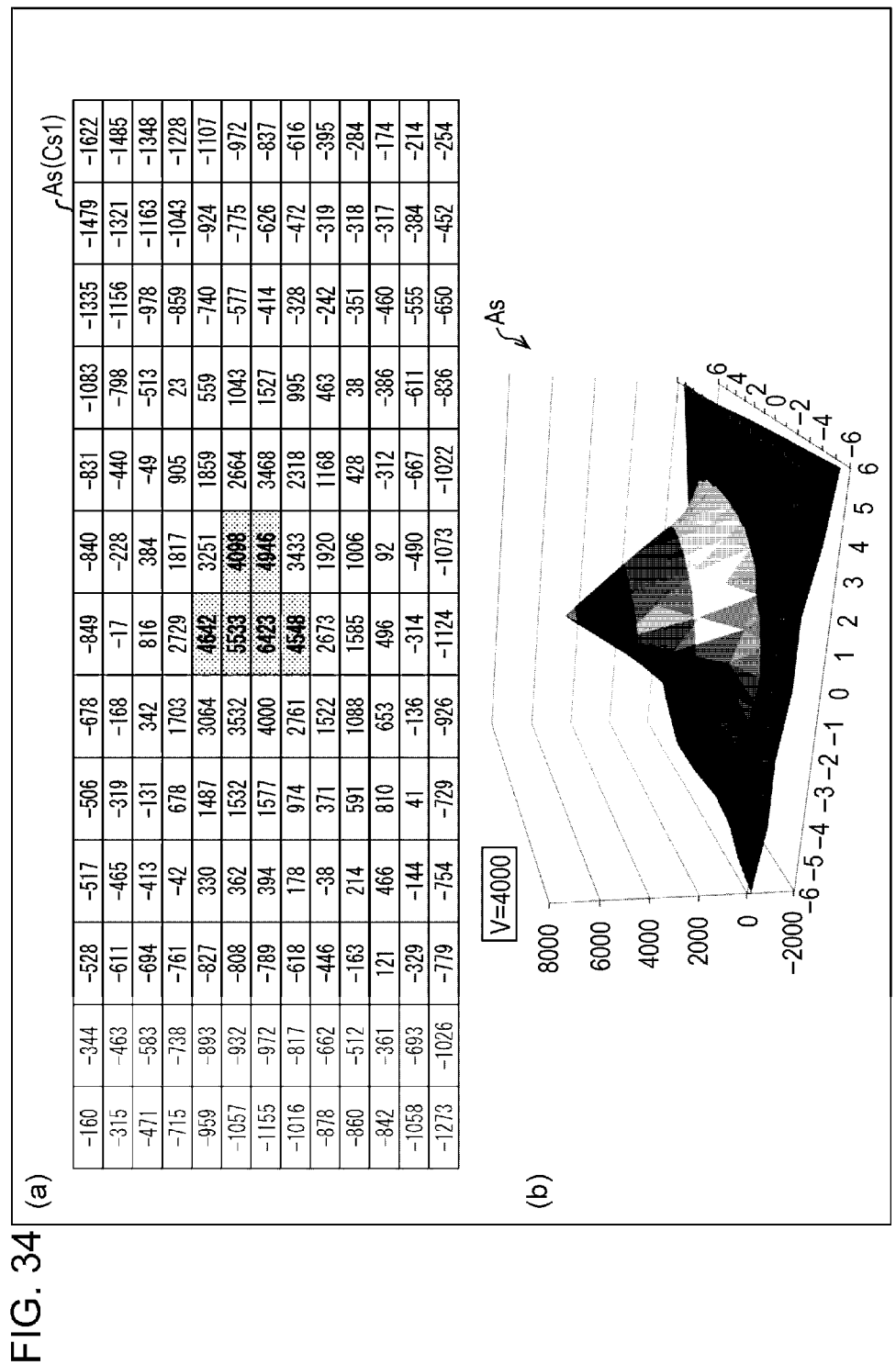
FIG. 34 is a diagram that exemplifies results of a determination of whether or not correction is necessary in the touch sensor system according to the third embodiment of the present invention.

Effects of the touch sensor system 300 in this embodiment will be described below with reference to FIGS. 34 and 35.

FIG. 34(a) is a diagram that exemplifies an area As. Here, the matrix that expresses the distribution of the capacitances in the area As will be referred to as matrix Cs1. The matrix Cs1 is a matrix with 13 rows and 13 columns and has 169 (=13×13) components.

Further, FIG. 34(b) is a three-dimensional graph that exemplifies the capacitance distribution in the area As. FIG. 34(b) exemplifies a case where an input operation on the touch panel 10 is performed at the coordinates (0, 0).

In a case where an input operation by a touch by the finger or the stylus is performed on the touch panel 10, a relatively small change amount of the capacitance compared to a change amount of the capacitance around a prescribed threshold value, which is determined as caused by a touch by the finger or the stylus, is less likely to be due to a touch by the finger or the stylus. Thus, in order to detect an input on the touch panel 10, only a relatively large capacitance value may be focused.

For example, a case is discussed where the determination value V is configured to 4000 in the touch sensor system 300. In this case, as illustrated in FIG. 34(a), the number of the components that satisfy Cs1[i]/[j]>4000 (the correction candidate condition) in the matrix Cs1 is 6.

Accordingly, in the touch sensor system 300, the correction calculation is performed for only the 6 components that satisfy the correction candidate condition among the 169 components of the matrix Cs1. Accordingly, the touch sensor system 300 of this embodiment provides an effect of enabling the necessary memory capacity to be reduced compared to the touch sensor systems 100 and 200 in the first and second embodiments, which perform the correction calculation for all the components of the matrix Cs1.

FIG. 35 exemplifies the memory capacity that is necessary for the correction calculation. Now, the first capacitance map MAP1A expressed as a matrix with 10 rows and 10 columns will be discussed. The first capacitance map MAP1A has 10×10=100 components (components "A1" to "J10").

Here, the number of the second capacitance maps that may be generated from the first capacitance map MAP1A is equal to the number of the components of the first capacitance map MAP1A.

For example, in a case of FIG. 35, a second capacitance map MAP2A1 that is generated with the component "A1" in the first row and the first column of the first capacitance map MAP1A being the focus point, a second capacitance map MAP2A2 that is generated with the component "B1" in the first row and the second column of the first capacitance map MAP1A being the focus point, ... (an omission) ...

a second capacitance map MAP2A8 that is generated with the component "H1" in the first row and the 8th column of the first capacitance map MAP1A being the focus point, a second capacitance map MAP2A9 that is generated with the component "I1" in the first row and the 9th column of the first capacitance map MAP1A being the focus point, a second capacitance map MAP2A10 that is generated with the component "J1" in the first row and the 10th column of the first capacitance map MAP1A being the focus point, a second capacitance map MAP2A11 that is generated with the component "A2" in the second row and the first column of the first capacitance map MAP1A being the focus point, ... (an omission) ...

a second capacitance map MAP2A100 that is generated with the component "J10" in the 10th row and the 10th column of the first capacitance map MAP1A being the focus point as 100 second capacitance maps may be generated from the first capacitance map MAP1A. Each of the second capacitance maps MAP2A1 to MAP2A100 is expressed as a matrix with seven rows and seven columns. Further, as illustrated in FIG. 35, the second capacitance maps MAP2A1 to MAP2A100 partially overlap with each other.

In the correction calculation of the capacitance, a case is assumed where plural second capacitance maps are generated. Thus, the memory capacity that is necessary for saving the second capacitance maps may be sufficiently large compared to the memory capacity that is necessary for saving the first capacitance map.

For example, in the case of FIG. 35, the memory capacity for saving the 100 components may be secured in order to save the first capacitance map MAP1A. However, in order to save the second capacitance maps MAP2A1 to MAP2A100, the memory capacity for saving 7×7×100=4900 components needs to be secured. Accordingly, in order to save the second capacitance maps in the touch sensor system 100 of the first embodiment, for example, the memory capacity that is 49 times as large as the memory capacity for saving the first capacitance map needs to be secured.

Thus, the touch sensor system 300 of this embodiment is useful in the point that the memory capacity that is necessary for saving the second capacitance maps may be reduced.

For example, when it is assumed that the number of the components that satisfy the correction candidate condition in each of the second capacitance map MAP2A1 to MAP2A100 is ¹⁄₁₀ of the number of all the components, it is sufficient that the touch sensor system 300 of this embodiment secures the memory capacity for saving 7×7×100×(¹⁄₁₀)=490 components in order to save the second capacitance maps MAP2A1 to MAP2A100. That is, the memory capacity that is necessary for saving the second capacitance maps may be reduced to ¹⁄₁₀ of the case of the touch sensor system 100 of the first embodiment.

[Fourth Embodiment]

Another embodiment of the present invention will be described below based on FIGS. 36 and 37. For convenience of description, the same reference characters will be given to members that have the same functions as the members described in the above embodiments, and descriptions thereof will not be made.

(Configuration of Touch Sensor System 400)

Figure 36:
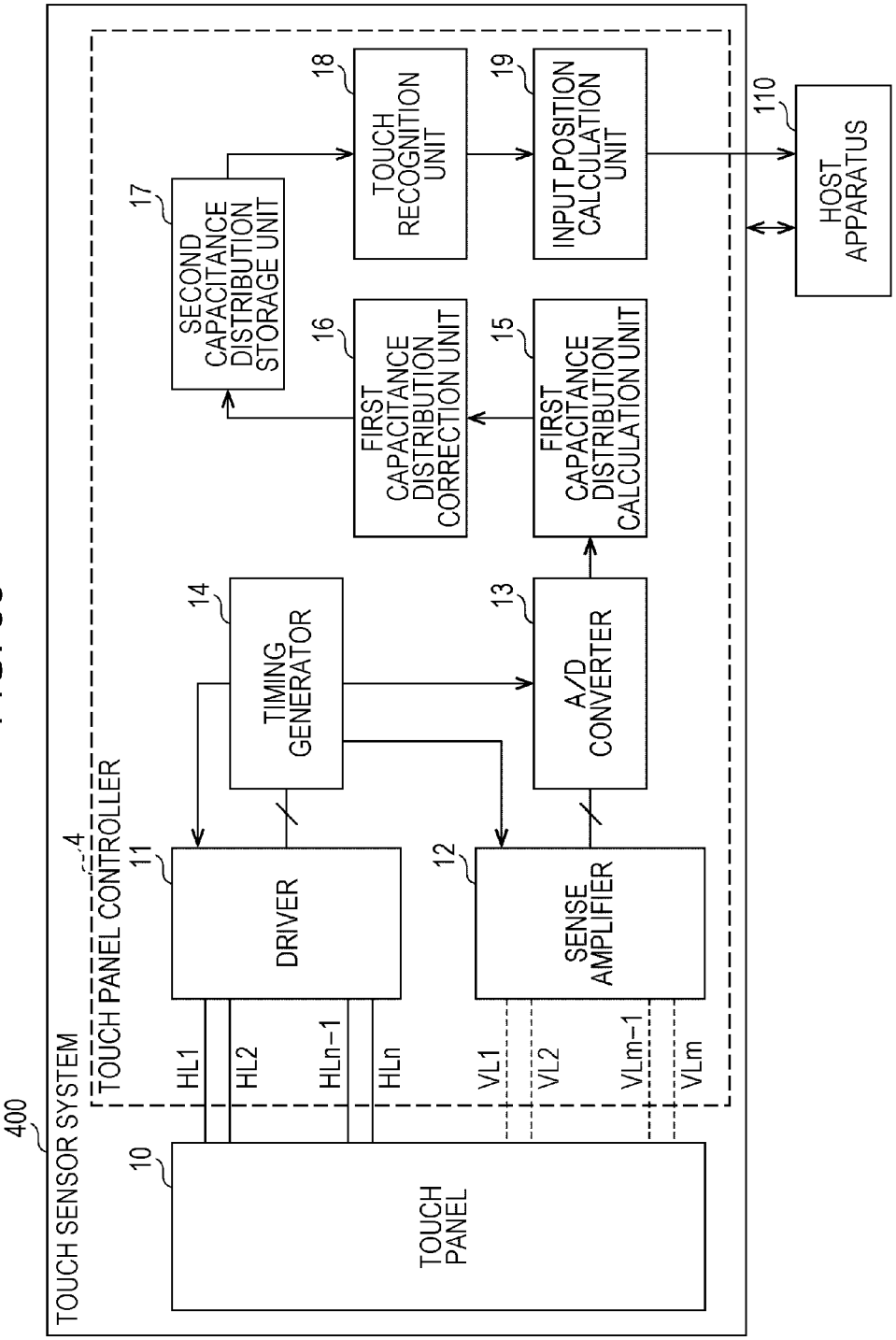
FIG. 36 is a function block diagram that illustrates a configuration of a touch sensor system according to a fourth embodiment of the present invention.

FIG. 36 is a function block diagram that illustrates the configuration of a touch sensor system 400 of this embodiment. The touch sensor system 400 of this embodiment has a configuration that may be obtained (i) by substituting a touch panel controller 4 for the touch panel controller 1 included in the touch sensor system 100 of the first embodiment.

Further, the members of the touch sensor system 400 of this embodiment are the same as the members of the touch sensor system 100 of the first embodiment, the same reference characters will thus be given thereto, and descriptions thereof will not be made.

The touch panel controller 4 of this embodiment has the same configuration as the touch panel controller 1 of the first embodiment, but only the order of a portion of processes is different. Thus, the process flow in the touch sensor system 400 will be described below.

(Process Flow of Calculating Coordinates of Input Position in Touch Sensor System 400)

Figure 37:
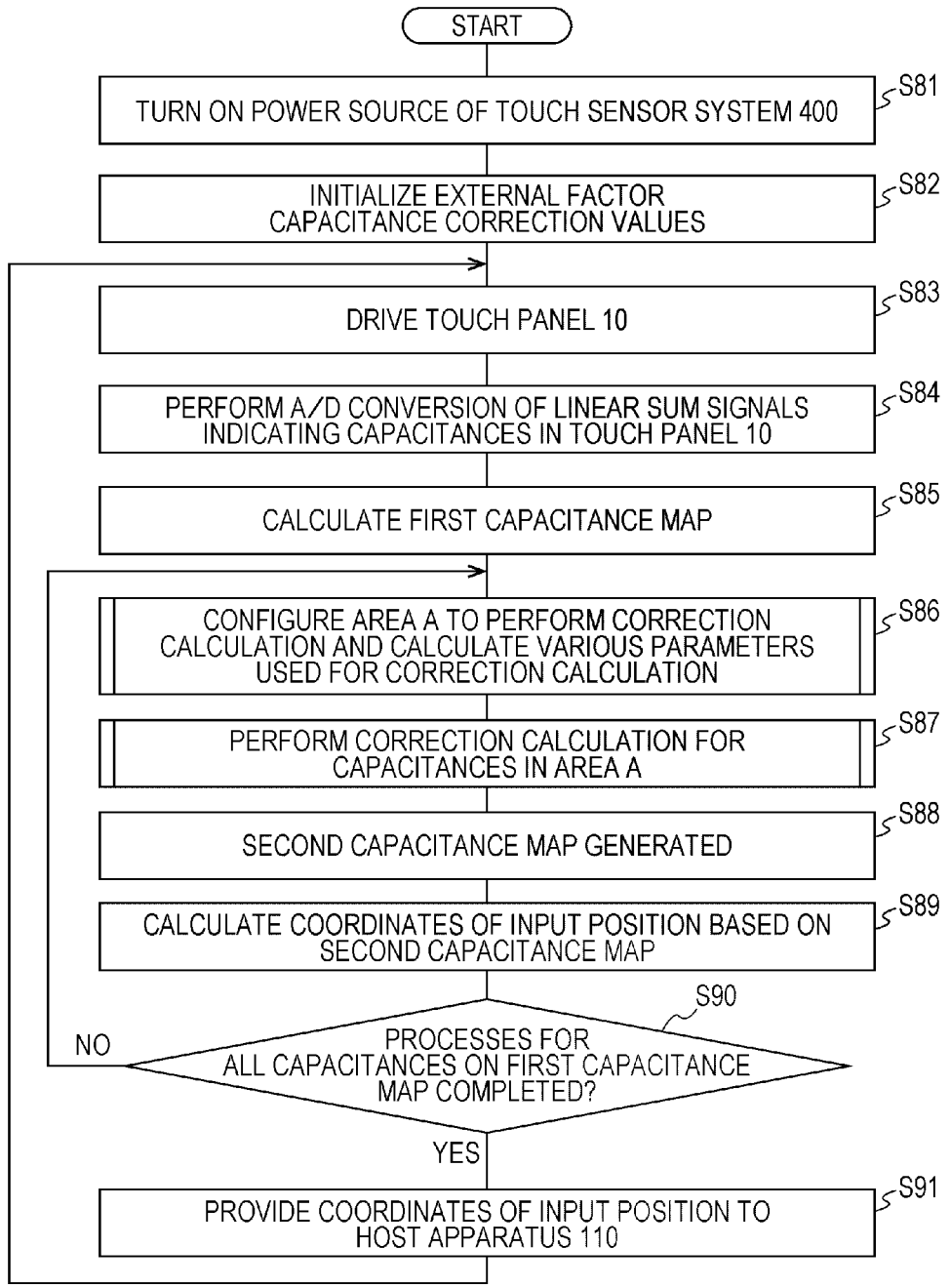
FIG. 37 is a flowchart that illustrates a process flow of calculating the coordinates of an input position in the touch sensor system according to the fourth embodiment of the present invention.

A general flow of processes of the touch sensor system 400 of this embodiment is illustrated by FIG. 37. FIG. 37 is a flowchart that exemplifies the process flow of calculating the coordinates of an input position in the touch sensor system 400. FIG. 37 illustrates processes S81 to S91.

Processes S81 to S87 of FIG. 37 are the same as processes S1 to S7 of FIG. 13, and the orders thereof are also the same. Thus, a description will be made only about processes S88 to S91.

Processes S86 and S87 are performed for all the capacitances in the area A, and the second capacitance map is thereby generated (process S88). The second capacitance map is provided to the touch recognition unit 18 via the second capacitance distribution storage unit 17.

Next, the touch recognition unit 18 determines whether or not an input by a touch by the finger or the stylus is applied to the touch panel 10 based on the second capacitance map. In a case where the touch recognition unit 18 determines that an input by a touch by the finger or the stylus is applied to the touch panel 10, the touch recognition unit 18 provides the second capacitance map to the input position calculation unit 19.

The input position calculation unit 19 calculates the coordinates of the input position that indicates the position, in which the input is applied to the touch panel 10, based on the second capacitance map provided from the touch recognition unit 18 (process S89).

The first capacitance distribution correction unit 16 then confirms whether or not processes S86 to S89 are performed for all the capacitances on the first capacitance map (process S90). In a case where processes S86 to S89 are performed for not all the capacitances on the first capacitance map (NO in process S90), the process flow returns to process S86, and processes S86 to S89 in the first capacitance distribution correction unit 16 are repeated.

In a case where processes S86 to S89 are performed for all the capacitances on the first capacitance map (YES in process S90), the input position calculation unit 19 then provides the coordinates of the input position to the host apparatus 110 that is provided on the outside of the touch sensor system 400 (process S91).

The coordinates of the input position in the touch sensor system 400 are calculated and provided to the host apparatus 110 by the processes S81 to S91. After process S91 is finished, the process flow returns to process S83, and processes S83 to S91 are repeated during the period in which the power source of the touch sensor system 400 is turned on.

(Effects of Touch Sensor System 400)

The touch sensor system 100 of the first embodiment calculates the coordinates of an input position based on the second capacitance map, outside the loop of process S8 (see process S10 in FIG. 13). On the other hand, the touch sensor system 400 of this embodiment calculates the coordinates of an input position based on the second capacitance map, in the loop of process S90 (see process S89 in FIG. 37).

In the process flow of the touch sensor system 400, the coordinates of an input position may be calculated immediately after the second capacitance map is generated in process S89. This allows the second capacitance map saved in a memory to be overwritten in each loop of process S90.

Accordingly, the touch sensor system 400 of this embodiment provides an effect of enabling the necessary memory capacity to be reduced compared to the touch sensor systems 100 to 300 in the first to third embodiments, which do not allow the second capacitance map to be overwritten.

[Fifth Embodiment]

Another embodiment of the present invention will be described below based on FIGS. 38 to 40. For convenience of description, the same reference characters will be given to members that have the same functions as the members described in the above embodiments, and descriptions thereof will not be made.

(Configuration of Touch Sensor System 500)

Figure 38:
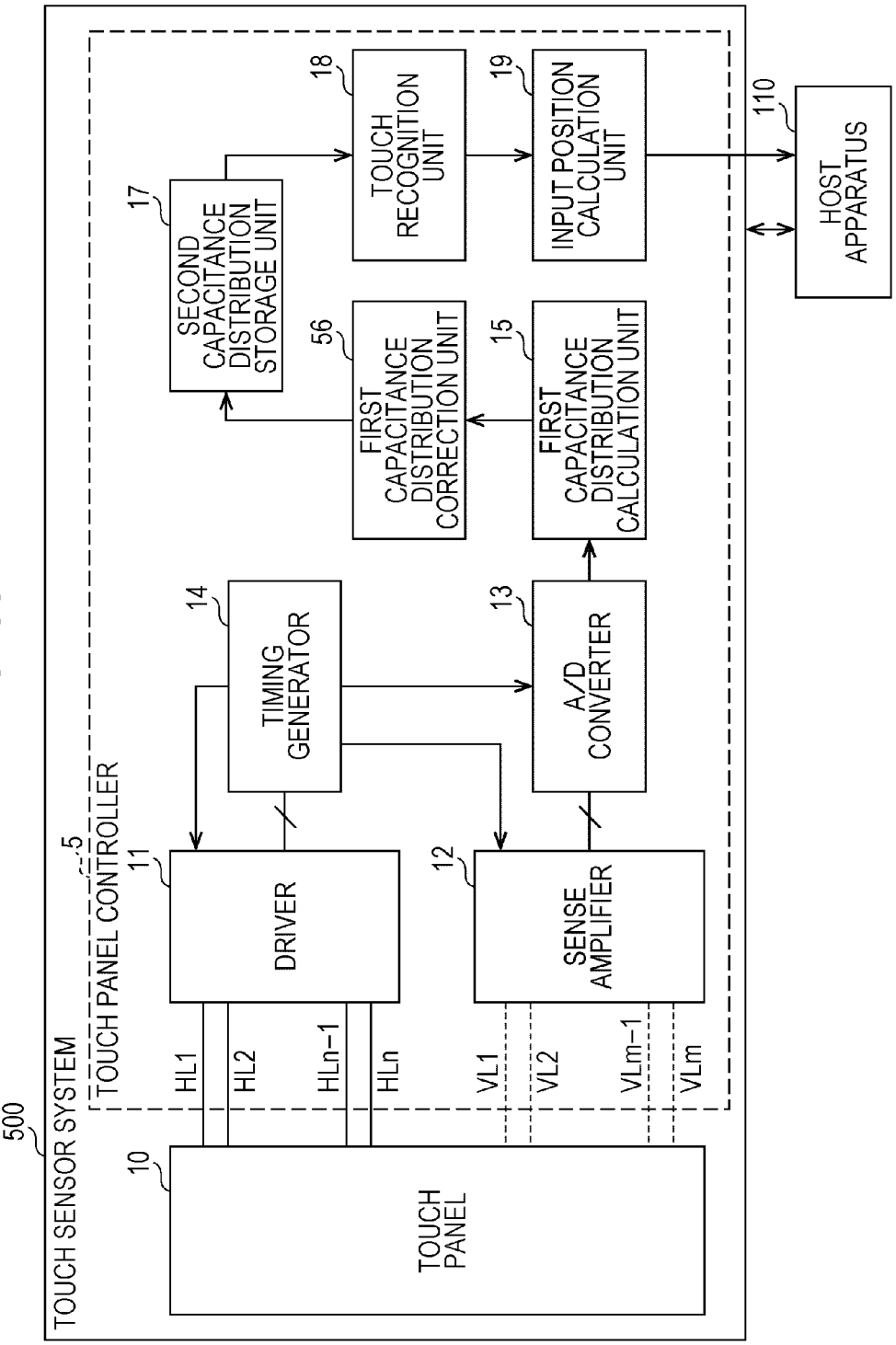
FIG. 38 is a function block diagram that illustrates a configuration of a touch sensor system according to a fifth embodiment of the present invention.

FIG. 38 is a function block diagram that illustrates the configuration of a touch sensor system 500 of this embodiment. The touch sensor system 500 of this embodiment has a configuration that may be obtained (i) by substituting a touch panel controller 5 for the touch panel controller 1 included in the touch sensor system 100 of the first embodiment and (ii) by substituting a first capacitance distribution correction unit 56 (a second signal value map generation unit) for the first capacitance distribution correction unit 16 included in the touch panel controller 1 of the first embodiment.

The other members of the touch sensor system 500 of this embodiment are the same as the members of the touch sensor system 100 of the first embodiment, the same reference characters will thus be given thereto, and descriptions thereof will not be made.

(Configuration of First Capacitance Distribution Correction Unit 56)

Figure 39:
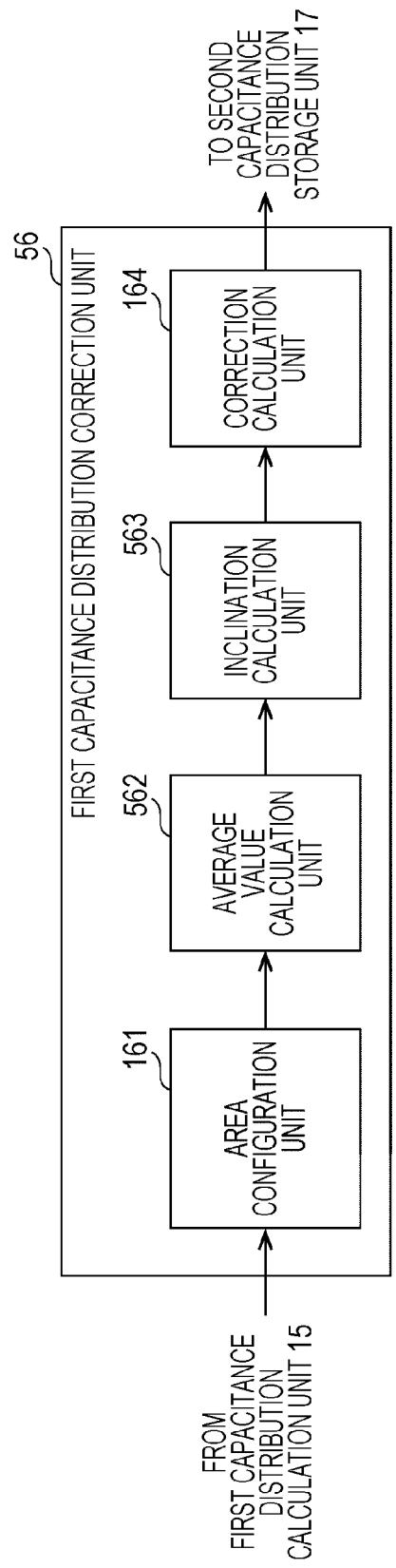
FIG. 39 is a function block diagram that illustrates a specific configuration of a first capacitance distribution correction unit in the touch sensor system according to the fifth embodiment of the present invention.

FIG. 39 is a function block diagram that illustrates a specific configuration of the first capacitance distribution correction unit 56. The first capacitance distribution correction unit 56 includes the area configuration unit 161, an average value calculation unit 562, an inclination calculation unit 563, and the correction calculation unit 164. Accordingly, the first capacitance distribution correction unit 56 of this embodiment has a configuration that may be obtained by substituting the average value calculation unit 562 and the inclination calculation unit 563 for the average value calculation unit 162 and the inclination calculation unit 163 that are included in the first capacitance distribution correction unit 16 of the first embodiment.

(Average Value Calculation Unit 562)

The average value calculation unit 562 calculates the average value Cm of the capacitances in the whole area A by the equation (1). This process is the same as the average value calculation unit 162 of the first embodiment.

The average value calculation unit 562 uses four parameters Ku, Kd, Kl, and Kr to perform the following calculation. The values of Ku, Kd, Kl, and Kr may be fixed values that are predetermined at manufacturing of the touch sensor system 500 but are preferably values that may be changed by the host apparatus 110.

That is, the average value calculation unit 562 calculates (i) an average value Cu of the capacitances of Ku rows from the highest side (highest row) of the area A, (ii) an average value Cd of the capacitances of Kd rows from the lowest side (lowest row) of the area A, (iii) an average value Cl of the capacitances of Kl columns from the leftmost side (leftmost column) of the area A, and (iv) an average value Cr of the capacitances of Kr columns from the rightmost side (rightmost column) of the area A by the following equations (16) to (19).

$$Cu=(\text{sum of components of highest side to row } Ku \text{ of matrix } C1)/(\text{number of components of highest side to row } Ku \text{ of matrix } C1) \quad (16)$$

$$Cd=(\text{sum of components of lowest side to row } Kd \text{ of matrix } C1)/(\text{number of components of lowest side to row } Kd \text{ of matrix } C1) \quad (17)$$

$$Cl=(\text{sum of components of leftmost side to column } Kl \text{ of matrix } C1)/(\text{number of components of leftmost side to column } Kl \text{ of matrix } C1) \quad (18)$$

$$Cr=(\text{sum of components of rightmost side to column } Kr \text{ of matrix } C1)/(\text{number of components of rightmost side to column } Kr \text{ of matrix } C1) \quad (19)$$

The equations (2) to (5) of the first embodiment correspond to the case where configuration is made such that Ku=1, Kd=1, Kl=1, and Kr=1 in the equations (16) to (19).

Figure 40:
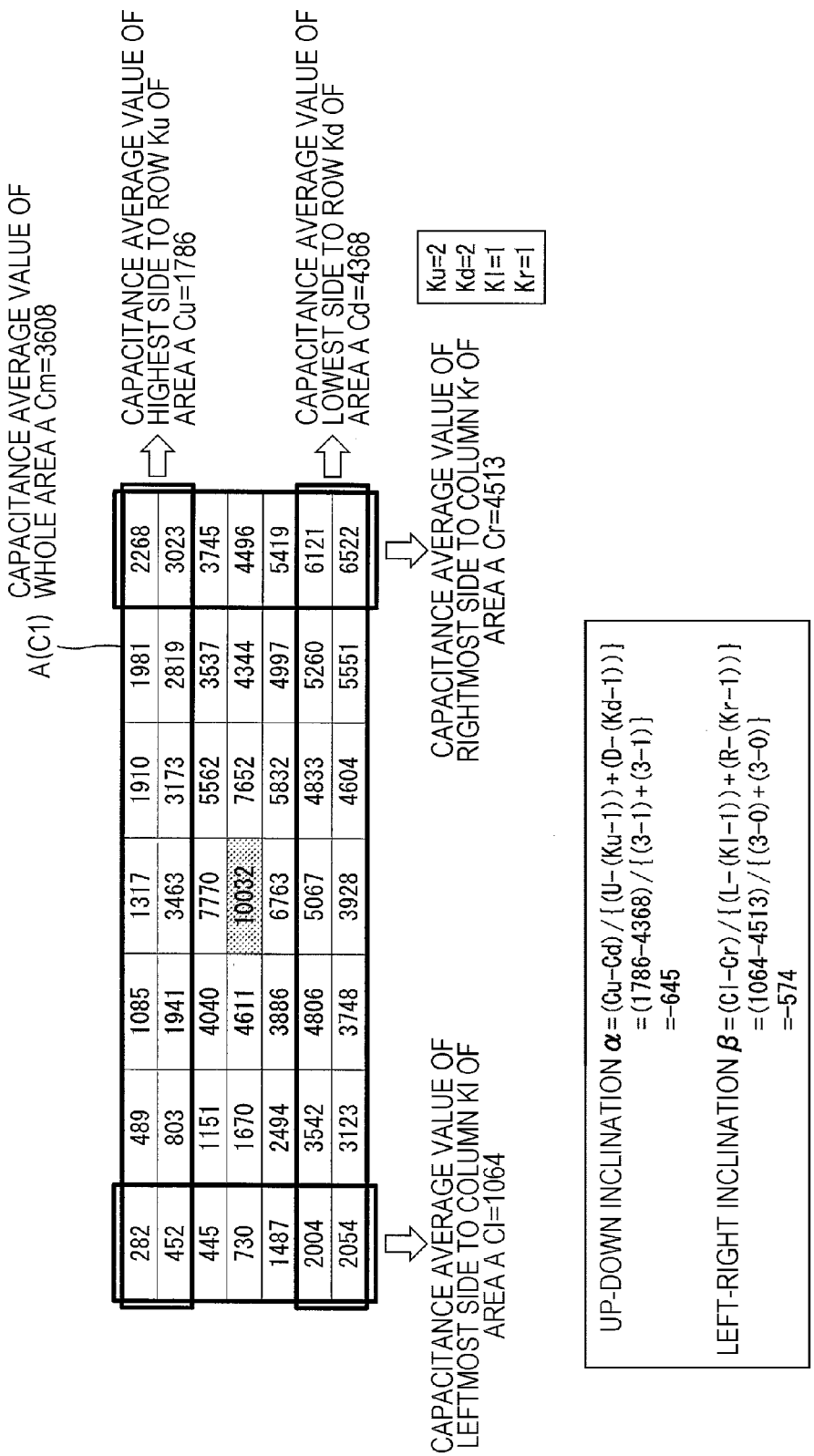
FIG. 40 is a diagram that exemplifies operations of an average value calculation unit and an inclination calculation unit according to the fifth embodiment of the present invention.

FIG. 40 is a diagram that exemplifies processes of the average value calculation unit 562 and the inclination calculation unit 563. FIG. 40 illustrates the area A that is the same as FIG. 6.

FIG. 40 illustrates a case of Ku=2, Kd=2, Kl=1, and Kr=1. In this case, the average value calculation unit 562 calculates Cu=1786, Cd=4368, Cl=1064, and Cr=4513 by applying the equations (16) to (19).

(Inclination Calculation Unit 563)

The inclination calculation unit 563 uses the four parameters Ku, Kd, Kl, and Kr in addition to the values of Cm, Cu, Cd, Cl, and Cr to calculate an up-down inclination $\alpha$ and a left-right inclination $\beta$ by the following equations (20) and (21).

$$\alpha=(Cu-Cd)/\{(U-(Ku-1))+(D-(Kd-1))\} \quad (20)$$

$$\beta=(Cl-Cr)/\{(L-(Kl-1))+(R-(Kr-1))\} \quad (21)$$

The equations (6) and (7) of the first embodiment correspond to the case where configuration is made such that Ku=1, Kd=1, Kl=1, and Kr=1 in the equations (20) and (21).

In the case of FIG. 40, because Ku=2, Kd=2, Kl=1, and Kr=1, the inclination calculation unit 563 calculates $\alpha$=−645 and $\beta$=−574 by applying the equations (20) and (21).

(Effects of Touch Sensor System 500)

The touch sensor system 500 of this embodiment uses not only the components of the outermost lines of the matrix C1 that expresses the capacitance distribution in the area A but also the components of plural lines that include the outermost lines to calculate the up-down inclination $\alpha$ and the left-right inclination $\beta$.

Accordingly, the touch sensor system 500 provides an effect of enabling a decrease in accuracy of the correction calculation to be suppressed even in a case where the reliability of the component values of the outermost lines of the matrix C1 is low, such as a case where the SN ratio of the capacitance values on the first capacitance map is low.

[Sixth Embodiment]

Another embodiment of the present invention will be described below based on FIGS. 41 to 47. For convenience of description, the same reference characters will be given to members that have the same functions as the members described in the above embodiments, and descriptions thereof will not be made.

(Configuration of Touch Sensor System 600)

Figure 41:
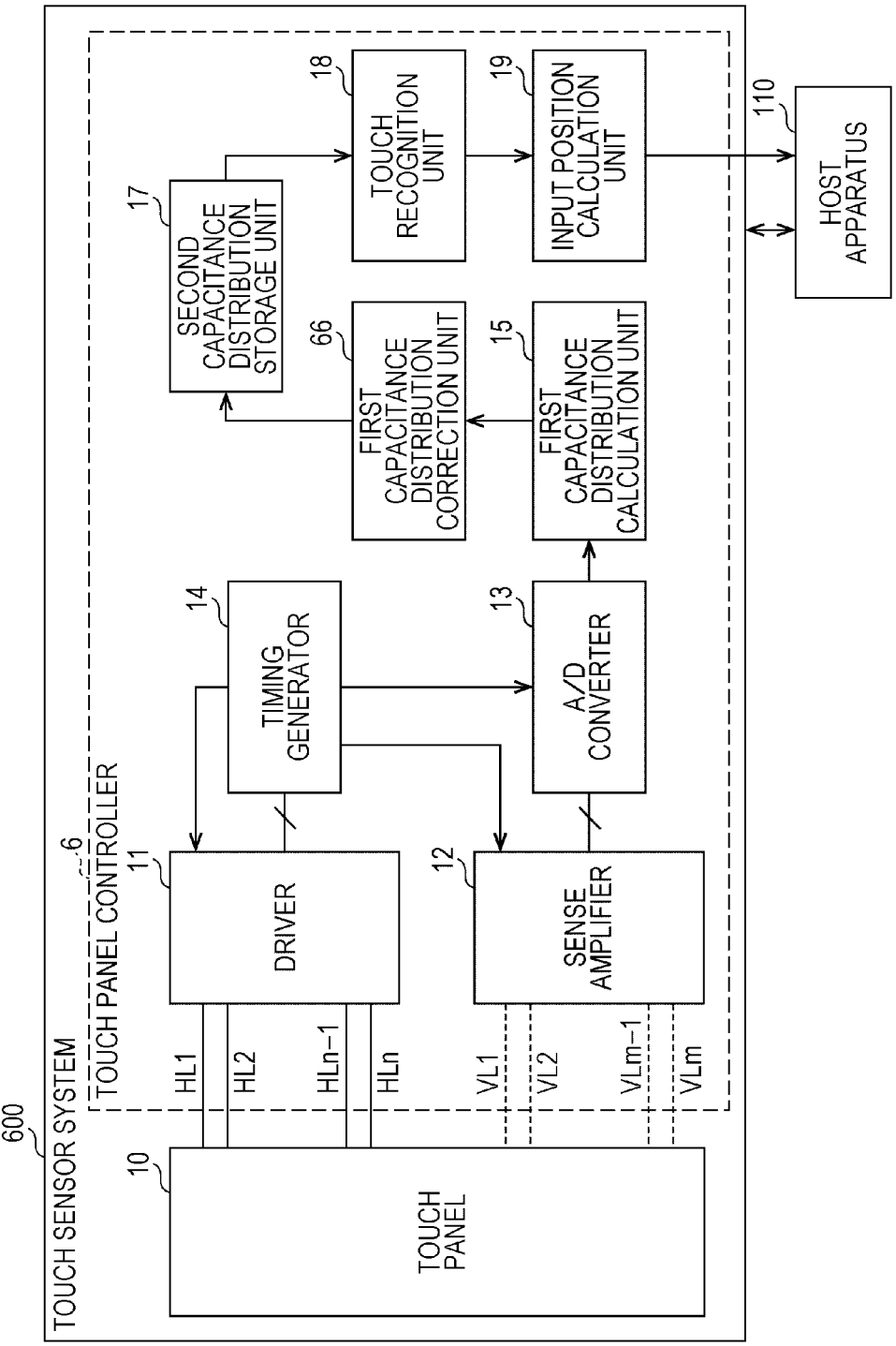
FIG. 41 is a function block diagram that illustrates a configuration of a touch sensor system according to a sixth embodiment of the present invention.

FIG. 41 is a function block diagram that illustrates the configuration of a touch sensor system 600 of this embodiment. The touch sensor system 600 of this embodiment has a configuration that may be obtained (i) by substituting a touch panel controller 6 for the touch panel controller 1 included in the touch sensor system 100 of the first embodiment and (ii) by substituting a first capacitance distribution correction unit 66 (a second signal value map generation unit) for the first capacitance distribution correction unit 16 included in the touch panel controller 1 of the first embodiment.

The other members of the touch sensor system 600 of this embodiment are the same as the members of the touch sensor system 100 of the first embodiment, the same reference characters will thus be given thereto, and descriptions thereof will not be made.

(Configuration of First Capacitance Distribution Correction Unit 66)

Figure 42:
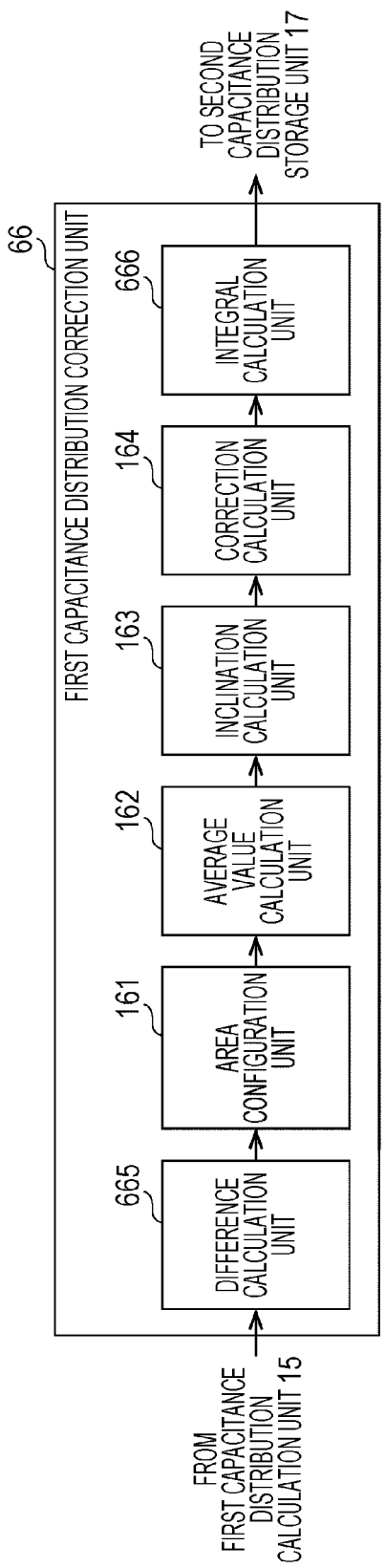
FIG. 42 is a function block diagram that illustrates a specific configuration of a first capacitance distribution correction unit in the touch sensor system according to the sixth embodiment of the present invention.

FIG. 42 is a function block diagram that illustrates a specific configuration of the first capacitance distribution correction unit 66. The first capacitance distribution correction unit 66 includes a difference calculation unit 665 and an integral calculation unit 666 in addition to the area configuration unit 161, the average value calculation unit 162, the inclination calculation unit 163, and the correction calculation unit 164. Accordingly, the first capacitance distribution correction unit 66 of this embodiment has a configuration that may be obtained by adding the difference calculation unit 665 and the integral calculation unit 666 to the first capacitance distribution correction unit 16 of the first embodiment.

(Difference Calculation and Integral Calculation)

The difference calculation unit 665 performs difference calculation for a matrix that expresses the capacitance distribution. Meanwhile, the integral calculation unit 666 performs integral calculation for a matrix that expresses the capacitance distribution. First, the difference calculation and the integral calculation will be described with reference to FIG. 43 prior to a description of operations of the difference calculation unit 665 and the integral calculation unit 666.

FIG. 43 is a diagram that exemplifies the difference calculation and the integral calculation. FIG. 43(a) illustrates the matrix C that expresses the capacitance distribution of the first capacitance map MAP1, which is the same as FIG. 5.

FIG. 43(b) illustrates a matrix Cdif that is generated by performing the difference calculation for the matrix C. The matrix Cdif will hereinafter be referred to as difference matrix. Here, the difference calculation for generating the difference matrix Cdif from the matrix C is performed by the following equation (22).

$$C\text{dif}[i][j]=C[i][j]-C[i-1][j] \quad (22)$$

The difference calculation of the equation (22) may be referred to as differential calculation.

FIG. 43(c) illustrates a matrix Cint that is generated by performing the integral calculation for the matrix Cdif. The matrix Cint will hereinafter be referred to as integral matrix. Here, the integral calculation for generating the integral matrix Cint from the matrix Cdif is performed by the following equation (23).

$$C\text{int}[i][j]=C\text{int}[i-1][j]+C\text{dif}[i][j] \quad (23)$$

FIGS. 43(a) and (c) indicate that the integral matrix Cint is the same matrix as the matrix C. Accordingly, the difference calculation of the equation (22) and the integral calculation of the equation (23) may be considered to be mutually in the relationship of inverse computation. Thus, the integral calculation of the equation (23) may be considered as a process for restoring the difference matrix Cdif obtained as a result of the difference calculation by the equation (22) to the original matrix C.

(Difference Calculation Unit 665)

The difference calculation unit 665 acquires the first capacitance map MAP1 from the first capacitance distribution calculation unit 15. The difference calculation unit 665 applies the difference calculation to the components C1[i]/[j] of the matrix C1 that expresses the distribution of the capacitances on the first capacitance map. That is, the difference calculation unit 665 generates a difference matrix C1dif from the matrix C1 by the equation (22).

The difference calculation unit 665 provides the difference matrix C1dif to the area configuration unit 161. Subsequently, the correction calculation for the difference matrix C1dif is performed from the area configuration unit 161 to the correction calculation unit 164. A matrix that is generated from the difference matrix C1dif by the correction calculation by the equation (8) will hereinafter be referred to as matrix C2dif. A capacitance map that corresponds to the matrix C2dif will be referred to as second capacitance map MAP2dif.

Figure 44:
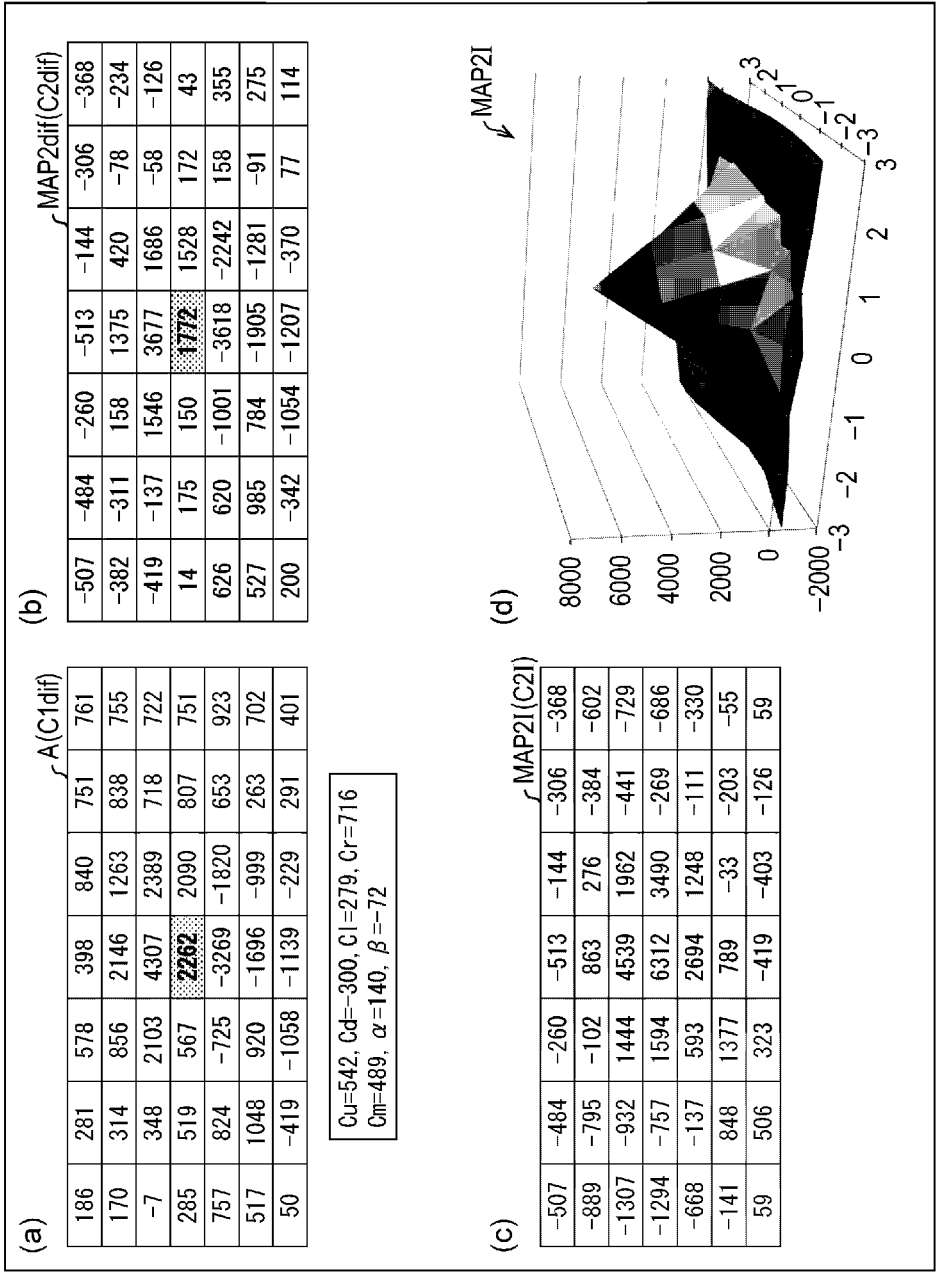
FIG. 44 is a diagram that exemplifies correction calculation according to the sixth embodiment of the present invention.

FIG. 44 exemplifies a case where processes by the first capacitance distribution correction unit 66 are performed for the matrix C1 that expresses the distribution of the capacitances in the area A in FIG. 5.

FIG. 44(a) exemplifies the difference matrix C1dif in the area A, and FIG. 44(b) exemplifies the matrix C2dif on the second capacitance map MAP2dif. In the difference matrix C1dif illustrated in FIG. 44(a), Cu=542, Cd=−300, Cl=279, Cr=716, Cm=489, α=140, and β=−72 hold.

(Integral Calculation Unit 666)

The integral calculation unit 666 is provided for restoration from the distribution of the capacitances to which the difference calculation is applied in the difference calculation unit 665.

The matrix C2dif and the second capacitance map MAP2dif are provided from the correction calculation unit 164 to the integral calculation unit 666. The integral calculation unit 666 generates an integral matrix C2I from the matrix C2dif by the equation (23). Here, a capacitance map that corresponds to the integral matrix C2I will be referred to as second capacitance map MAP2I.

FIG. 44(c) exemplifies the integral matrix C2I on the second capacitance map MAP2I, and FIG. 44(d) exemplifies a three-dimensional graph that represents the capacitance distribution on the second capacitance map MAP2I. FIG. 44(d) illustrates that the capacitances are effectually corrected, similarly to the above-described first to fifth embodiments.

(Process Flow of Calculating Coordinates of Input Position in Touch Sensor System 600)

Figure 45:
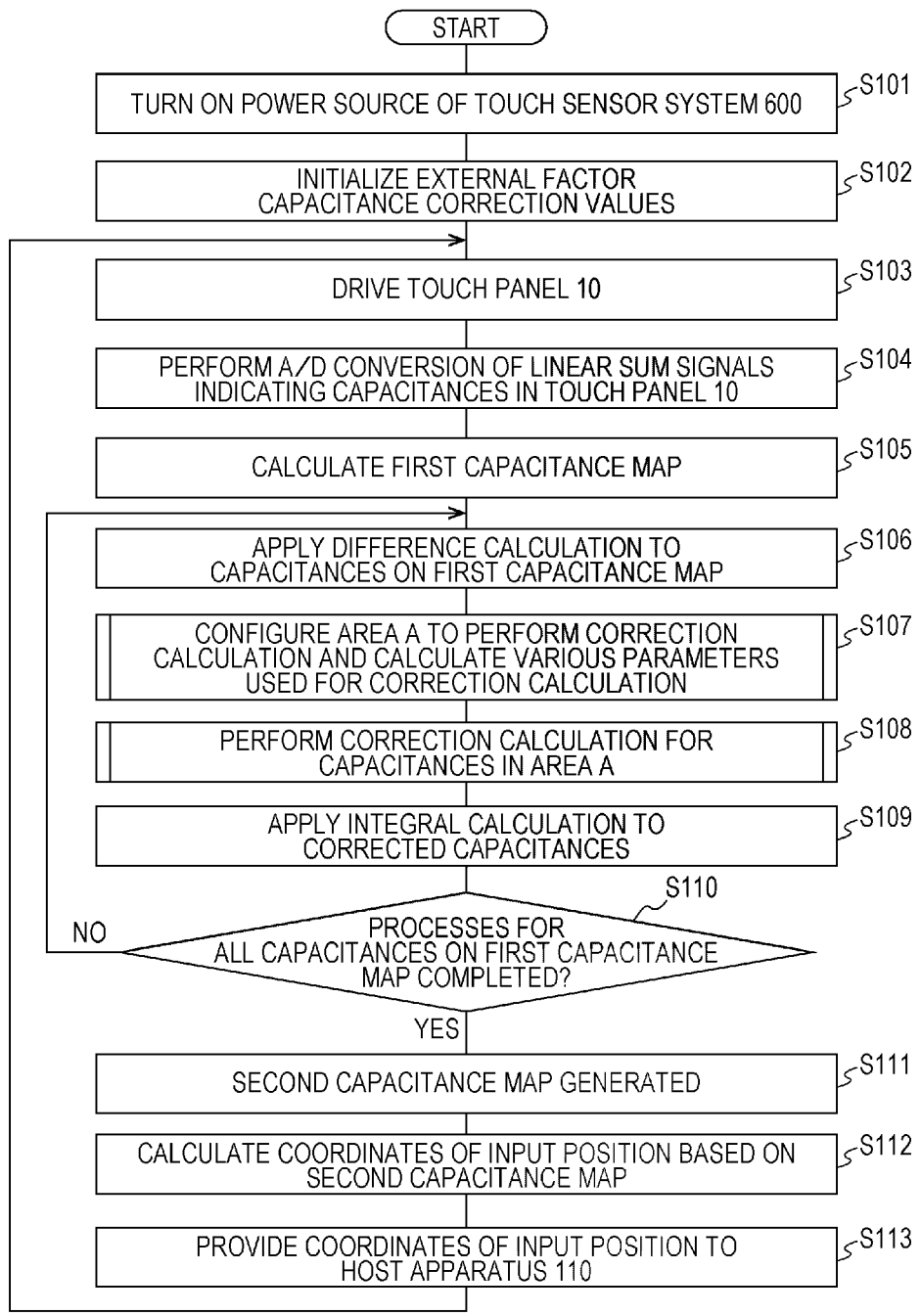
FIG. 45 is a flowchart that illustrates a process flow of calculating the coordinates of an input position in the touch sensor system according to the sixth embodiment of the present invention.

A general flow of processes of the touch sensor system 600 of this embodiment is illustrated by FIG. 45. FIG. 45 is a flowchart that exemplifies the process flow of calculating the coordinates of an input position in the touch sensor system 600. FIG. 45 illustrates processes S101 to S113.

Processes S101 to S105, processes of S107 and S108, and processes S110 to S113 of FIG. 45 are the same as processes S1 to S5, processes S6 and S7, and processes S8 to S11 of FIG. 13, respectively. Accordingly, the processes of FIG. 45 may be considered as the processes in which processes S106 and S109 are added to the processes of FIG. 13. A description will be made below only about processes S106 and S109 and processes around those.

The difference calculation unit 665 generates the difference matrix C1dif from the matrix C1 that expresses the distribution of the capacitances on the first capacitance map by the equation (22) (process S106).

Next, the correction calculation for the difference matrix C1dif by the equation (8) is performed through processes S107 and S108, and the matrix C2dif is generated.

The integral calculation unit 666 generates the integral matrix C2I from the matrix C2dif by the equation (23) (process S109).

The first capacitance distribution correction unit 66 then confirms whether or not processes S106 to S109 are performed for all the capacitances on the first capacitance map (process S110). In a case where processes S106 to S109 are performed for not all the capacitances on the first capacitance map (NO in process S110), the process flow returns to process S106, and processes S106 to S109 in the first capacitance distribution correction unit 66 are repeated.

In a case where processes S106 to S109 are performed for all the capacitances on the first capacitance map (YES in process S110), the first capacitance distribution correction unit 66 generates the second capacitance map (process S111).

Processes S111 to S113 are subsequently performed similarly to processes S9 to S11 in FIG. 13, and the coordinates of an input position in the touch sensor system 600 are calculated and provided to the host apparatus 110. After process S113 is finished, the process flow returns to process S103, and processes S103 to S113 are repeated during the period in which the power source of the touch sensor system 600 is turned on.

(Effects of Touch Sensor System 600)

Effects of the touch sensor system 600 in this embodiment will be described below with reference to FIGS. 46 and 47.

Figure 46:
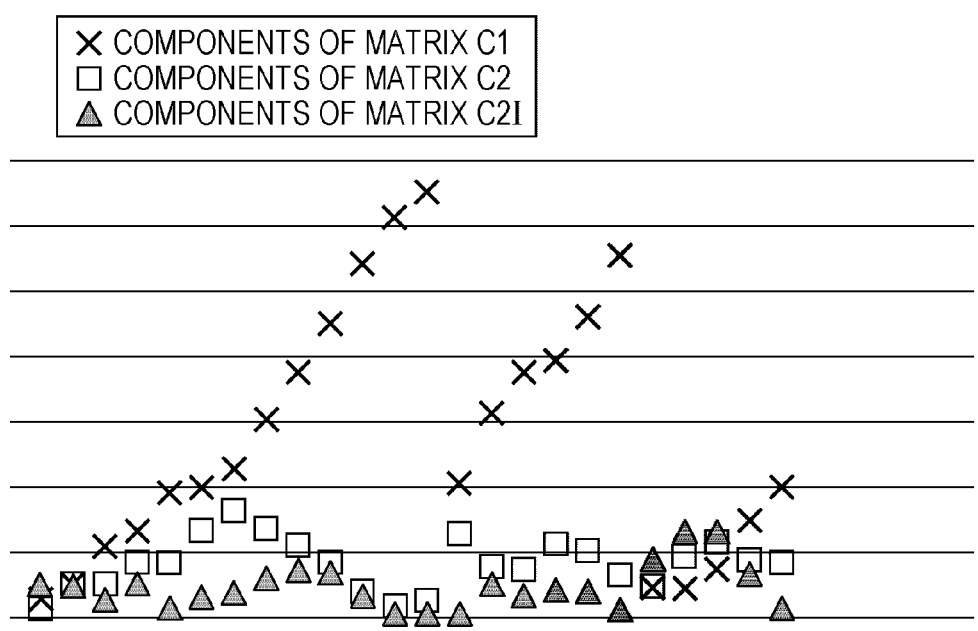
FIG. 46 is a diagram that exemplifies an effect of the touch sensor system according to the sixth embodiment of the present invention.

FIG. 46 exemplifies the distribution of uncorrected capacitances in the area A (that is, the distribution that represents the matrix C1), the distribution of the corrected capacitances obtained by the correction calculation of the first embodiment (that is, the distribution that represents the matrix C2), and the distribution of the corrected capacitances obtained by the correction calculation of this embodiment (that is, the distribution that represents the matrix C2I) as one-dimensional graphs. FIG. 44 indicates that the correction calculation of this embodiment more effectually suppresses the dispersion of the capacitance distribution than the correction calculation of the first embodiment.

Figure 47:
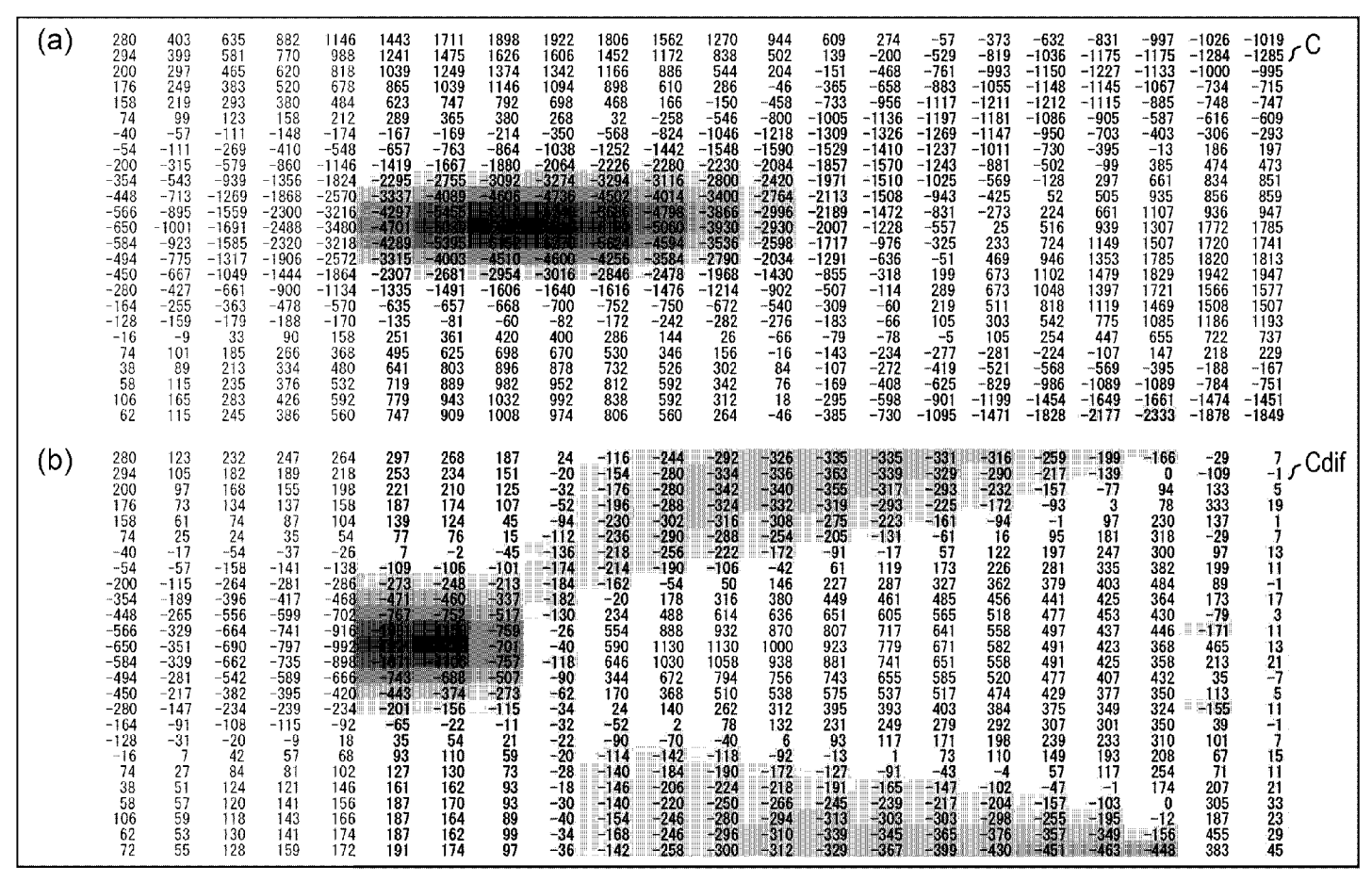

FIG. 47 is a diagram for illustrating effectiveness of the correction calculation by using the difference matrix, which is the correction calculation of this embodiment. FIG. 47(a) exemplifies the matrix C as a matrix that expresses the distribution of the capacitances. FIG. 47(b) exemplifies the matrix Cdif that is generated from the matrix C.

In FIG. 47, it is understood that the difference matrix Cdif more specifically expresses the degree of change in the capacitance value in the capacitance distribution compared to the matrix C. Accordingly, the difference matrix Cdif enables (i) an area where negative values are present, (ii) an area where values around zero are present, and (iii) an area where positive values are present to be more clearly demarcated compared to the matrix C.

Therefore, the difference matrix Cdif enables the correction calculation to be individually applied to each of (i) the area where negative values are present, (ii) the area where values around zero are present, and (iii) the area where positive values are present. Thus, more accurate correction calculation is performed than a case where the correction calculation is applied to the matrix C.

Further, the magnitudes (absolute values) of the components of the difference matrix Cdif are in general smaller compared to the magnitudes (absolute values) of the components of the matrix C. Accordingly, it is expected that the correction calculation is performed for the difference matrix Cdif and errors that occur in the correction calculation thereby become smaller compared to a case where the correction calculation is performed for the matrix C.

Thus, the fact that the correction calculation of this embodiment is more effectual correction calculation compared to the correction calculation of the first embodiment may be considered as a general tendency.

Further, the touch sensor system 600 of this embodiment may perform the correction calculation for calibrated capacitance values. Here, calibration means a process of calculating the difference value between (i) the capacitance detected in the touch sensor system and (ii) a reference value, while the value of the capacitance in a static state (for example, the touch panel is embedded in a housing) is set as the reference value.

[Modification Example]

In the first to sixth embodiments, the descriptions are made on the assumption that the touch panel 10 is a capacitance type touch panel. However, the present invention is not limited to capacitance type touch panels. The present invention may be applied to another type touch panel that is capable of reading signal values from sensors (for example, the sense lines VL1 to VLm) provided in the touch panel like a matrix (for example, a resistive film type touch panel that is capable of reading plural electrical resistance values which are distributed like a matrix).

The sixth embodiment indicates that the touch sensor system according to one aspect of the present invention may perform the correction calculation for calibrated capacitance values. Although not limited to calibration, the touch sensor system according to one aspect of the present invention may perform the correction calculation for capacitance values to which other signal processing is applied (for example, a process that adds a specific offset value to the capacitance value).

[Seventh Embodiment]

Figure 48:
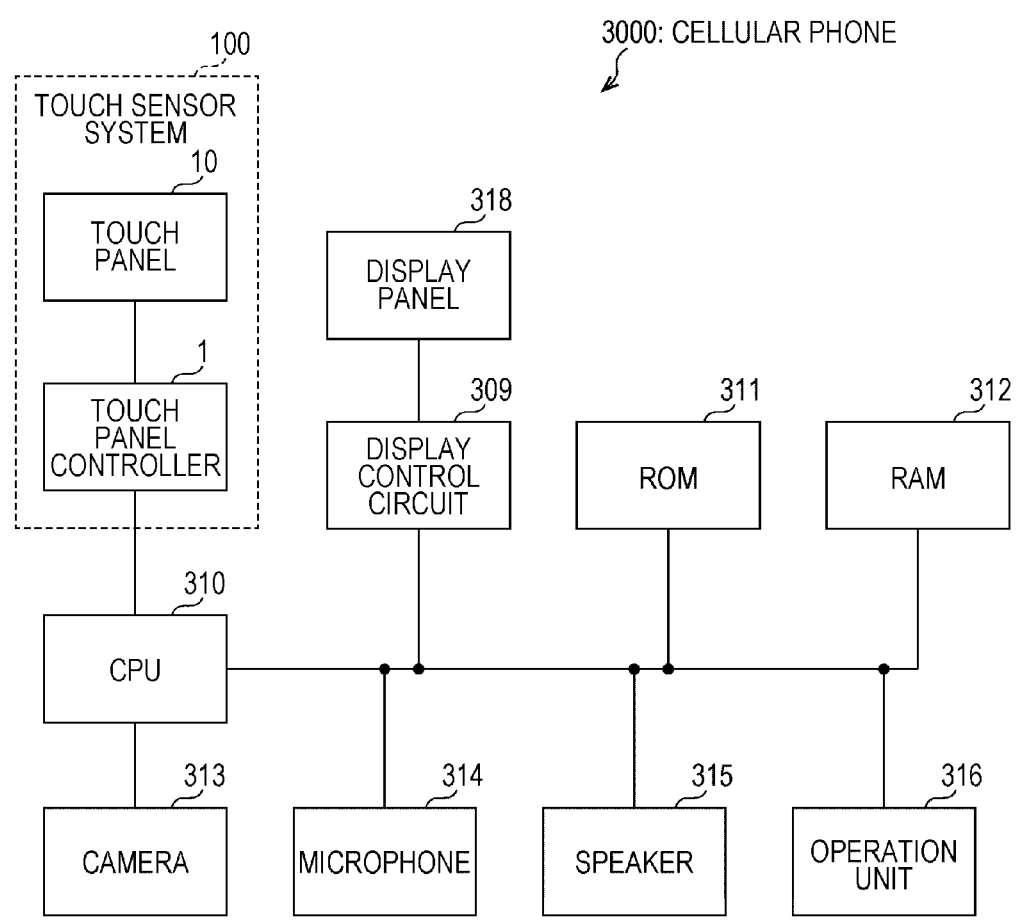
FIG. 48 is a function block diagram that illustrates a configuration of a cellular phone according to a seventh embodiment of the present invention.
Figure 49:
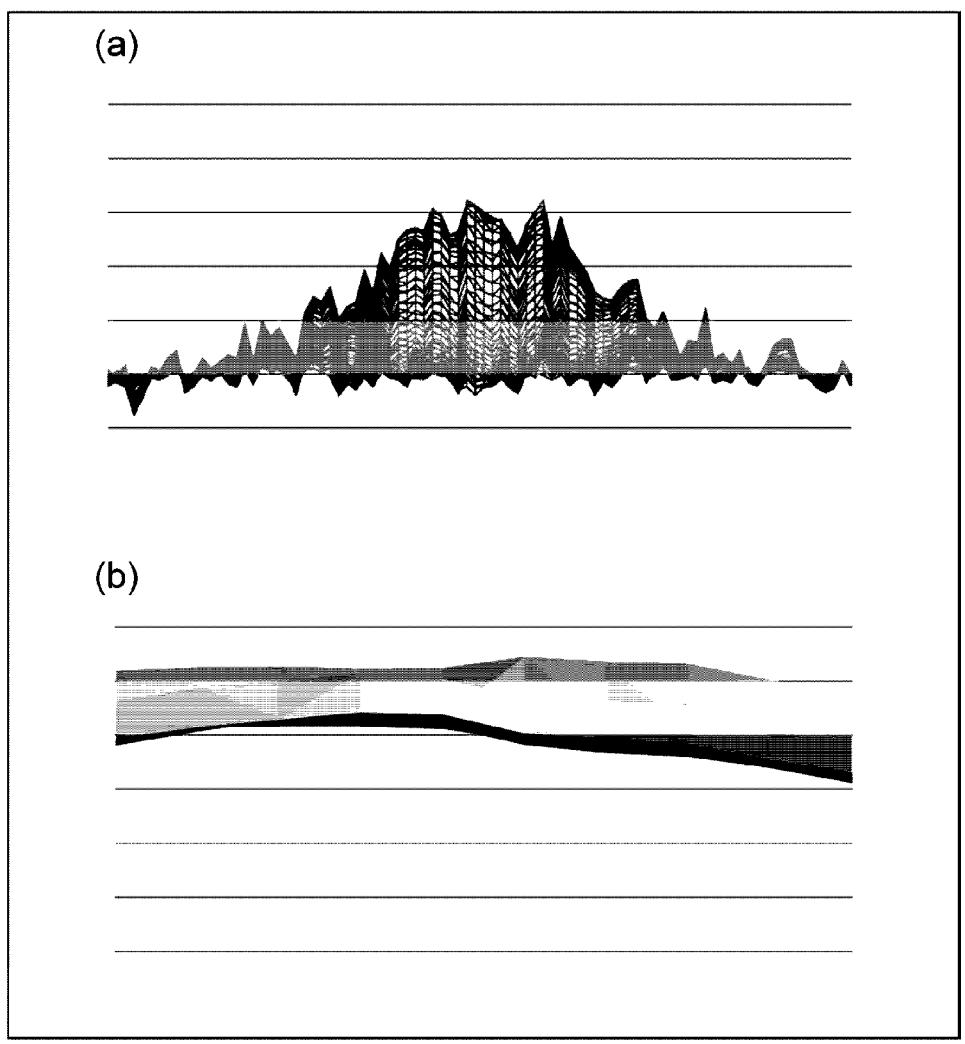
FIG. 49 is a diagram that exemplifies a capacitance distribution in a case where a portion around the center of a touch panel is pressed down and bend occurs in the touch panel.

Another embodiment of the present invention will be described below based on FIG. 48. For convenience of description, the same reference characters will be given to members that have the same functions as the members described in the above embodiments, and descriptions thereof will not be made. FIG. 48 is a function block diagram that illustrates the configuration of a cellular phone 3000 (electronic device) as one example of an electronic device that includes the touch sensor system 100 described in the first embodiment.

The cellular phone 3000 includes a central processing unit (CPU) 310, a camera 313, a microphone 314, a speaker 315, an operation unit 316, a display panel 318, a display control circuit 309, a read only memory (ROM) 311, a random access memory (RAM) 312, and the touch sensor system 100.

Elements included in the cellular phone 3000 are mutually connected by a data bus. Although not illustrated in FIG. 48, a configuration is possible in which the cellular phone 3000 includes an interface for wired connection with another electronic device.

The CPU 310 controls operations of the cellular phone 3000. The CPU 310 executes a program stored in the ROM 311, for example. The operation unit 316 is an input device that receives inputs of instructions of a user of the cellular phone 3000 and has various operation keys or buttons, for example.

The ROM 311 is a ROM with which writing or deletion is feasible such as an erasable programmable ROM (EPROM) or a flash memory and stores data in a non-volatile manner. The RAM 312 stores data generated by execution of programs by the CPU 310 or data input via the operation unit 316 in a volatile manner.

The camera 313 photographs an object in response to an operation of the operation unit 316 by the user. Image data of the photographed object are stored in the RAM 312 or an external memory (for example, a memory card).

The microphone 314 receives an input of sound of the user. The cellular phone 3000 digitizes sound signals that are input as analog data. The cellular phone 3000 transmits the sound signals as digitized signals to a communication target (for example, another cellular phone). The speaker 315 outputs sound signals as analog signals based on music data or the like that are stored in the RAM 312, for example.

The display panel 318 displays an image stored in the ROM 311 or the RAM 312, by the display control circuit 309. The display panel 318 may be superposed on the touch panel 10 or may have the touch panel 10 built therein. A touch recognition signal that is generated in the touch panel controller 1 and indicates a touch position on the touch panel 10 may be allowed to have the same role as a signal that indicates that the operation unit 316 is operated.

The touch sensor system 100 includes the touch panel controller 1 and the touch panel 10. The operation of the touch sensor system 100 is controlled by the CPU 310.

The host apparatus 110 of the first embodiment may be realized by the CPU 310. Further, a process of detecting the position where an input operation on the touch panel 10 is performed based on digitized linear sum signals may be executed by the CPU 310 that is provided on the outside of the touch panel controller 1.

That is, the first capacitance distribution calculation unit 15, the first capacitance distribution correction unit 16, the second capacitance distribution storage unit 17, the touch recognition unit 18, and the input position calculation unit 19, which are included in the touch panel controller 1 in the first embodiment, may be provided in the CPU 310.

In this case, the touch panel controller 1 provides the digitized linear sum signals from the A/D converter 13 to the first capacitance distribution calculation unit 15 that is provided in the CPU 310.

The CPU 310 performs the same processes as the first embodiment in each of the first capacitance distribution calculation unit 15, the first capacitance distribution correction unit 16, the second capacitance distribution storage unit 17, the touch recognition unit 18, and the input position calculation unit 19.

The cellular phone 3000 may include any one of the touch sensor system 200 to 600 of the second to sixth embodiments instead of the touch sensor system 100 of the first embodiment.

In this embodiment, the cellular phone 3000 as one example of the electronic device that includes the touch sensor system 100 is a cellular phone with a camera, a smart phone, or the like. However, the electronic device that includes the touch sensor system 100 is not limited thereto. For example, portable terminal apparatuses such as tablets and information processing apparatuses such as PC monitors, signage systems, electronic white boards, and information displays may also be included in the electronic device that includes the touch sensor system 100.

[Eighth Embodiment]

A control block (particularly the CPU 310) of the cellular phone 3000 may be realized by logic circuits (hardware) that are formed on an integrated circuit (IC chip) or the like or may be realized by software by using a CPU.

In the latter case, the cellular phone 3000 includes a CPU that executes commands of programs, which are software for realizing functions, a ROM or a storage device (which will be referred to as "recording medium") in which the programs and various data are recorded such that those are readable by a computer (or a CPU), a RAM or the like on which the programs are deployed. Further, the computer (or the CPU) reads out the programs from the recording medium and executes those, thereby achieving an object of the present invention. As the recoding medium, "non-transitory tangible medium", for example, a tape, a disk, a card, a semiconductor memory, a programmable logic circuit, or the like may be used. Further, the programs may be supplied to the computer via any transmission medium that is capable of transmitting the programs (such as a communication network or a broadcasting wave). The present invention may be realized by a mode of data signals embedded in a carrier in which the programs are shaped by electronic transmission.

[CONCLUSION]

A touch panel controller (1) according to a first aspect of the present invention is a touch panel controller including a first signal value map generation unit (the first capacitance distribution calculation unit 15) that outputs a first signal value map (for example, the first capacitance map MAP1) which indicates a distribution of signal values in a touch panel (10) in which plural signal values are formed in a matrix at intersections of m sense lines (VL1 to VLm) and n drive lines (HL1 to HLn) (both of m and n are integers that are equal to or greater than three), and a touch recognition unit (18) that detects an input on the touch panel based on the signal values, in which the touch panel controller further includes a second signal value map generation unit (a first capacitance distribution correction unit) that configures an area (A) that is a broader range than a range where changes in the signal values due to an input operation on the touch panel occur on the first signal value map and provides a second signal value map (for example, the second capacitance map MAP2) which is generated by performing correction calculation which cancels changes in the signal values due to external factors which are different from the input operation on the touch panel in the area to the touch recognition unit.

In the above configuration, in the touch panel controller, the second signal value map generation unit performs the correction calculation for the first signal value map generated on the first capacitance map.

That is, the second signal value map generation unit configures a broader range than the range where changes in the signal values due to the input operation on the touch panel occur as the area A to perform the correction calculation on the first signal value map. The second signal value map generation unit performs the correction calculation that cancels the changes in the signal values due to external factors which are different from the input operation on the touch panel in the area A and thereby generates the second signal value map.

The second signal value map is provided from the second signal value map generation unit to the touch recognition unit. Accordingly, the touch recognition unit may detect an input on the touch panel by using the second signal value map that indicates the distribution of the signal values.

Accordingly, even in a case where the first signal value map is influenced by an external factor such as bend of the touch panel, the influence of the external factor is removed by using the second signal value map to which the correction calculation has been applied, and the input on the touch panel may be detected.

Further, a touch panel controller according to a second aspect of the present invention is the touch panel controller in the first aspect, in which the area is expressed as a rectangle, the direction in which the sense lines are arranged is set as an up-down direction, the direction in which the drive lines are arranged is set as a left-right direction, and the second signal value map generation unit may perform the correction calculation by using an average value Cm of the signal values in the area, an up-down inclination α that indicates a change amount of the signal value in the up-down direction in the area, and a left-right inclination β that indicates a change amount of the signal value in the left-right direction in the area.

In the above configuration, the correction calculation in the second signal value map generation unit is performed by using the up-down inclination α and the left-right inclination β in addition to the average value Cm of the signal values in the rectangular area A.

Accordingly, as illustrated in FIG. 20(*d*), the correction calculation is performed such that the signal values are maintained at large values in the vicinity of the position where the changes in the signal values due to an input operation on the touch panel occur but the signal values become small values in positions separated from the position where the changes in the signal values due to the input operation on the touch panel occur. Thus, the correction calculation that effectually removes the influence of external factors is enabled.

Further, a touch panel controller according to a third aspect of the present invention is the touch panel controller in the first or second aspect, in which the first signal value map may be expressed by a matrix C with m rows and n columns, the second signal value map generation unit may include an area configuration unit (161), an average value calculation unit (162), an inclination calculation unit (163), and a correction calculation unit (164), the area configuration unit may configure the area by a rectangle that has four points (X−L, Y−D), (X−L, Y+U), (X+R, Y−D), and (X+R, Y+U) as vertices with respect to a point (X, Y) on the first signal value map which corresponds to a component C[X][Y] in the Xth row and Yth column of the matrix C (1<X<m and 1<Y<n) (each of L, R, U, and D is an integer that is equal to or greater than one), the average value calculation unit may calculate (i) an average value Cm of all components, (ii) an average value Cu of components of Ku rows from the highest row in a row direction, (iii) an average value Cd of components of Kd rows from the lowest row in the row direction, (iv) an average value Cl of components of Kl columns from the leftmost column in a column direction, and (v) an average value Cr of components of Kr columns from the rightmost column in the column direction of a matrix C1 with (L+R+1) rows and (D+U+1) columns that expresses a distribution of the signal values in the area (each of Ku, Kd, Kl, and Kr is an integer that is equal to or greater than one), the inclination calculation unit may calculate the up-down inclination α and the left-right inclination β by $\alpha = (Cu - Cd)/\{(U-(Ku-1))+(D-(Kd-1))\}$ and $\beta = (Cl - Cr)/\{(L-(Kl-1))+(R-(Kr-1))\}$, and the correction calculation unit may calculate a matrix C2 that expresses the second signal value map by $$C2[i][j]=C1[i][j]-Cm+j\times\alpha+i\times\beta$$

(where −L≤i≤R and −U≤j≤D).

In the above configuration, in the touch panel controller, the area configuration unit configures the area A by the rectangle that has the four points (X−L, Y−D), (X−L, Y+U), (X+R, Y−D), and (X+R, Y+U), which are different from the origin (0, 0), as the vertices with respect to the point (X, Y) on the first signal value map MAP1 that corresponds to the component C[X][Y] in the Xth row and Yth column (1<X<m and 1<Y<n) of the matrix C which expresses the first signal value map MAP1.

Here, L, R, U, and D are referred to as external factor area parameters, and each of those is an integer that is equal to or greater than one. It is preferable that those external factor area parameters be appropriately configured such that the area A becomes a broader range than the range where the changes in the signal values due to the input operation on the touch panel occur.

The average value calculation unit calculates the average value Cm in the matrix C1 with (L+R+1) rows and (D+U+1) columns that expresses the distribution of the signal values in the area A by the above-described equation (1). The average value calculation unit calculates the average values Cu, Cd, Cl, and Cr by the above-described equations (16) to (19). Particularly, in the case of Ku=Kd=Kl=Kr=1, the average values Cu, Cd, Cl, and Cr are calculated by the above-described equations (2) to (5).

The inclination calculation unit calculates the up-down inclination α and the left-right inclination β by using the values of Cm, Cu, Cd, Cl, and Cr and by the above-described equations (20) and (21). Particularly, in the case of Ku=Kd=Kl=Kr=1, the up-down inclination α and the left-right inclination β are calculated by the above-described equations (6) and (7).

The correction calculation unit calculates the matrix C2 that expresses the second signal value map MAP2 by the above-described equation (8). That is, the matrix C2 is obtained as a result of correction of the matrix C1 by the correction calculation unit.

Accordingly, even in a case where the first signal value map is influenced by an external factor such as bend of the touch panel, the influence of the external factor is removed by using the second signal value map to which the correction calculation has been applied, and the input on the touch panel may be detected.

Further, a touch panel controller according to a fourth aspect of the present invention is the touch panel controller in the third aspect, in which the area configuration unit may configure the point (X, Y) on the first signal value map around the point where a local maximum value on the first signal value map is present.

In general, it is expected that a local maximum value of the signal values that are distributed in the touch panel occurs around the position where an input is performed on the touch panel. Accordingly, the above configuration enables the correction calculation around the position where the input is performed on the touch panel to be performed.

Further, a touch panel controller according to a fifth aspect of the present invention is the touch panel controller in the fourth aspect, in which the second signal value map generation unit may generate the (m×n) second signal value maps that correspond to the components of the matrix C.

In the above configuration, the second signal value map generation unit generates the second signal value maps that respectively correspond to (m×n) signal values which are distributed on the touch panel. Accordingly, even in a case where respective inputs are made in plural positions on the touch panel, the correction calculation may individually be performed around the input positions.

Further, a touch panel controller according to a sixth aspect of the present invention is the touch panel controller in any one of the third to fifth aspects, in which the second signal value map generation unit may further include a multiplying factor configuration unit (265), the multiplying factor configuration unit may update the average value Cm, the up-down inclination α, and the left-right inclination β to the values multiplied by a prescribed multiplying factor (K).

In the above configuration, the correction calculation unit calculates the matrix C2 that expresses the second signal value map MAP2 by the above-described equation (15). Accordingly, the multiplying factor configuration unit is provided, and the correction amount of the signal value may thereby be adjusted by using the multiplying factor K.

Further, a touch panel controller according to a seventh aspect of the present invention is the touch panel controller in any one of the third to sixth aspects, in which the second signal value map generation unit may further include a correction necessity determination unit (365), the correction necessity determination unit may identify the components C1[i][j] that have larger signal values than a prescribed determination value (V) in the matrix C1, and the correction calculation unit may calculate the components C2[i][j] of the matrix C2 for the components C1[i][j] identified by the correction necessity determination unit.

In the above configuration, the correction calculation unit may perform the correction calculation by the above-described equation (8) or (15) only for the components C1[i][j] that have larger signal values than the determination value V.

Accordingly, the determination value V is configured as a proper value that may rule out a sufficiently small amount compared to the magnitudes of the signal values which occur in a case where an input is performed on the touch panel, and the memory capacity that is necessary for processes in the correction calculation unit may thereby be reduced.

Further, a touch panel controller according to an eighth aspect of the present invention is the touch panel controller in any one of the third to seventh aspects, in which the second signal value map generation unit may further include a difference calculation unit (665), and the difference calculation unit may provide a difference matrix (Cdif) that is generated by applying difference calculation to the matrix C which expresses the first signal value map to the area configuration unit.

In the above configuration, the second signal value map generation unit may perform the correction calculation for the difference matrix Cdif that is generated from the matrix C which expresses the first signal value map MAP1. The difference calculation unit generates the difference matrix Cdif from the matrix C by the difference calculation expressed by the above-described equation (22).

In general, it is understood that the difference matrix Cdif more specifically expresses the degree of change in the capacitance value in the capacitance distribution compared to the matrix C. Accordingly, performing the correction calculation for the difference matrix Cdif enables more accurate correction calculation compared to the correction calculation for the matrix C to be performed.

Further, a touch panel controller according to a ninth aspect of the present invention is the touch panel controller in the eighth aspect, in which the second signal value map generation unit may further includes an integral calculation unit (666), and the integral calculation unit may perform integral calculation for restoring the difference matrix to the matrix C.

In the above configuration, the integral calculation unit performs the integral calculation for restoring the difference matrix Cdif to the matrix C, that is, the integral calculation expressed by the above-described equation (23).

Accordingly, the integral calculation unit is provided, and the matrix obtained as a result of the correction calculation for the difference matrix Cdif may thereby be restored as a corrected matrix that is similar to the matrix C to which the difference calculation is not applied.

Further, a touch panel controller according to a tenth aspect of the present invention is the touch panel controller in any one of the first to ninth aspects, in which the signal value may be a capacitance value.

In the above configuration, the present invention may be applied to a capacitance type touch panel.

Further, a touch sensor system according to an eleventh aspect of the present invention may include the touch panel controller according to any one of the first to tenth aspects and a touch panel in which plural signal values are distributed in a matrix.

Further, an electronic device according to a twelfth aspect of the present invention may include the touch sensor system according to the eleventh aspect.

Further, the electronic device according to the twelfth aspect may be realized by a computer. In this case, a control program of the electronic device that causes the computer to operate as the units included in the electronic device and thereby realizes the electronic device with the computer and a computer-readable recording medium that records the control program are included in the scope of the present invention.

[Additional Matters]

The present invention is not limited to the above-described embodiments. Various modifications are possible in the scope recited in claims, and embodiments that are obtained by appropriately combining technical means that are disclosed in the different embodiments are included in the technical scope of the present invention. In addition, new technical features may be formed by combining technical means that are disclosed in the embodiments.

The present invention may also be described as follows.

That is, a touch sensor system according to one aspect of the present invention includes a touch panel that is formed of plural sensors which are arranged in a matrix, a capacitance distribution calculation unit that creates a first capacitance distribution by signals detected by the touch panel, a capacitance distribution correction unit that corrects capacitance changes which are caused by a stress due to a substance which contacts with the touch panel to create a second capacitance distribution, and a touch recognition unit that performs touch recognition by using the second capacitance distribution.

Further, a touch sensor system according to one aspect of the present invention includes a touch panel that is formed of plural sensors which are arranged in a matrix, a capacitance distribution calculation unit that creates a first capacitance distribution with (m×n) capacitances by signals detected by the touch panel (both of m and n are integers that are equal to or greater than three), a capacitance distribution correction unit that selects focus point coordinates (X, Y) from the first capacitance distribution (X and Y are integers that satisfy 1<X<m and 1<Y<n), selects an external factor area by coordinates LD (X−L, Y−D), LU (X−L, Y+U), RU (X+R, Y+U), and RD (X+R, Y−U) (each of U, D, L, and R is an integer that is equal to or greater than one), calculates an area average value that is an average value of capacitance values which are measured by all the sensors included in the external factor area, calculates a higher side average value from the highest row of the external factor area, calculates a lower side average value from the lowest row of the external factor area, calculates a left side average value from the leftmost column of the external factor area, calculates a right side average value from the rightmost column of the external factor area, calculates an up-down inclination by (higher side average−lower side average)/$(U+D)$, calculates a left-right inclination by (left side average−right side average)/$(L+R)$, configures an up-down position correction coefficient which has the focus point as 0, to which 1 is added when movement by 1 is made away from the focus point in the y direction, and from which 1 is subtracted when movement by 1 is made away from the focus point in the negative y direction, configures a left-right position correction coefficient which has the focus point as 0, to which 1 is added when movement by 1 is made away from the focus point in the x direction, and from which 1 is subtracted when movement by 1 is made away from the focus point in the negative x direction, calculates a corrected capacitance value with respect to an original capacitance value which is measured by the sensors of each coordinate point of the external factor area by original capacitance value+(up-down inclination $x$ up-down position correction coefficient)+(left-right inclination $x$ left-right position correction coefficient)−(average value of whole area), and creates a second capacitance distribution with respect to the focus point, and a touch recognition unit that performs touch recognition by using the second capacitance distribution.

Further, in a touch sensor system according to one aspect of the present invention, the capacitance distribution correction unit calculates corrected capacitance values by multiplying the left-right position correction coefficient and the up-down position correction coefficient by a specific coefficient.

Further, in a touch sensor system according to one aspect of the present invention, the capacitance distribution correction unit calculates a higher side average value of K rows from the highest row in the external factor area, a lower side average value of K rows from the lowest row in the external factor area, a left side average value of K columns from the leftmost column in the external factor area, and a right side average value of K columns from the rightmost column in the external factor area (K is an integer that is equal to or greater than one), calculates the up-down inclination by (higher side average−lower side average)/$\{(U-(K-1))+(D-(K-1))\}$, and calculates the left-right inclination by (left side average−right side average)/$\{(L-(K-1))+(R-(K-1))\}$.

Further, in a touch sensor system according to one aspect of the present invention, values of the first capacitance distribution are values that are processed from signals from sensors.

INDUSTRIAL APPLICABILITY

The present invention is usable for a touch panel controller and a touch sensor system and an electronic device that include a touch panel controller.

REFERENCE SIGNS LIST 1, 2, 3, 4, 5, 6 touch panel controller
15 first capacitance distribution calculation unit (first signal value map generation unit)
16, 26, 36, 56, 66 first capacitance distribution correction unit (second signal value map generation unit)
18 touch recognition unit
100, 200, 300, 400, 500, 600 touch sensor system
161 area configuration unit
162, 562 average value calculation unit
163, 563 inclination calculation unit
164 correction calculation unit
265 multiplying factor configuration unit
365 correction necessity determination unit
665 difference calculation unit
666 integral calculation unit
3000 cellular phone (electronic device)
C1,1 to Cm,n capacitance (signal value)
C, C1, C2 matrix (matrix expressing capacitance distribution)
VL1 to VLm sense line
n integer (integer indicating the number of sense lines)
HL1 to HLn drive line
m integer (integer indicating the number of drive lines)
A area (area to perform correction calculation)
MAP1 first capacitance map (first signal value map)
MAP2 second capacitance map (second signal value map)
K correction multiplying factor
V determination value
L, R, U, D external factor area parameter
α up-down inclination
β left-right inclination

The invention claimed is:

1. A touch panel controller comprising:
a first signal value map generation unit that outputs a first signal value map which indicates a distribution of signal values in a touch panel in which plural signal values are formed in a matrix at intersections of m sense lines and n drive lines (both of m and n are integers that are equal to or greater than three); and
a touch recognition unit that detects an input on the touch panel based on the signal values,
wherein the touch panel controller further includes a second signal value map generation unit that
configures an area that is a broader range than a range where changes in the signal values due to an input operation on the touch panel occur on the first signal value map, and
provides a second signal value map which is generated by performing correction calculation which cancels changes in the signal values due to external factors which are different from the input operation on the touch panel in the area to the touch recognition unit,
the area is expressed as a rectangle,
a direction in which the sense lines are arranged is set as an up-down direction,
a direction in which the drive lines are arranged is set as a left-right direction,
the second signal value map generation unit performs the correction calculation by using
an average value Cm of the signal values in the area,
an up-down inclination α that indicates a change amount of the signal value in the up-down direction in the area, and
a left-right inclination β that indicates a change amount of the signal value in the left-right direction in the area.

2. The touch panel controller according to claim 1,
wherein the first signal value map is expressed by a matrix C with m rows and n columns,
the second signal value map generation unit includes an area configuration unit, an average value calculation unit, an inclination calculation unit, and a correction calculation unit,
the area configuration unit configures the area by a rectangle that has four points (X−L, Y−D), (X−L, Y+U), (X+R, Y−D), and (X+R, Y+U) as vertices (each of L, R, U, and D is an integer that is equal to or greater than one) with respect to a point (X, Y) on the first signal value map which corresponds to a component C[X][Y] in the Xth row and Yth column of the matrix C (1<X<m and 1<Y<n),
the average value calculation unit calculates (i) an average value Cm of all components, (ii) an average value Cu of components of Ku rows from the highest row in a row direction, (iii) an average value Cd of components of Kd rows from the lowest row in the row direction, (iv) an average value Cl of components of Kl columns from the leftmost column in a column direction, and (v) an average value Cr of components of Kr columns from the rightmost column in the column direction of a matrix C1 with (L+R+1) rows and (D+U+1) columns that expresses a distribution of the signal values in the area (each of Ku, Kd, Kl, and Kr is an integer that is equal to or greater than one),
the inclination calculation unit calculates an up-down inclination α and a left-right inclination β by $\alpha=(Cu-Cd)/\{(U-(Ku-1))+(D-(Kd-1))\}$ and $\beta=(Cl-Cr)/\{(L-(Kl-1))+(R-(Kr-1))\}$, and the correction calculation unit calculates a matrix C2 that expresses the second signal value map by $C2[i][j]=C1[i][j]-Cm+j\times\alpha+i\times\beta$ (where $-L\leq i\leq R$ and $-U\leq j\leq D$).

3. The touch panel controller according to claim 2,
wherein the second signal value map generation unit further includes a difference calculation unit, and
the difference calculation unit provides a difference matrix that is generated by applying difference calculation to the matrix C which expresses the first signal value map to the area configuration unit.

4. A touch sensor system comprising:
the touch panel controller according to claim 1; and
a touch panel in which plural signal values are distributed in a matrix.

5. An electronic device comprising the touch sensor system according to claim 4.

* * * * *